United States Patent

Muroga et al.

[15] 3,649,767

[45] Mar. 14, 1972

[54] AUTOMATIC TELEPHONE SYSTEM ACTIVATED BY STORED PROGRAMS AND INCLUDING CIRCUITS TO INDICATE BUSY-IDLE STATES OF SYSTEM COMPONENTS

[72] Inventors: Ko Muroga; Jiro Okuda; Nobuhiko Shimasaki; Toshio Terashima; Yasushi Maruyama; Hiroshi Kaneyasu; Kikuya Sohma, all of Tokyo-to, Japan; Clarence A. Lovell, McLean, Va.

[73] Assignee: Nippon Electric Company, Limited, Tokyo-to, Japan

[22] Filed: July 16, 1969

[21] Appl. No.: 842,095

[52] U.S. Cl. .......... 179/18 ES

[51] Int. Cl. .......... H04q 3/54

[58] Field of Search .......... 179/18 ES, 18 E, 18 FF

[56] References Cited

UNITED STATES PATENTS 3,487,173 12/1969 Duthie et al. .......... 179/18 ES

*Primary Examiner*—Kathleen H. Claffy
*Assistant Examiner*—Thomas W. Brown
*Attorney*—Marn & Jangarathis

[57] ABSTRACT

In a system of the space division, stored program type for telephone use, state circuits are connected with subscriber's line circuits, trunk circuits, links and command execution wired logics. Each state circuit supplies to the wired logics a signal representative of the instant operational state of the connected line circuit, trunk and link and receives therefrom a signal representing that the wired logics have processed the state signal. A rotating magnetic memory is used as the central memory device. Also, a pair of central controllers may be provided to operate in the reversed operational modes of call processing and link setting at the same time.

11 Claims, 77 Drawing Figures

Fig. 1B

INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell
BY
Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell
BY
Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS

PATENTED MAR 14 1972 3,649,767

SHEET 07 OF 32

INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell

BY

Marn & Jangarathis
ATTORNEYS

INVENTORS
K. Muroga, J. Okuda,
N. Shimasaki, T. Terashima,
Y. Maruyama, H. Kaneyasu,
K. Sohma and C. A. Lovell
BY
Marn & Jangarathis
ATTORNEYS

PATENTED MAR 14 1972

3,649,767

INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS

PATENTED MAR 14 1972 3,649,767

INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS

INVENTORS

K. Muroga, J. Okuda,
N. Shimasaki, T. Terashima,
Y. Maruyama, H. Kaneyasu,
K. Sohma and C. A. Lovell BY Marn & Jangarathis

ATTORNEYS

PATENTED MAR 14 1972

3,649,767

SHEET 13 OF 32

INVENTORS

K. Muroga, J. Okuda,
N. Shimasaki, T. Terashima,
Y. Maruyama, H. Kaneyasu,
K. Sohma and C. A. Lovell BY Marn & Jangarathis

ATTORNEYS

INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY
Marn & Jangarathis
ATTORNEYS INVENTORS
K. Muroga, J. Okuda,
N. Shimasaki, T. Terashima,
Y. Maruyama, H. Kaneyasu
K. Sohma and C. A. Lovell BY Marn & Jangarathis
ATTORNEYS

PATENTED MAR 14 1972 3,649,767

SHEET 17 OF 32

INVENTORS
K. Muroga, J. Okuda,
N. Shimasaki, T. Terashima,
Y. Maruyama, H. Kaneyasu,
K. Sohma and C. A. Lovell

BY

Marn & Jangarathis
ATTORNEYS

INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY *Mawn & Jangarathis*
ATTORNEYS INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY *Marn & Jangarathis*
ATTORNEYS INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell

BY

Marn & Jangarathis
ATTORNEYS

INVENTORS
K. Muroga, J. Okuda,
N. Shimasaki, T. Terashima,
Y. Maruyama, H. Kaneyasu,
K. Sohma and C. A. Lovell
BY
Mann & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell
BY
Mann & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell
BY Marn & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY Mann & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell BY Mann & Jangarathis
ATTORNEYS INVENTORS
K. Muroga, J. Okuda,
N. Shimasaki, T. Terashima,
Y. Maruyama, H. Kaneyasu,
K. Sohma and C. A. Lovell
BY
Marn & Jangarathis
ATTORNEYS

AUTOMATIC TELEPHONE SYSTEM ACTIVATED BY STORED PROGRAMS AND INCLUDING CIRCUITS TO INDICATE BUSY-IDLE STATES OF SYSTEM COMPONENTS

This invention relates to an electronic controlled space division switching system of the stored program type and, more particularly, to such system designed for a common control automatic telephone, data, or telegraph transmission to embody a space division cross-point switching matrix electronically controlled by stored programs.

As is well known in the art, a common control automatic telephone switching system comprises peripheral equipment and common control equipment. The peripheral equipment consists of peripheral elements including the subscriber's line circuits, the trunk circuits or trunks, and the links. The common control equipment detects call originations, receives and processes numerical signals such as, for example, dial pulses and multifrequency signals, establishes the desired connection, rings the called subscriber, supervises the call, makes records for use in charging such calls that are not free, and otherwise carries out the switching control functions.

In a No. 1 ESS electronic switching system described in the Bell System Technical Journal, Volume XLIII, No. 5, Sept. 1964, stored program is used to accomplish the switching control functions. The common control equipment of the No. 1 ESS system comprises a central processor, a program store, a call store, scanners, and signal distributors, instead of the more familiar electromagnetic relay-type components of the electromechanical control used heretofore in switching systems. In the No. 1 ESS system all of the above-mentioned switching functions are converted into data processing functions that are processed under the control of the stored programs. Such an electronic controlled switching system has a high potential for use due to its great flexibility which permits the switching control functions to be changed or supplemented with new ones in an expeditious manner.

It should be pointed out, however, that the proportion of the "fixed hardware" needed for an office to the "proportional hardware" which is needed in proportion to the number of the local subscribers and the traffic they generate is very large in the No. 1 ESS switching system. The peripheral equipment, being substantially proportional in bulk to the number of the subscribers and the traffic, imposes no strong constraints on the whole size of the office. The data processing equipments, however, change only slightly with the scale of the office, being more dependent on the number and the types of services offered than on the number of the subscribers to whom the services are offered. Thus, the No. 1 ESS switching system is economically at a great disadvantage when it is considered for use in moderate and small sized offices.

Furthermore, the No. 1 ESS system stores the instantaneous states of operation of the peripheral elements in the main memory store so that the switching control commands are based on this stored information rather than the actual states of the peripheral elements at the moment. There is an incidence of error, although small, in the stored information which causes malfunctions in the call processing function thereby degrading the service. This degradation of service is restored in the No. 1 ESS system by use of large audit and maintenance programs at the expense of a further increased amount of fixed hardware.

A general object of this invention is to provide an improved electronic controlled space division switching system of the stored program type wherein many of those features are retained which have been perfected through long use of prior art automatic switching systems.

Another general object is to provide a switching system having interoffice signaling and supervision equipments enabling expeditious use with other switching systems presently in use.

Still another general object is to provide a switching system which operates satisfactorily with telephone sets and data terminal equipments presently in common use, including coin telephone devices.

Yet another general object is to provide a switching system which is particularly adapted for use in a medium or a small type of central office.

An object of this invention is to provide a switching system wherein the quantity of hardware required is determined and varies in proportion to the number of local subscribers and the traffic generated thereby.

Another object is to provide a switching system equipped with state circuits for indicating the busy and idle states of the peripheral elements and for reserving one or more thereof for use in a particular connection.

Still another object is to provide a switching system wherein the program is both short and easily written so as to reduce the cost of the software as well as the quantity of the fixed hardware.

Yet another object is to provide a switching system wherein highly repetitive trains of operations are performed by an aggregate of wired logics to raise the switching speed and to reduce the required amount of the fixed hardware.

A further object is to provide a switching system which applies no constraints on the junctor pattern of the switching network and nevertheless has extremely simple logic for expeditiously selecting an idle path therethrough.

A still further object is to provide a switching system having means for checking the network status independently before and after execution of the switching control commands to prevent misconnections, which would otherwise occur from errors in data processing by the operating one of the central controllers and to cause another central controller to make a second attempt to establish a connection in a case where the first attempt failed.

According to this invention, there is provided an electronic controlled space division switching system of the stored program type having a peripheral equipment and a common control equipment for controlling the operation of the peripheral equipment, wherein the improvement comprises a plurality of circuits (termed state circuits) in the common control equipment, substantially equal in number to the subscribers directly served by the peripheral equipment, for performing a portion of the function of the common control equipment.

According to a first aspect, the present invention involves the use of a rotating magnetic memory, such as a magnetic drum or disc, for giving successive accesses to the relevant ones of the state circuits as a result of the rotation to activate the common control equipment to supply signals to the desired element and to receive signals therefrom.

According to a second aspect, the invention concerns the use of two central controllers, each connected to the state circuits and operable cyclically in the data processing mode for processing a call while the other is in the path establishing mode for establishing a switching path for a previously processed call, and vice versa.

According to a third aspect, the invention is related to the use of signal producing devices and a group of discrete wired logics wherein the devices produce macrocommand signals one at a time in compliance with stored programs, each macrocommand signal representing one macrocommand and the wired logics group are connected to the signal producing devices and the state circuits for executing the respective macrocommands in response to the corresponding macrocommand signal received from the signal devices.

By virtue of the invention, a number of simple but highly repetitive operations which have not been changed since the introduction of the common control switching system, are carried out by the state circuits which may be manufactured by integrated circuit techniques or other wise at a cost lower than that for the manufacture of devices for doing such operations by using data processing techniques. An example of such repetitive operations is that of counting the individual pulses in a dial pulse train and detecting the interdigit pause that defines the end of the pulse train. The number of the required state circuits diminishes with a decrease in the number of the subscribers and a descreased amount of traffic. Inasmuch as the operation of dial pulse counting will not change in the future, no usable flexibility is lost in taking that operation from the program control and placing it in the wired logics for accomplishment. Furthermore, this control change greatly simplifies the stored programs and permits a reduction in the quantity of the required fixed hardware.

The state circuits are coupled with the subscriber's line circuits, the links, and the trunks and with the common control equipment to notify the control equipment regarding the busy, the idle, the reserved and other states of the service of the peripheral elements at a given time. Moreover, the control equipment reserves such elements during the call processing mode. Inasmuch as the state circuit indication only is used in searching for an idle element, a reserved one is made to look busy on test until it becomes actually busy. In one embodiment, the state circuit has one bit of memory, such as a flip-flop or a similar bistable circuit, the state of which is set and reset by logical combinations of signals received from the associated peripheral elements and from the control equipment. The memory bit is automatically reset when the peripheral element becomes idle.

In addition to the state circuits, independent means are provided for effecting a double check on the state of each peripheral element to reduce the chances of making misconnections or invading busy speech connections. When a peripheral element is found busy by the independent means whereas the state circuit reported it as idle, a trouble record is made showing the element for which the discrepancy exists.

Also, it should be mentioned that only two talking path conductors are extended through the switching network in the known program controlled electronic switching system. In the embodiment of the invention, three conductors are extended through the switching network. This eliminates the necessity of keeping a record in a temporary memory of the links used in a presently existing connection for tracing purposes and like necessities. In addition, the central controller need not deal with the call supervision and disconnect activities. While a certain amount of flexibility is lost with this three conductor arrangement, this is more than offset by the reduction in memory hardware, execution time, and simplification of the program, all of which provide a special advantage for a central office having a relatively small number of subscribers. With the embodiment of this invention, it is thus possible to reduce the number of commands and the data processing load of the central controller.

In connection with the rotary magnetic memory device, it should be mentioned that this is a substantial improvement over the perforated card and magnetic card memories. Furthermore, the ability to write the data on the rotating device selectively and at a high speed allows some seldom used programs to be kept on a magnetic tape to be rolled into the program store when needed. It is recognized in the magnetic drum memory that its access time is comparatively long relative to that of a random access core memory. However, this relatively long access time results in no appreciable detriment because it is a simple matter to arrange the memory drum equipment so that the available access time thereto is made adequate for such task in a given system. It can further be improved, when required, by using a well-known quick access track.

Scanning of the data on the peripheral element is one of the major functions of the switching control. It is possible to arrange this information on the drum in the order of the equipment numbers given to the respective elements. The test of the state circuits is done in synchronism with the time the read-head appears over the stored data on the drum. If the test of the state circuit shows this reference data to be required, it is gated out immediately as the read-head scans the data. This greatly simplifies and speeds up the task of reading essential data for processing the call.

When two central controllers are used, they operate in reversed modes, each locking the other from a given mode. This does not degrade the service at all when double check is put into practice. From another point of view, the reversed phase operation of the two controllers obviates the chances for one of the central controllers to misuse a peripheral element reserved by the other for a different call. Further more, this manner of operation doubles the call processing capacity. In this connection, it should be mentioned that the time for the call processing operation is of the order of the time for the link setting operation in the present invention thereby requiring both controllers to be engaged in different operations for substantially equal time periods.

By virtue of macrocommands, each fundamental call processing operation is described by a single command. Examples of such commands are the line service request detection, the trunk selection, the link matching, the office code translation, the directory number translation and busy test, the register track hunt, the register service request detection, the register track scanning, the register timing, and the like, which in the above-noted known switching system are executed piecemeal by the central processor. As a consequence of the single command, the number of commands required in the present invention are greatly reduced with consequent reductions in the capacity of the program memory. The number of commands to be carried out in establishing a connection is correspondingly reduced to a point where the memory readout speeds for a magnetic drum are adequate for the purposes.

The specific embodiment of the invention is hereinafter explained with reference to the accompanying drawing under the following headings:

I. SPECIFIC EMBODIMENT
A. GENERAL
B. SPECIFIC EXAMPLE
II. PERIPHERAL EQUIPMENT
A. SWITCHING NETWORK AND NETWORK COMMON CIRCUIT
B. TRUNKS AND REGISTER SENDER LINK
III. NETWORK STATE CIRCUIT
IV. MAGNETIC DRUM and a Portion of CENTRAL CONTROLLER Including TRANSFER CONTROL LOGIC CIRCUITS
V. CENTRAL CONTROLLER
A. CONTROL WIRED LOGICS
B. INSTRUCTION EXECUTION WIRED LOGICS
C. NETWORK CONTROLLER
D. NOTES
VI. CONNECTING OPERATION
VII. GENERAL NOTES The invention is readily understood from the following description taken together with the accompanying drawing in which.

Figure 1A:
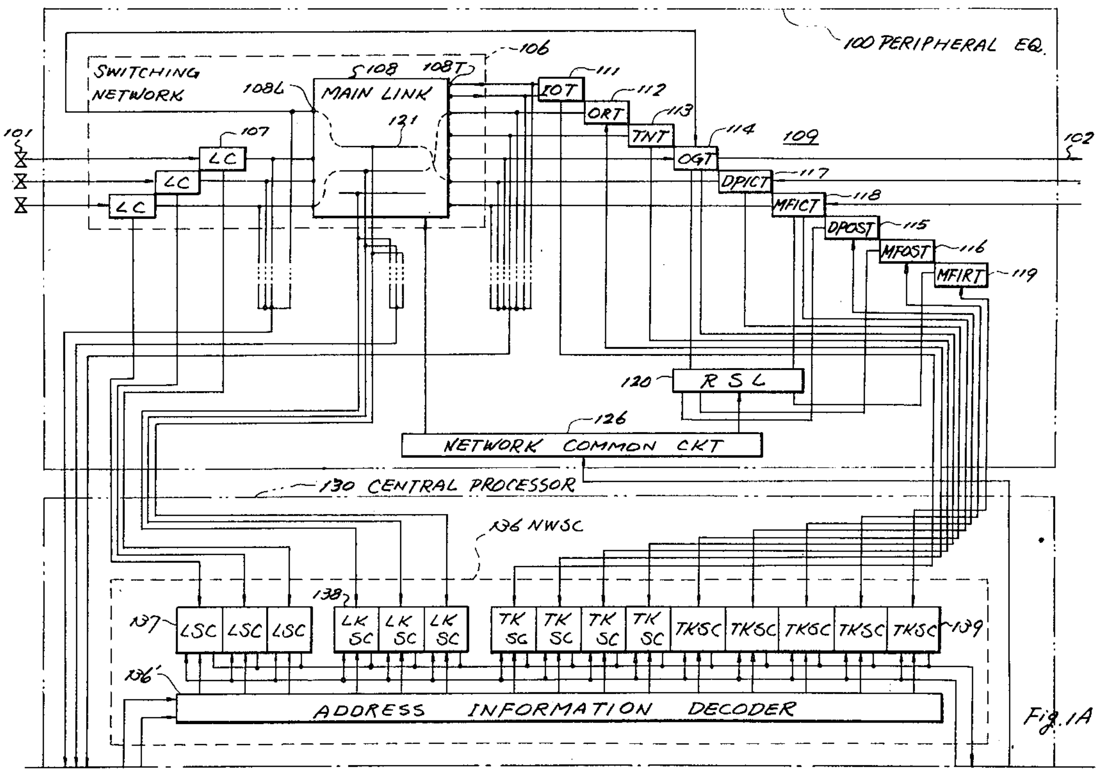
FIGS. 1A and 1B are box diagrams of a telephone switching system including a specific embodiment of the invention.
Figures 1A, 1B:
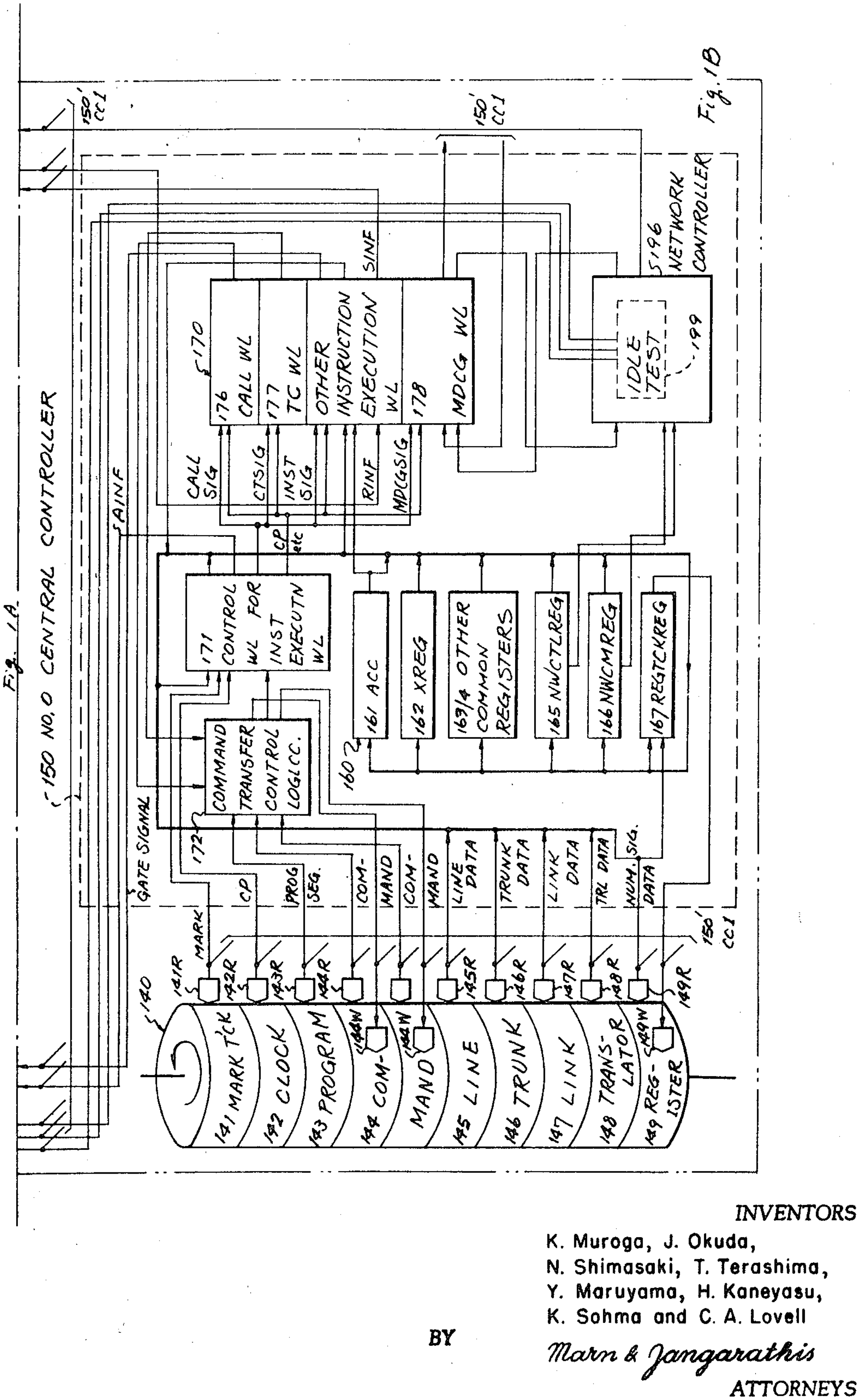
Figures 1A, 1B:
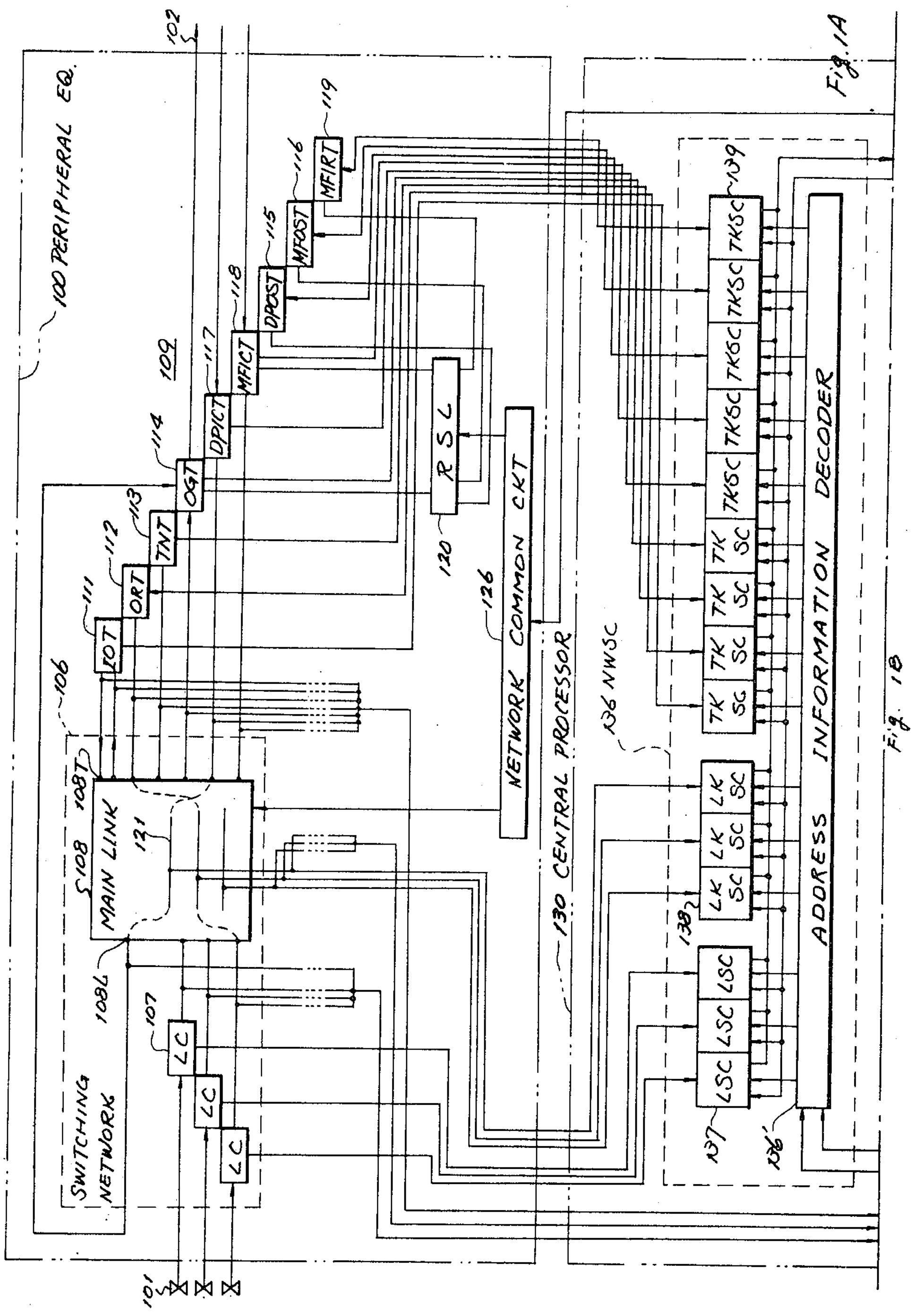
Figure 2:
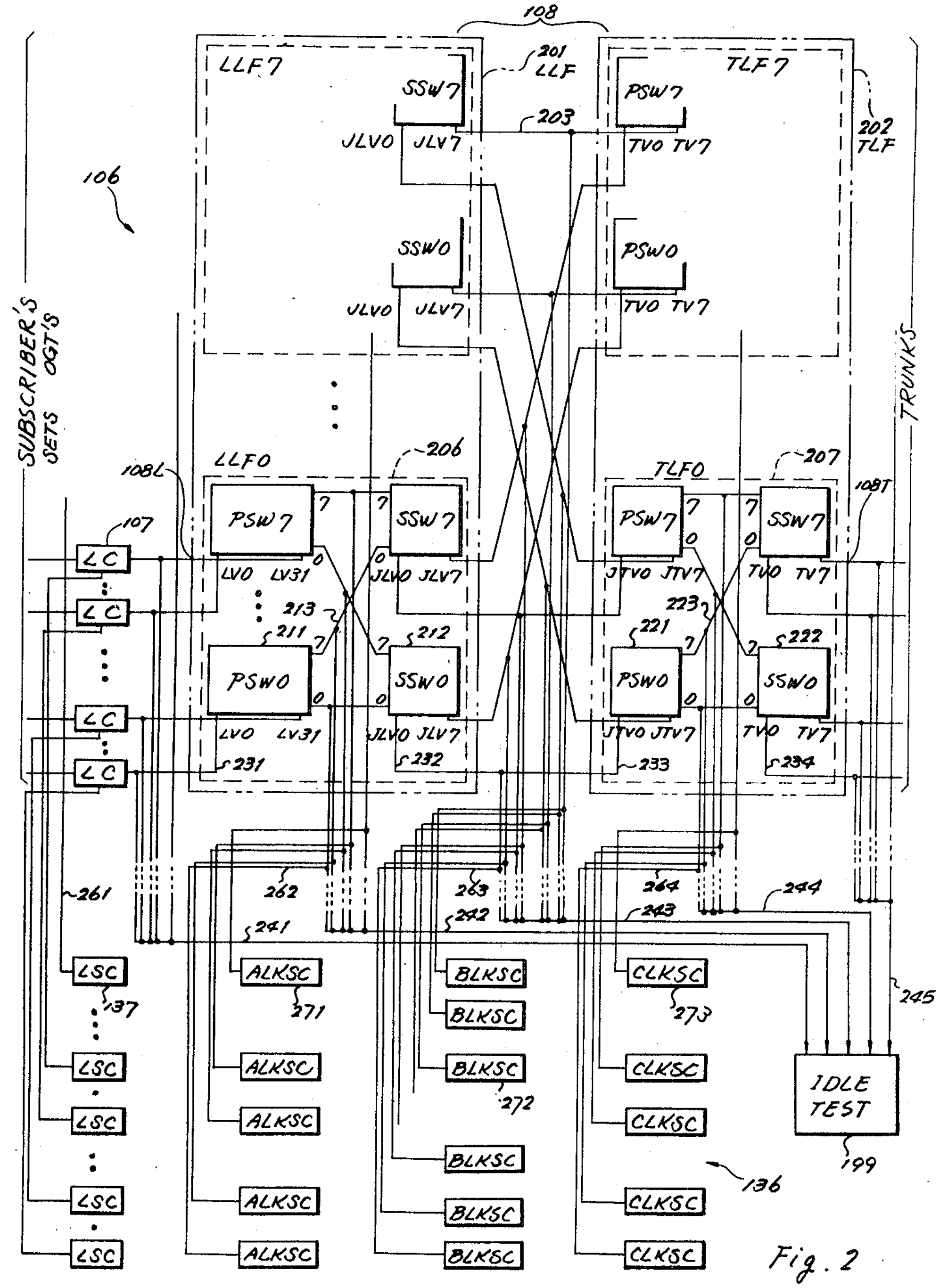
FIG. 2 is a box diagram of a switching network usable in FIG. 1A.
Figure 3A:
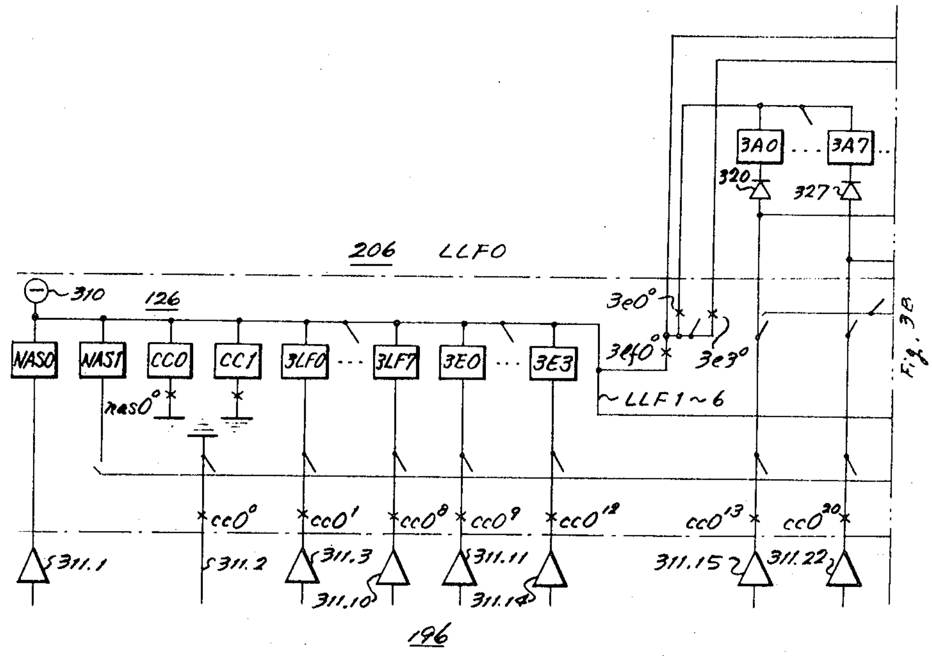
Figures 4, 5B:
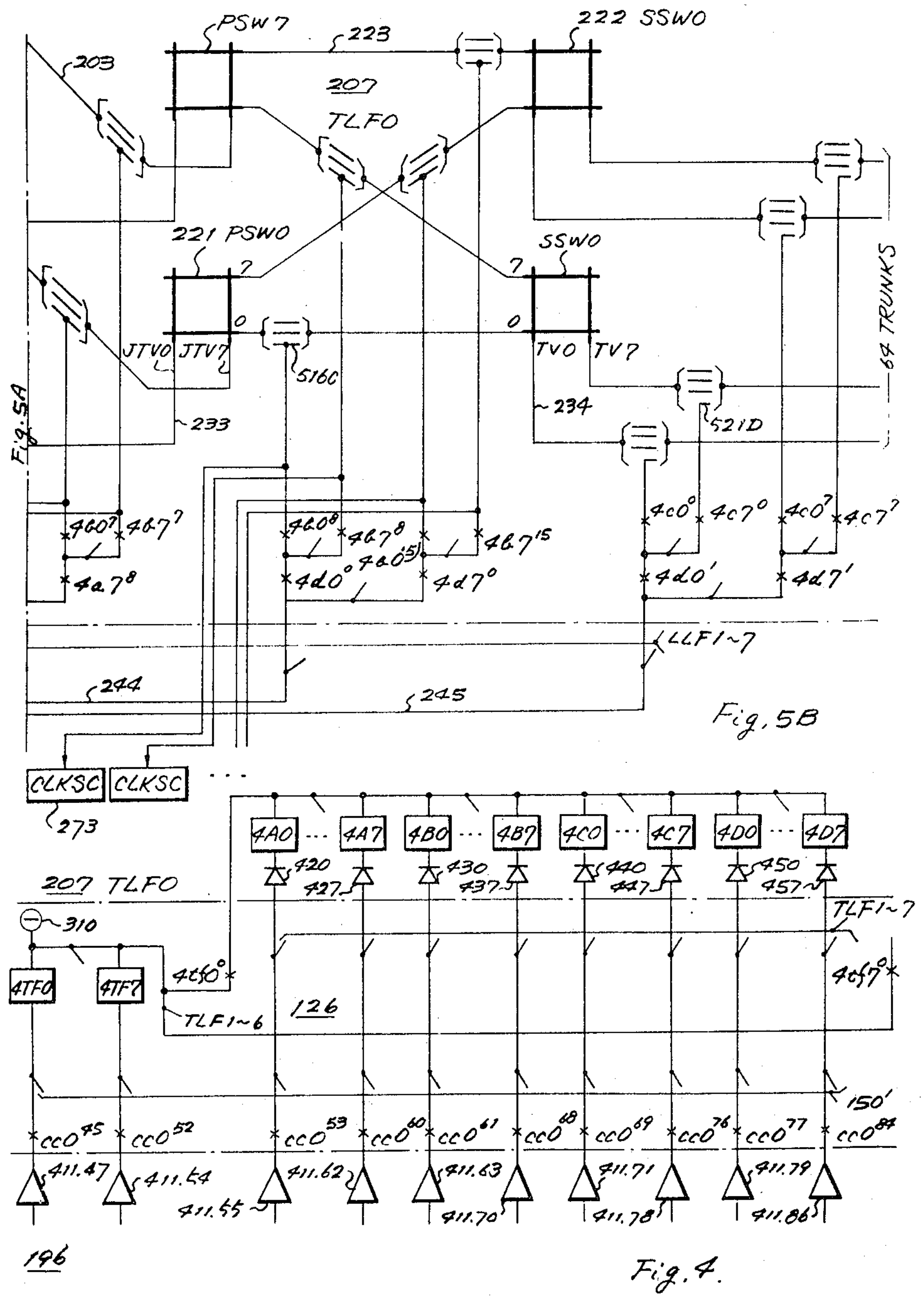
Figures 5A, 6:
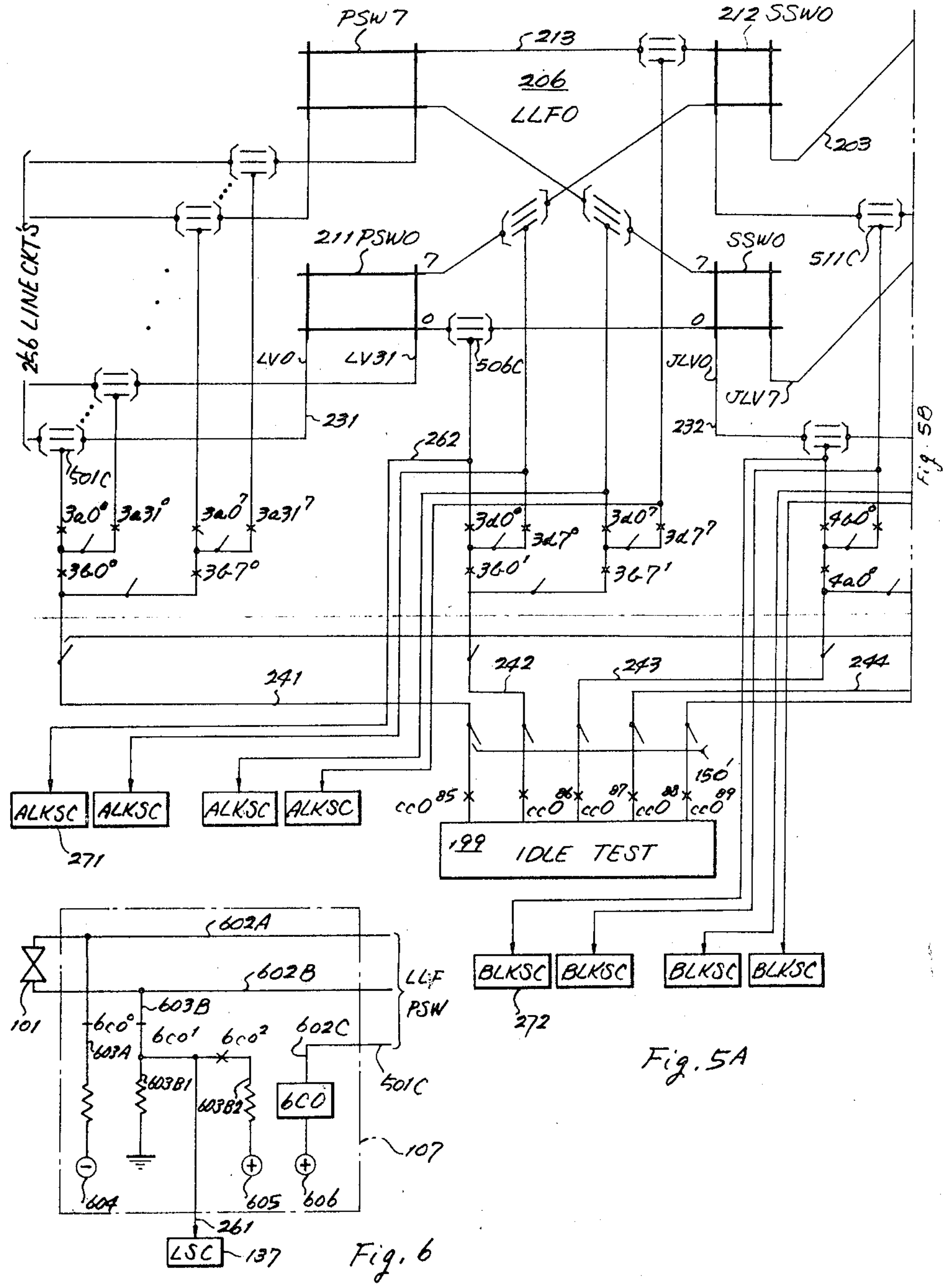
Figure 7:
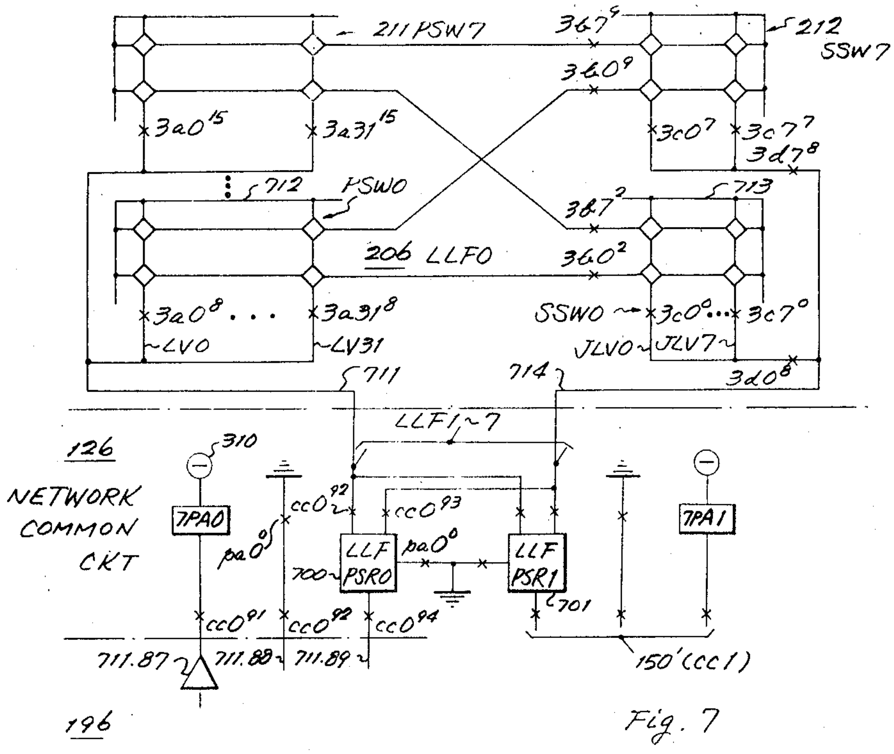
Figure 8:
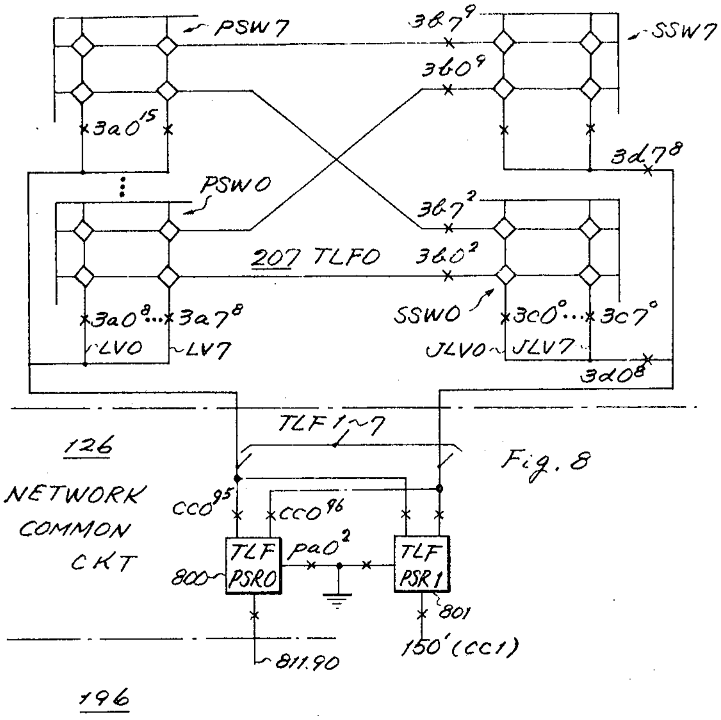
Figures 18A, 18B, 18C:
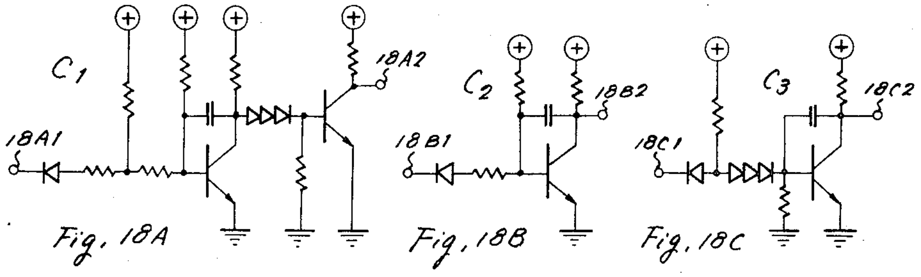
Figure 17:
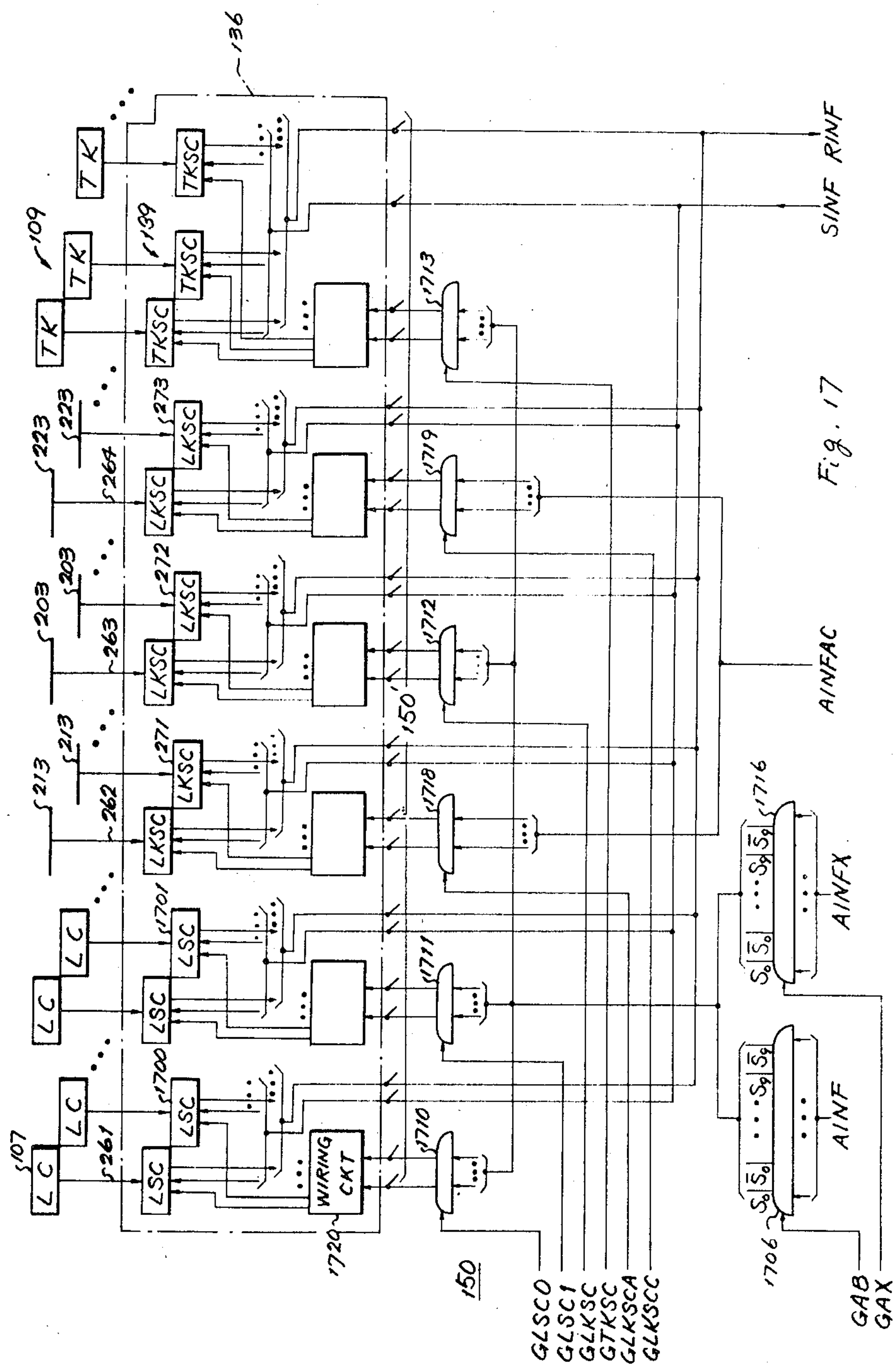
Figure 19:
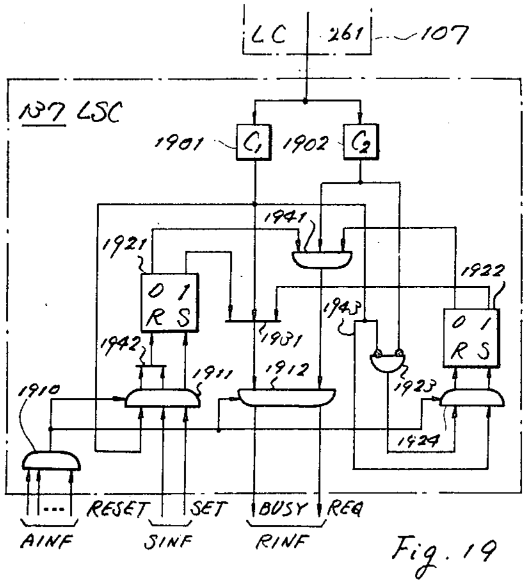
Figures 20, 22:
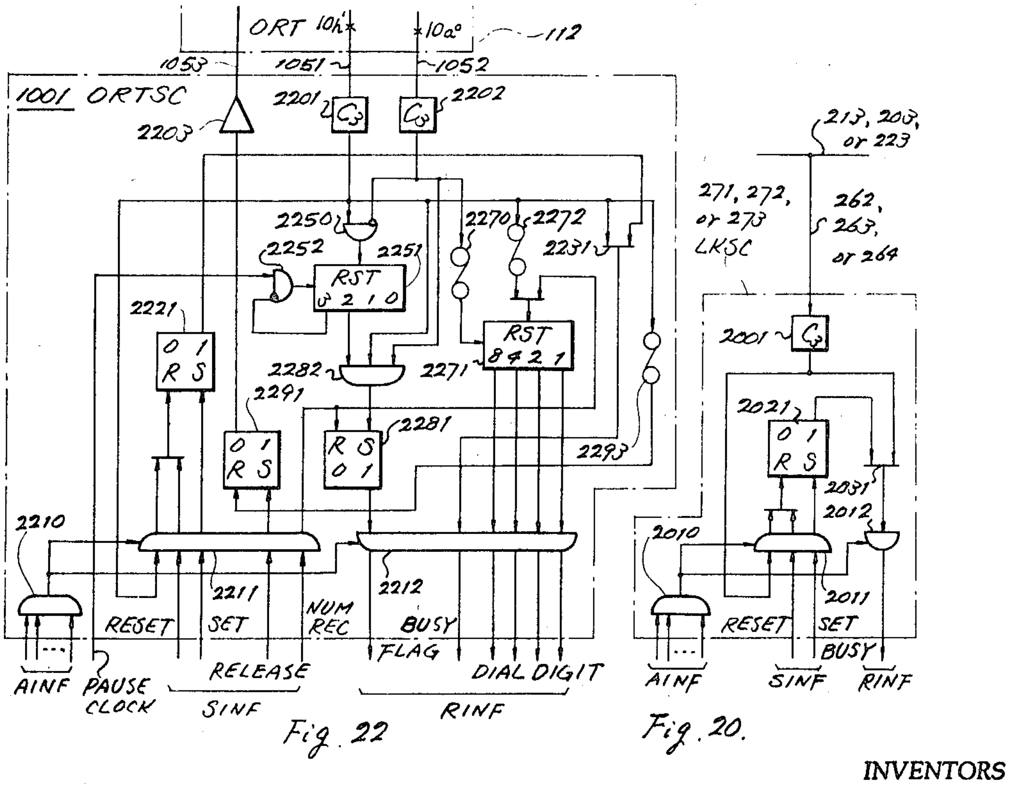
Figure 28:
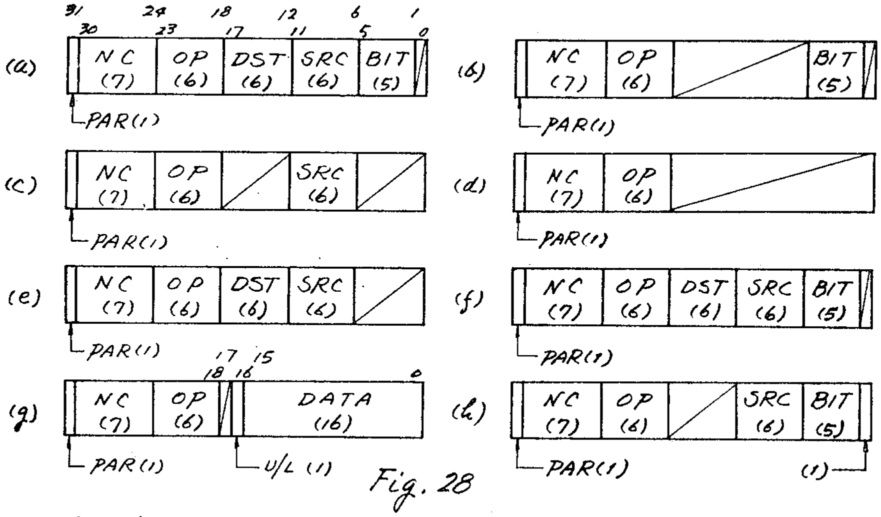
Figure 30:
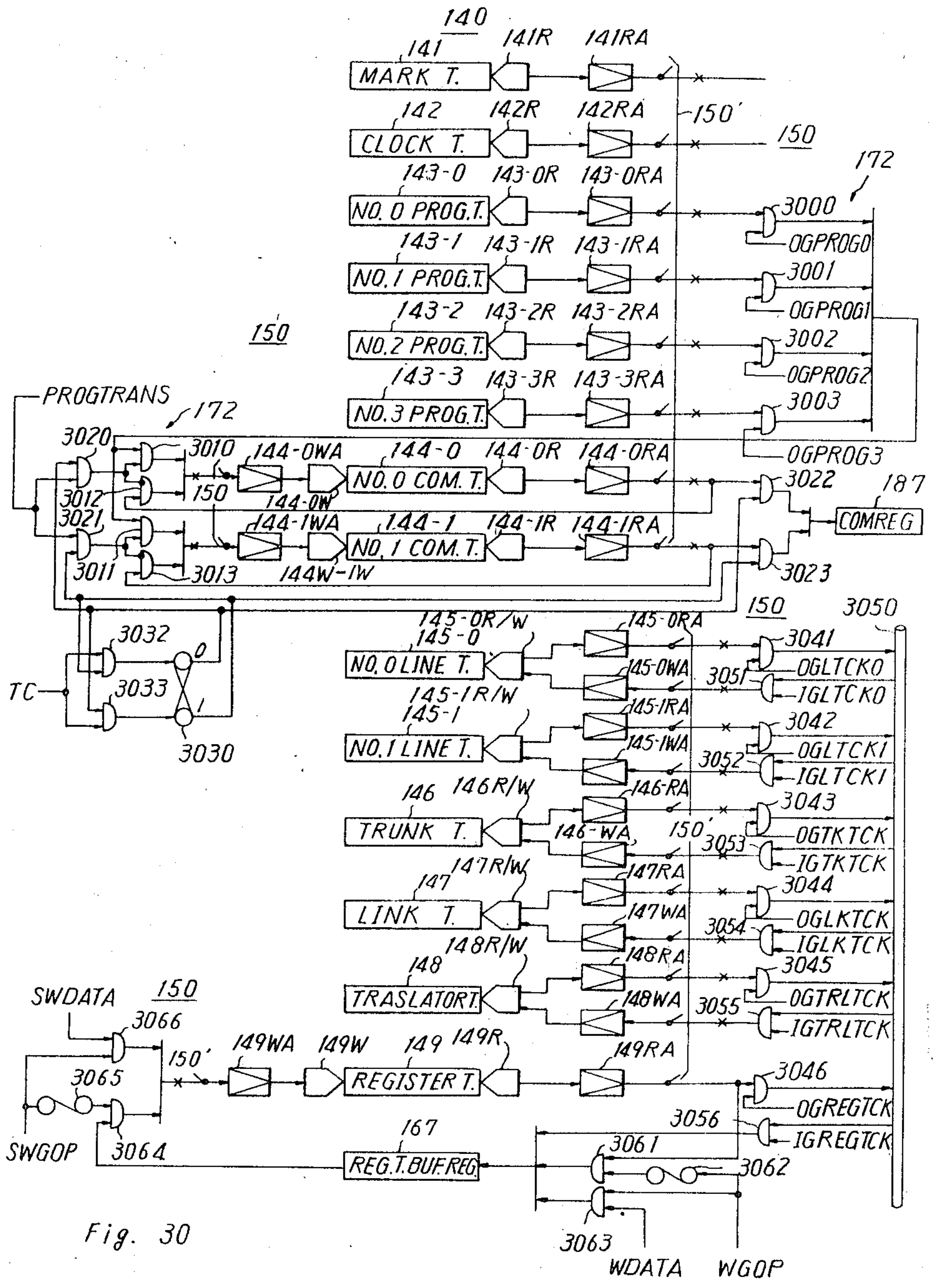
Figure 31:
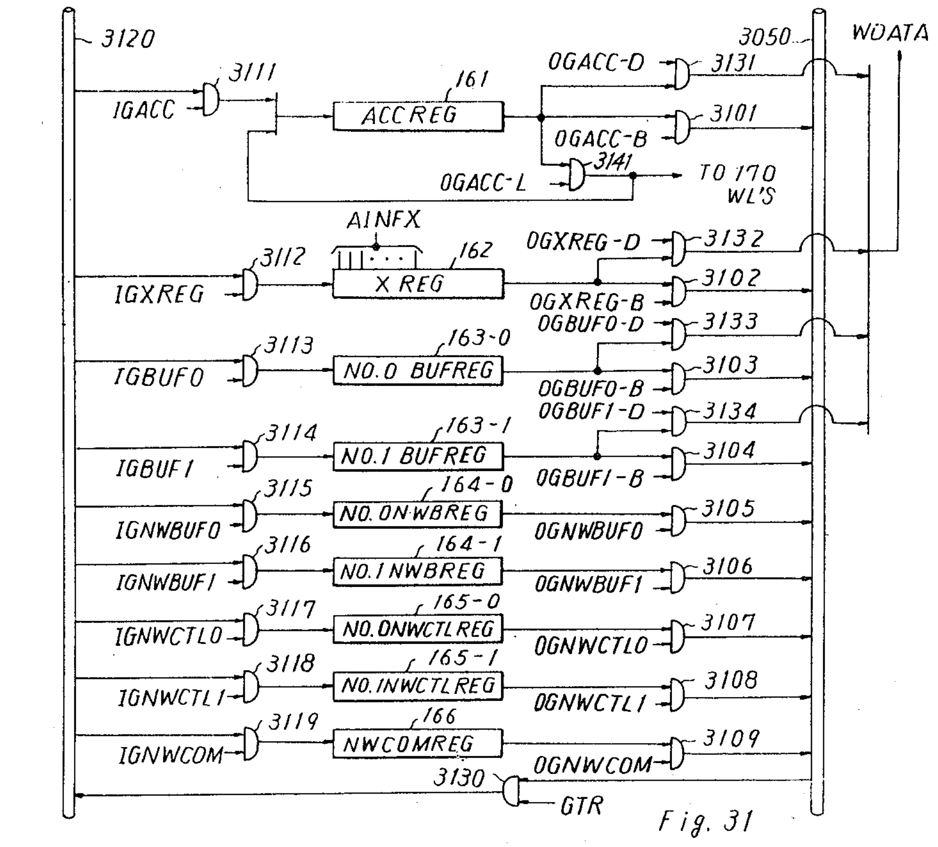
Figure 38:
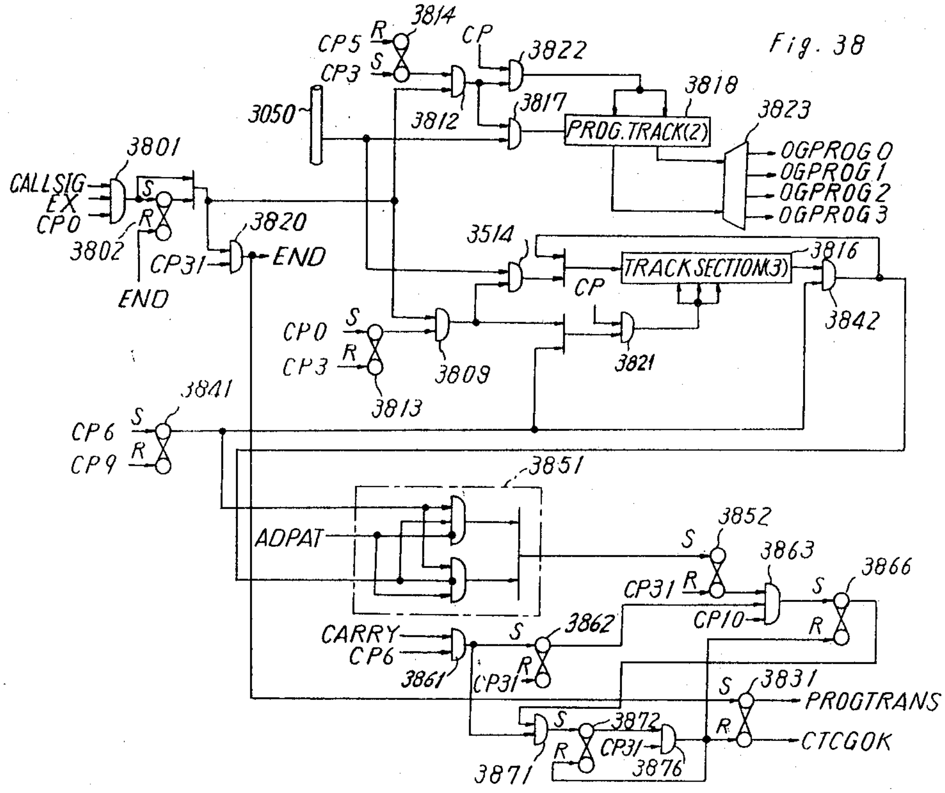
Figure 51:
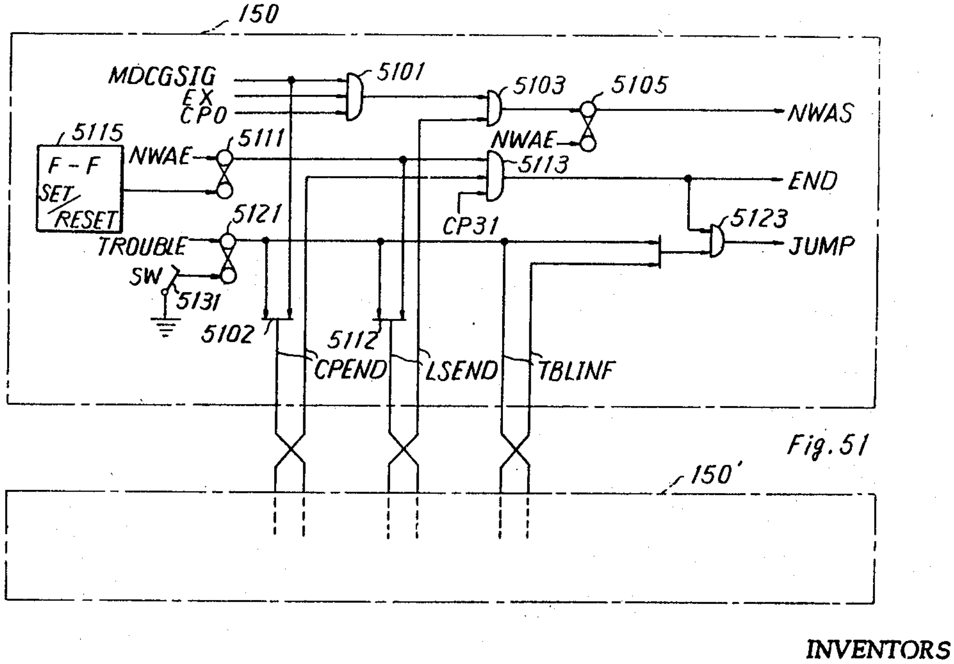
Figure 49:
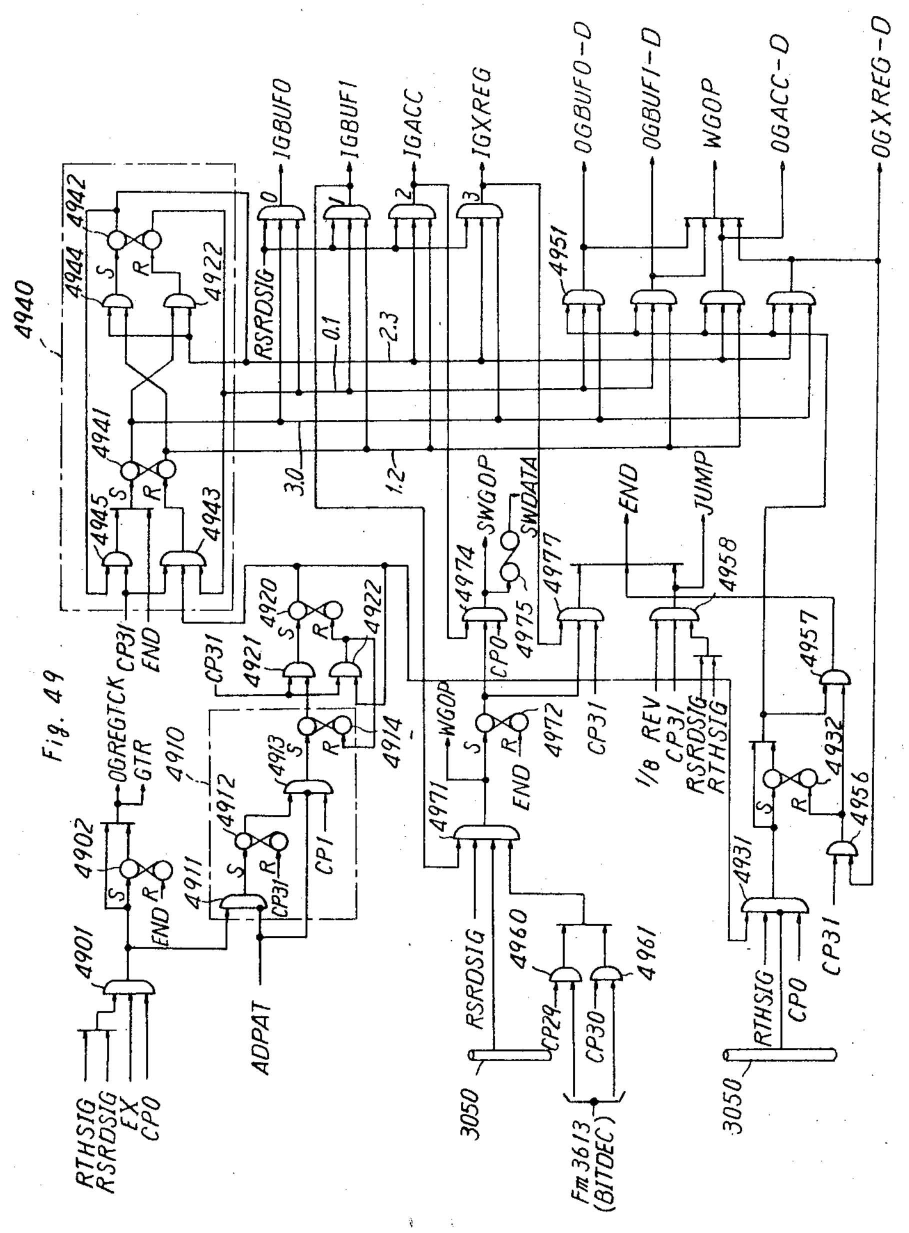
Figures 50A, 50B:
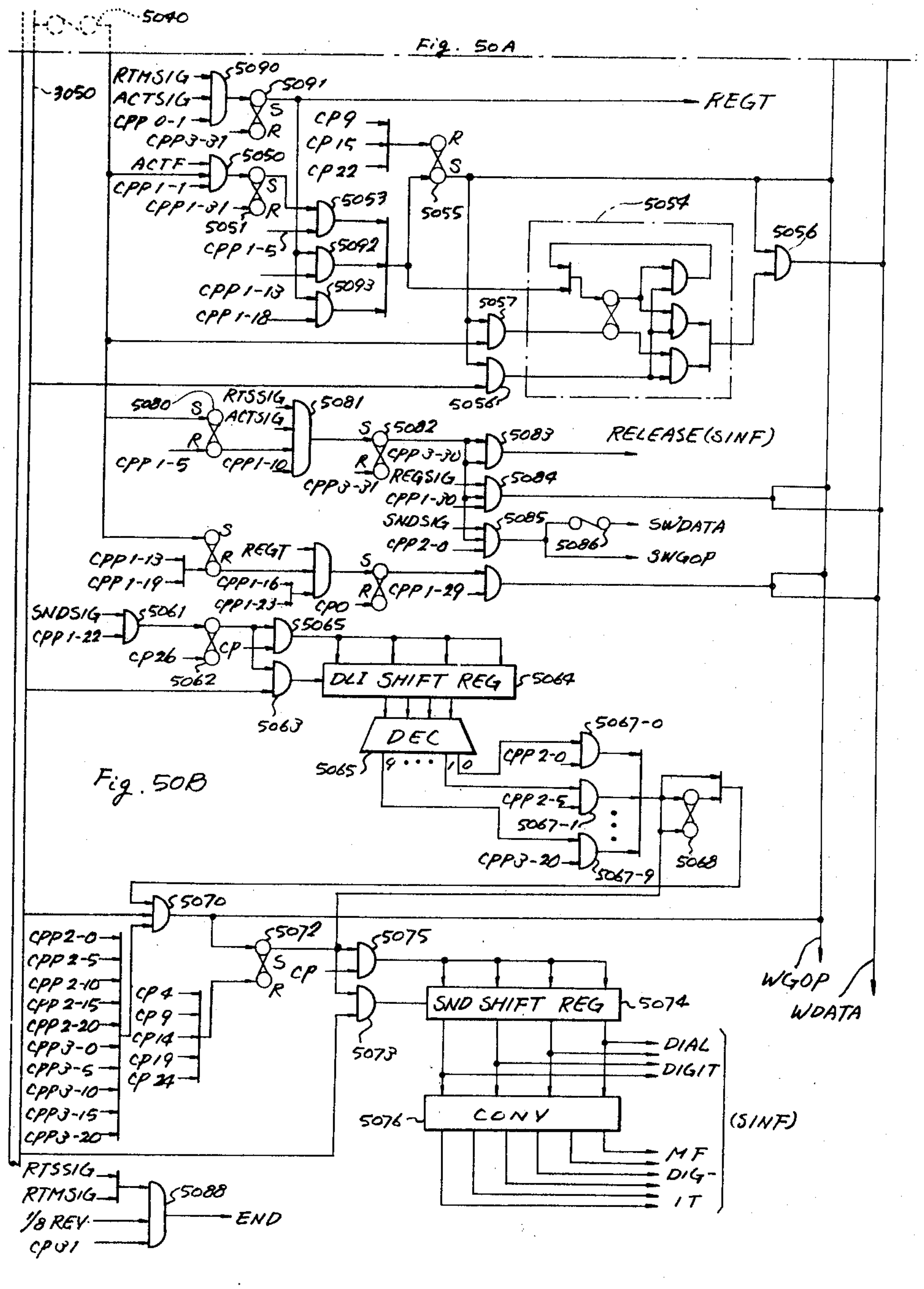
Figures 50A, 50B:
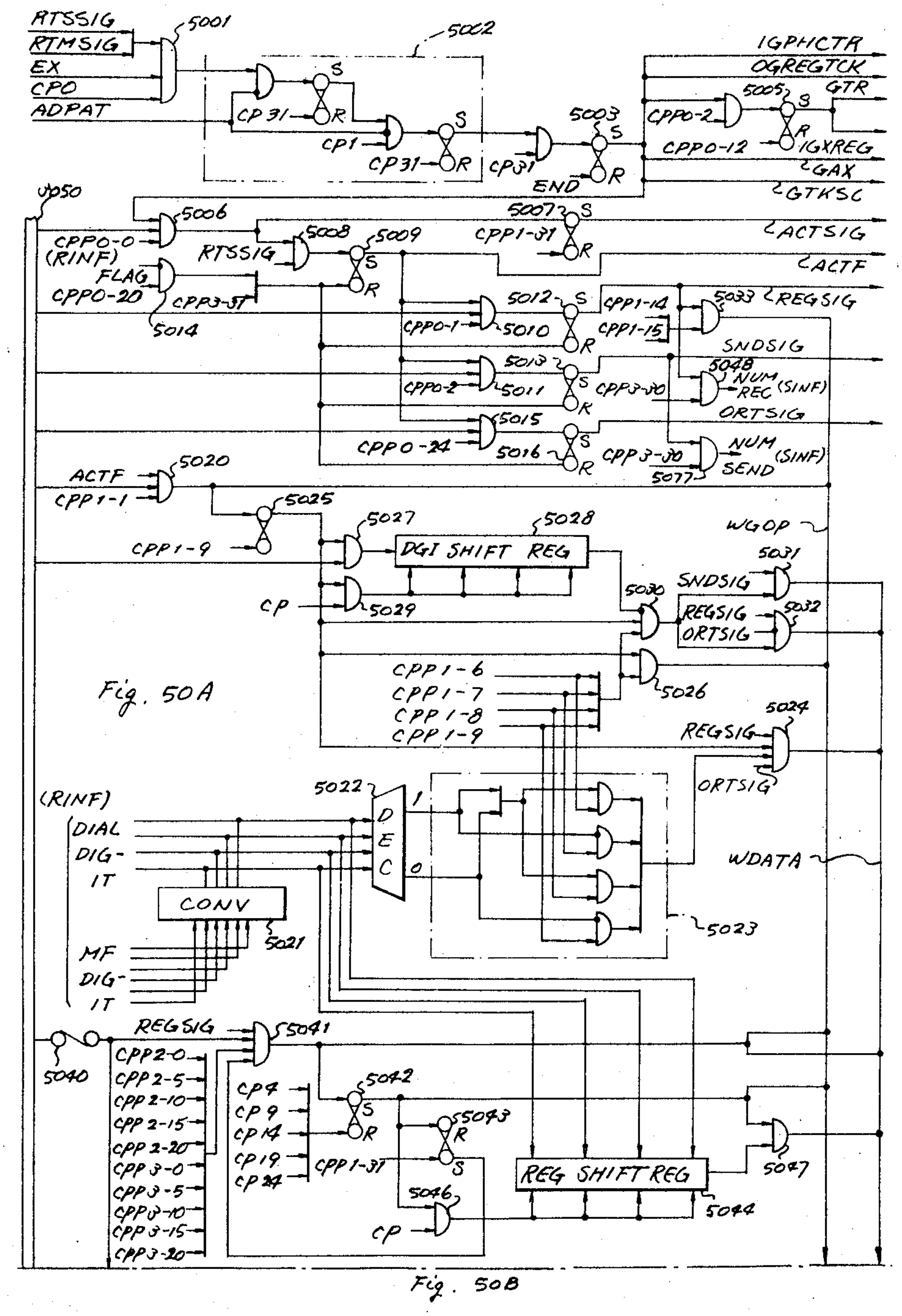
Figure 52:
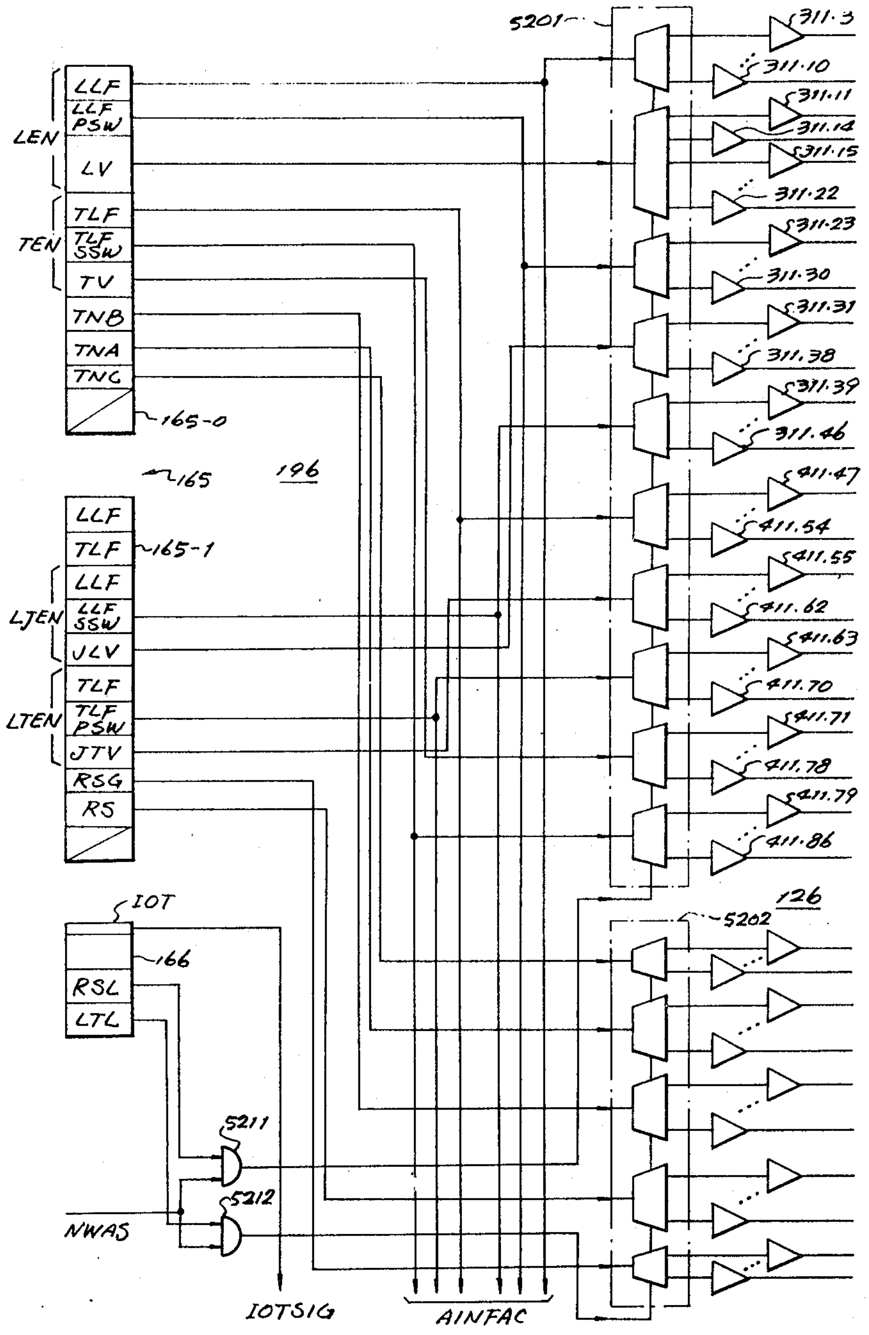
Figure 53:
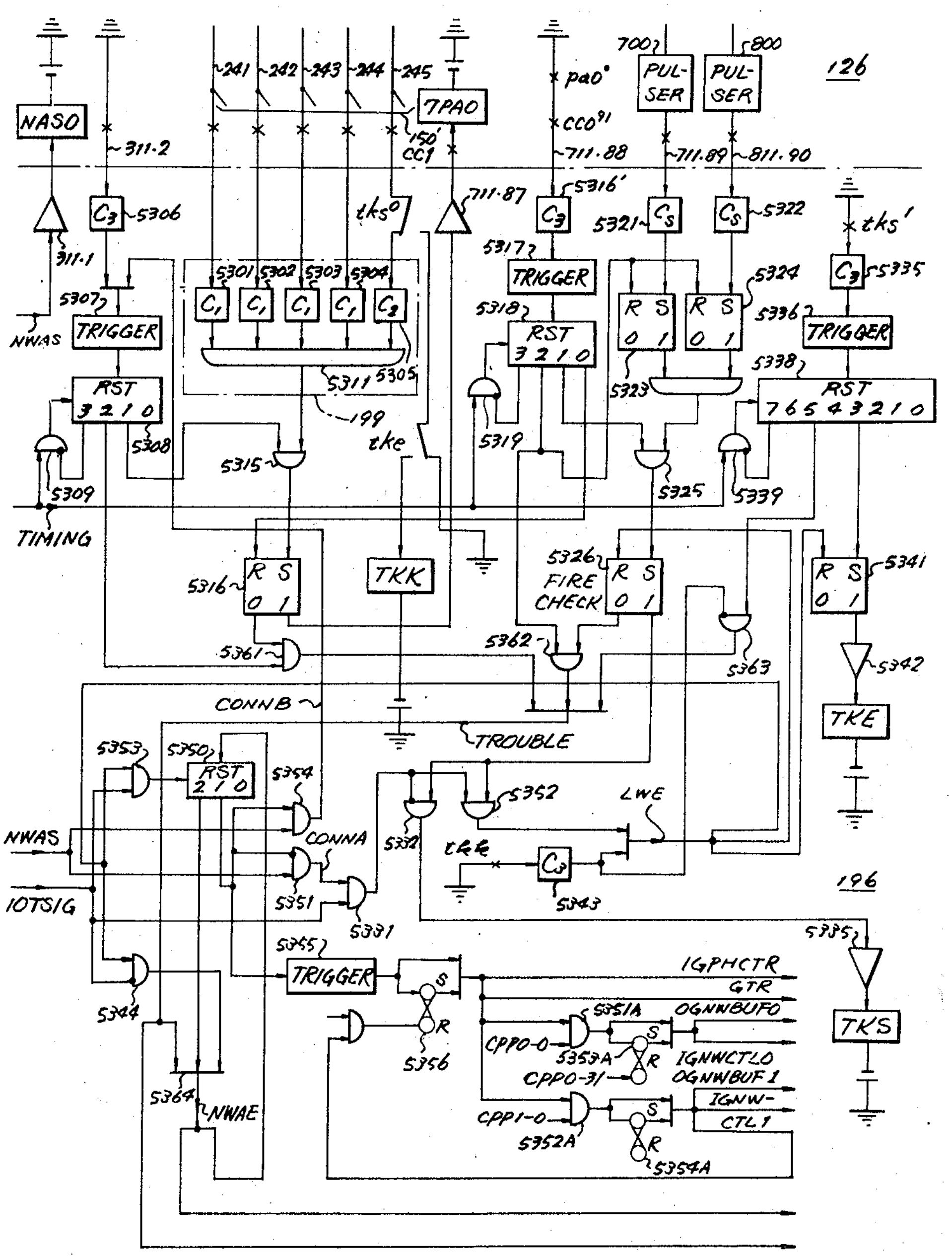

FIGS. 3A and B and 4 are circuit diagrams of subscribers path selection relays and a portion of a network common circuit used in FIG. 1A;

FIGS. 5A and B are circuit diagrams of portions of the switching network and central controller using A, B and C link state circuits according to the invention in FIGS. 1A and 1B;

FIG. 6 is a circuit diagram of a subscriber's line circuit using a line state circuit according to the invention in FIG. 1A;

FIGS. 7 and 8 are circuit diagrams of speech path conductors in portions of the switching network and network common circuit in FIG. 1A;

FIGS. 9 through 16 are circuit diagrams of trunks using state circuits according to the invention in FIG. 1A;

FIG. 17 is a block diagram of logic controls for the state circuits shown in FIG. 1A;

FIGS. 18A, B and C are circuit diagrams of signal converters used in FIG. 17 and elsewhere;

FIG. 19 is a box diagram of a line state circuit used in FIGS. 1A and 17;

FIG. 20 is a box diagram of a link state circuit used in FIG. 2;

FIGS. 21 through 27 are box diagrams showing different trunk state circuits used in FIGS. 1A and 9 through 16;

FIGS. 28(*a*) through 28(*h*) and 29(*a*) through 29(*e*) show data formats of memory tracks on a magnetic drum used in FIG. 1B;

FIG. 30 is a logic circuit showing the magnetic drum and a portion of a central controller used in FIG. 1B;

FIG. 31 is a logic circuit embodying common registers used in FIG. 1B;

FIGS. 32 through 37 are logic control circuits used in FIG. 1B;

FIG. 38 shows a logic call command circuit used in FIG. 1B;

FIGS. 39 through 43 are command execution wired logics relating to the line, the trunk, the link, and the translator tracks of the drum used in FIG. 1B;

FIGS. 44 through 48 are wired logic circuits for macrocommands used in FIG. 1B;

FIGS. 49 and 50A and B show command execution wired logic circuits relating to the register track on the drum used in FIG. 1B;

FIG. 51 is a mode change logic circuit usable in FIG. 1B;

FIGS. 52 and 53 show a network controller used in FIG. 1B; and

FIGS. 54 through 60 are flow charts indicating various connection operations available in FIGS. 1A and B.

The first or the first and second digits of each reference numeral used hereinafter serves to identify the figure number pertinent thereto.

FIG. 3A, as well as other figures, illustrates an electromagnetic relay "detached contact" arrangement in which an "*x*" crossing a line represents a make contact and a horizontal "-bar" crossing a line represents a break contact.

DESCRIPTION OF THE SPECIFIC EMBODIMENT

I. SPECIFIC EMBODIMENT

A. GENERAL a. Peripheral Equipment

Referring to FIGS. 1A and B, an electronic controlled switching system used in a telephone switching office in accordance with this invention comprises peripheral equipment 100 interconnecting a multiplicity of subscribers' sets 101 and a plurality of trunk lines 102 leading to other offices (not shown).

The peripheral equipment 100 comprises a switching network 106 including a multiplicity of line circuits (LC) 107 and a main link 108 which has a multiplicity of line-side terminals 108L and a plurality of trunk-side terminals 108T. The line and the trunk-side terminals 108L and 108T are divided into a same number of the respective groups (not illustrated). Each line circuit 107 connects a subscriber's set 101 and a line-side terminal 108L.

The peripheral equipment 100 further comprises a plurality of trunks 109 including a plurality of each of intraoffice trunks (IOT) 111, originating register trunks (ORT) 112, tone trunks (TNT) 113, outgoing trunks (OGT) 114, dial pulse outgoing sender trunks (DPOST) 115, multifrequency outgoing sender trunks (MFOST) 116, dial pulse incoming trunks (DPICT) 117, multifrequency incoming trunks (MFICT) 118, multifrequency incoming register trunks (MFIRT) 119, and others, not shown. The trunks 109 are hereinafter referred to by the alphabetical abbreviations given in the parentheses.

The peripheral equipment 100 also comprises a register sender link (RSL) 120. Each of the trunks IOT has an input terminal on the calling subscriber's side and an output terminal on the called subscriber's side of which terminals both are connected with a pair of trunk-side terminals 108T. Each of the trunks ORT and TNT is connected with one trunk side-terminal 108T. In the embodiment illustrated, a trunk OGT has a local input, a transit input, an outgoing, and a register sender link terminal connected with a trunk and a line-side terminal 108T and 108L, a trunkline 102, and the register sender link 120, respectively. The trunks including DPOST, MFOST, and MFIRT are connected with the register sender link 120. The trunk DPICT is connected with a trunkline 102 and a trunk-side terminal 108T. The trunk MFICT is connected with a trunkline 102, a trunk-side terminal 108T, and the register sender link 120.

The main link 108 comprises a plurality of links 121, each adapted to interconnect a desired one in a group of the line-side terminals 108L and a selected one in a group of the trunk-side terminals 108T, these groups being particular to a link 121. The register sender link 120 connects a trunk OGT with either outgoing sender trunk 115 or 116 and a trunk MFICT with a trunk MFIRT.

The line circuits 107 and the trunks 109 are called herein the unit peripheral equipments. The unit peripheral equipments and the links 121 are similarly termed the peripheral elements. The peripheral elements have the respective equipment numbers. The same kind of trunks 109 has a common trunk group number, except the trunks OGT which have several such numbers according to their use. Trunks 109, associated with register sender link 120, have the respective trunk numbers. The respective groups of the line and the trunk-side terminals 108L and 108T are identified by the line and the trunk link frame numbers, respectively. The line link frame number of a terminal group is contained in common in the equipment numbers of those unit peripheral equipments which are connected with the respective terminals in the group. Likewise, the trunk link frame number of a terminal group is contained in the trunk equipment numbers of the trunks connected with the respective terminals in the group. Each trunk IOT has a pair of equipment numbers on the calling and the called subscriber's sides. Similarly, each trunk OGT has a pair of equipment numbers for the local and the transit input terminals, respectively. These equipment numbers have special significance in the respects mentioned later.

Peripheral equipment 100 further comprises a network common circuit 126 associated with the main and the register sender links 108 and 120. In the manner described later in the succeeding section "(i) Operation," the network common circuit 126 serves to connect a pair of the unit peripheral equipments together through the main link 108 and, as the case may be, a pair of relevant trunks together through the register sender link 120. Peripheral equipment 100 is substantially conventional except slight modifications effected on trunks 109 and network common circuit 126.

b. Central Processor - State Circuits

The switching system further comprises a central processor 130 which, according to the instant invention, consists of a network state circuit (NWSC) 136 including line state circuits (LSC) 137 connected with the respective line circuits LC, link state circuits (LKSC) 138 connected with the respective links 121, and trunk state circuits (TKSC) 139 connected with the respective trunks 109, and an address information decoder 136' associated with the line, the link, and the trunk state circuits 137, 138 and 139. The address information decoder 136', supplied with the address information signals, successively addresses in the manner described in section "(i) Operation", the line, the link and the trunk state circuits 137, 138 and 139, respectively, in compliance with the gate signals also supplied thereto. The remainder of central processor 130 is called the common control equipment. In the manner described later in section "(i) Operation," the state circuits 137, 138 and 139 monitor and temporarily record the busy, the idle, the reserved, the line service requesting, and the like states of the associated line circuits 107, links 121, and trunks 109.

c. Storage Device

Central processor 130 further comprises a magnetic drum 140 in FIG. 1B as a central storage or memory device, on which a plurality of memory tracks are arranged in side-by-side relation such as, for example, a mark track 141, a clock track 142, at least one program track 143, a plurality of command tracks 144, at least one line track 145, a trunk track 146, a link track 147, a translator track 148, a register track 149, and others, not shown. For convenience, tracks other than the mark and the clock tracks 141 and 142 are called the data tracks 143 . . . 149. Furthermore, the command and the register tracks 144 and 149 are termed the short tracks because of the reason mentioned later. Each of the data tracks 143 . . . 149 has a number of work positions, each word consisting of a plurality of bit positions. The number of bits in a word is preferably 32 in view of the amount of the data to be stored in a word, the bit positions being referred to as No.0 . . . No.31 bit positions. With this in mind and in consideration of the dimensions and other factors of a magnetic drum, it is desirable to provide 1,024 words along each of the data tracks 143 . . . 149 except the short tracks 144 and 149, the words being numbered No.0 . . . No.1023 words. The Nos.0 . . . 1023 words are specified by the respective addresses which are in conformity with the word numbers and, when represented in the binary code, are 0000000000 . . . 1111111111, respectively. The command and the register tracks 144 and 149 are preferably provided with 128 and 126 words, respectively, in the manner mentioned below.

Mark track 141 stores a logic "1" datum for producing a mark pulse MARK which indicates the starting point of each of the addresses, namely, the No.0 bit of the No.0 word. Clock track 142 stores logic "1" data which provide clock pulses CPO . . . CP31 for defining the bit positions, respectively. As will appear later, the Nos.0 . . . 31 bit positions of each word are defined by Nos.0 . . . 31 clock pulses CP, respectively. Each of the program tracks 143 stores several trains of commands for controlling the operation of the switching system. Each command track 144 stores a train of commands on a temporary basis in the manner to be described later. The words on the line track 145 store the line data, namely, the directory numbers, the service class, and the like of the respective subscribers. The words on the trunk track 146 store the trunk data, namely, the trunk group numbers, the trunk classes, and, if any, the trunk numbers of the respective trunks 109. The words on the link track 147 store the link data including the line and the trunk-side terminal group numbers of the respective links 121. In this connection, it is mentioned that the links 121 are the junctors when the switching network 106 comprises the line and/or the trunk link frames in the familiar manner. It is preferred to store the line and the like data of the peripheral elements in the words whose addresses are equal to the respective equipment numbers. In this case, the equipment number of trunk (IOT) 111 on the calling subscriber's side is represented by the address and that on the called subscriber's side is stored in the trunk number area. The translator track 148 stores the translation data, such as for determining on the basis of the office code of the called subscriber's directory number, whether the requested connection is an intraoffice, an outgoing, an incoming, or a transit connection. The register track 149 stores the numerical signals and other temporary data relating to processing of the calls on a temporary basis. Tracks other than the short tracks 144 and 149 are normally used for read only purposes except when the data are initially to be stored therein, when the stored data must be changed as a result of a change in the switching system, such as a change in the service class of a local subscriber, or when the stored data are questioned because of repeated misconnections.

The tracks 141 . . . 149 are accompanied by read heads 141R . . . 149R, respectively, which simultaneously read the logic "1" and/or "0" data stored in the corresponding bit positions of the words of the same, common address. The command and the register tracks 144 and 149 are further accompanied by write heads 144W and 149W, respectively. For the remaining tracks, the read heads 141R . . . 143R and 145R . . . 148R may be used as the write heads, respectively. The command write head 144R is so disposed that the data read thereby may be again written by the write head 144W in the command track 144 at a bit position just 128-word length in the rear of the bit position being read. Likewise, the register write head 149W stores the data read by the read head 149R again in the register track 149 at a bit position 126-word length in the rear of the bit position being read. Thus, an access to a desired address is possible for the short tracks 144 and 149 in one-eighth revolution of drum 140. The angular distance between such a write and a read head is determined from the speed of rotation of drum 140, the data density on the track, the access time required by the operation of the switching system, and the amount of the data to be read out. The reason for the still shorter effective length of register track 149 is for the convenience of writing various data at various bit positions. Incidentally, the common address of the words on the short tracks 144 and 149 under access is equal to that address of the words on the other data tracks under simultaneous access in which the most significant three digits in the binary code are excluded. The drum 140 is rotated, for example, at a speed of once during every 20 milliseconds. The read and the write heads are preferably a floating type. The average access time for the long tracks is about 10 milliseconds.

A second storage drum (not shown), identical in structure and operation with storage drum 140, may be provided for standby use.

d. Program Segments and Commands

A train of commands mentioned above is called herein a program segment. The program segments thus define the dial tone connection, the trunk DPICT connection, the trunk MFIRT connection, the intraoffice connection, the outgoing connection, the incoming connection, and the like. A program segment preferably contains contiguous 128 words, most of which store commands. Each program track 143 thus has eight program track sections, each storing a program segment. The program segments are identified by the respective segment addresses determined by the program track number, if there are a plurality of the program tracks, and the program track section number. For example, the segment address is 10110 in the binary code if the program segment is stored in the No.5 (101 in the binary code) program track section of the No.2 (10 in the binary code) program track.

Commands are broadly classified into macrocommands as mentioned hereinbefore and microcommands. Other examples of the macrocommands are a call command (CALL) and the mode change command (MDCG). Examples of the microcommands are a conditional "1" jump, a conditional "0" jump, the command track change, a data transfer, a data store, a data load, and an immediate load command (1JUMP, 0JUMP, CTCG, MOVE, STORE, LOAD, and I-LOAD) as discussed later. The conditional jump commands (1JUMP and 0JUMP) may simultaneously carry out the command track change. Each of the command track change command and the conditional jump commands with the command track change will hereafter be called a track change command. Each command contains an instruction area, a next command address, and at least one parity check bit. The instruction area stores the instruction which defines the particular operation to be performed by central processor 130. The next command address designates the address of the command to be executed next in the normal flow of the program specified by the program segment. The parity check bits, one in the preferred embodiment, serve to check the data in the known manner.

Each program segment contains at least one call command. This designates by the segment address contained in the instruction area a program segment to be executed next and transfers, while the execution of the program segment in one of the command tracks 144 is continued, the designated program segment from the program track 143 to the other of the command tracks 144. Thus, the command tracks 144 usually store two program segments, one of which is in execution and the other for subsequent execution. After the execution of a program segment to an end or when it is found meaningless to further execute the program segment, a track change command contained in the program segment is executed to bring another program segment on the other command track 144 into execution.

The numerical signal for a called subscriber produced by a local subscriber or sent from a preceding office requires real time processing. Therefore, each program segment contains at least one register track scan command for storing the numerical signal in a memory section in the register track 149. In this connection, it should be mentioned that a register track memory section consists of a plurality of words, for example, four words.

e. Central Controller

Central processor 130 still further comprises No.0 and No.1 central controllers 150 and 150', as shown in FIG. 1B, both of which central controllers are identical in circuit structure. Consequently, it is understood that the following description regarding the No.0 central controller 150 also applies to the No.1 central controller 150'.

Central controller 150 normally operates in the normal mode. Otherwise the controller 150 is in the maintenance mode. The normal mode is further classified into the call processing and the link setting modes. While one of the central controllers 150 and 150' is in one of the latter two modes, the second is in the other mode. When the operation of one of the controllers 150 and 150' ends earlier than that of the second, the one controller waits completion of operation of the second and, at the time point of the earliest No.0 clock pulse after the completion, begins to execute a mode change command as explained later. If one of the controllers 150 and 150' encounters a trouble in the switching system, that one controller automatically informs the maintenance personnel of the trouble for the correction thereof, while the second operates in the call processing and the link setting modes in a cyclic manner.

f. Common Registers

The No.0 central controller 150 comprises miscellaneous common registers 160 which are connected with the drum 140 to be loaded with various data supplied from the data source, such as the data tracks 143 . . . 149, selected during execution of commands. The registers 160 are, for example, an accumulator register (ACC) 161, an index register (XREG) 162, at least one buffer register (BUFREG) 163, at least one network buffer register (NWBREG) 164, at least one network control register (NWCTLREG) 165, a network command register (NWCMREG) 166, and a register track buffer register (REGTCKREG) 167. In compliance with the number of the bits in a word, each of the common registers 160, except the network command and the register track buffer registers 166 and 167 preferably has 32 bit positions. The network command register 166 may have 10 bit positions. In comparison with the 126-word length of the register track 149, the register track buffer register 167 has 64 bit positions or two-word length.

g. Wired Logic for Call Processing

The No.0 central controller 150 further comprises an aggregate of instruction execution wired logics 170 (FIG. 1B), an assembly of control wired logics 171 (FIG. 1B) for the latter instruction execution wired logics 170, and a combination of command transfer control logic circuits 172 (FIG. 1B).

The control wired logics 171 receive mark and the clock pulses MARK and CP from drum 140 and the command signals from the command transfer logic circuits 172 and supply the instruction execution wired logics 170 with the instruction signal (INSTSIG) derived from the command to be executed and with the clock pulses and miscellaneous other control signals (CP etc.). Examples of the instruction signals are a call signal CALLSIG, a track change signal TCSIG, and a mode change signal MDCGSIG for the respective commands mentioned in the foregoing Section "(d) Program Segments and Commands" and described in detail later in the next succeeding part "(B) Instruction Execution Wired Logics." The control wired logics 171 furthermore supply the address information signals AINF to the address information decoder 136' (FIG. 1A). The control wired logics 171 still further supply to themselves the next command address derived from the command having just been executed and store therein the command to be subsequently executed.

The instruction execution wired logics 170 comprise a call wired logic 176, a track change wired logic 177, and a mode change wired logic 178. The call wired logic 176 receives a call signal and executes the instruction defined by the call signal to supply the signals obtained thereby to the command transfer logic circuits 172. The track change wired logic 177 likewise receives a track change signal and supplies the signals obtained through execution of the instruction defined by the supplied track change signal to the command transfer logic circuits 172.

The instruction execution wired logics 170 in general receive instruction signals INSTSIG and the clock pulses and miscellaneous other signals CP etc., from the control wired logics 171, the line and the like data from drum 140, and the data loaded in accumulator register 161 and other common registers 160. In compliance with the instruction being executed, wire logics 170 supply the address information gate signals to the address information decoder 136'. Furthermore, wire logics 170 receive information signals RINF from the addressed one of the line, the link, and the trunk state circuits 137, 138 and 139 and supply thereto the supply information signals SINF derived as a result of the execution of the instruction. Still further, wire logics 170 leave in the common registers 160 the data obtained as the results of the instruction execution and supply the data relating to the numerical signals to the register track 149.

Although not depicted in FIG. 1B, the control wire logics 171 contain a sequence controller 181 (FIG. 35), a subsequent command logic circuit 182 (FIG. 37), a bit counter 183 (FIG. 32), a word counter 184 (FIG. 33), a revolution counter 185 (FIG. 34), an address register 186 (FIG. 33), and a command register 187 (FIG. 36) including an instruction register 188 and a next command address register 189. The address register 186, when designated by the instruction execution wired logics 170, successively registers the address information signals AINF generated in the control wired logics 171 from the mark and the clock pulses MARK and CP to represent the addresses under access on drum 140. When the instruction execution wired logics 170 find out the desired peripheral element as described more fully later in section "(i) Operation," the address register 186 (FIG. 33) retains the address of the word containing the data relating to the desired peripheral element. The wired logics 170 subsequently transfer the address thus kept in the address register 186 to one of the common registers 160. As the case may be, index register 162 or network control register 165 produces like address information.

h. Network Controller

The central controller 150 still further comprises a network controller (NWCTL) 196 (FIG. 1B) associated with the network common circuit 126, the common registers 160, and the wired logics 170. The network controller 196 (FIG. 52) is a wired logic for link setting and in turn comprises an idle test circuit 199 connected with the peripheral elements. The idle test circuit 199 (FIG. 53) serves to carry out the double check on the busy/idle states of the peripheral elements reserved during execution of the program. The network controller 196 causes the network common circuit 126 (FIG. 1A) to establish the desired path through the switching network 106 and, as the case may be, through the register sender link 120 in the manner described later in accordance with the data loaded in the network control and the network command registers 165 and 166 (FIG. 1B).

i. Operation

When a local subscriber originates a call by going off-hook in FIG. 6, line state circuit (LSC) 137 connected with the calling subscriber's line circuit 107 is brought into the busy and service requesting state. In due course, the dial tone connection program is transferred to the drum command track 144 FIG. 1B). When the wired logic 170 (FIG. 1B) detects the service requesting state while it successively receives from the drum line track 145 the data relating to the line circuits 107, the wired logic 170 keeps the equipment number of the calling subscriber's line circuit 107 in the address register 186 (FIG. 33) and the line data relating thereto in one of the common registers 160 (FIG. 1B). The wired logic 170 transfers the equipment number to another common register. In compliance with the program, the wired logic 170 selects an idle originating register trunk (ORT) 112 and reserves the same by means of the pertinent trunk state circuit 139. At the same time, the wired logic 170 keeps the equipment number of the selected trunk in the address register 186 and subsequently transfers the same to a common register. The wired logic 170 transfers portions of the subscriber's line and the selected trunk equipment numbers to the accumulator register 161 (FIG. 31). The wired logic 170 compares the data relating to the links 121 (FIG. 1A) successively received from the drum link track 147 with the equipment number portions repeatedly received from the accumulator register 161 to select and reserve, via the link state circuit (LKSC) 138 in FIG. 1A, an idle link among those links which are capable of establishing a path interconnecting the calling subscriber's line circuit 107 and the reserved trunk (ORT) 112. At the same time, the wired logic 170 keeps the link data in the network control register 165 (FIG. 52) for use as a portion of the data for the link setting operation. The wired logic 170 transfers the remaining data for the link setting operation to the network control register 165 and loads the data for the type of connection in the network command register 166 (FIG. 52). Mode change wired logic 178 (FIG. 1B) actuates the central controller 150 into the link setting mode. In accordance with the data in the network control and command registers 165 and 166, the network controller 196 causes the network common circuit 126 to connect the reserved peripheral elements with the idle test circuit 199. After having thus carried out the double check, the network controller 196 (FIG. 52) stimulates the network common circuit 126 to establish the required connection.

When a multifrequency signal call reaches the incoming trunk MFICT 118 from a preceding office, the state circuit (TKSC) 139 is brought into the service requesting state which at this moment shows the busy state of the incoming trunk MFICT. The incoming register trunk MFIRT connection program is transferred to the drum command track 144 in due course. The wired logic 170 detects the incoming service requesting state while successively receiving the data relating to the trunks 109 from the drum trunk track 146. Upon detecting the service requesting state, the wired logic 170 retains the equipment number of the service requesting incoming trunk MFICT in the address register 186 (FIG. 33) and the trunk number thereof in one of the common registers 160 (FIG. 1B). The wired logic 170 transfers these data of the trunk to other common registers 160. In accordance with the program, the wired logic 170 selects an idle trunk MFIRT 119 and reserves the same by means of the pertinent trunk state circuit 139. At the same time, the wired logic 170 keeps the trunk number of the latter trunk in one of the common registers 160. The wired logic 170 transfers these trunk numbers to the network control register 165 (FIG. 52) for use as the data for link setting and loads into the network command register 166 (FIG. 52) the data for designating that the register sender link 120 (FIG. 1A) should be set into operation in this case. The mode-change wired logic 178 (FIG. 1B) actuates the central controller 150 (FIG. 1B) into the link setting operation. The network controller 196 (FIG. 53) causes the network common circuit 126 to connect the service requesting trunk MFICT with the reserved trunk MFIRT according to the trunk numbers.

As the numerical signal reaches either a trunk ORT 112 or a trunk DPICT 117, or a trunk MFIRT 119, the particular trunk state circuit 139 connected therewith converts the dial pulses or the multifrequency signals into the logic signals. In compliance with one of the register track scan commands (FIG. 50A) inserted in various positions in the flow of the programs, the wired logic 170 stores the logic signals in a section of the drum register track 149.

If a local subscriber originates a call to another local subscriber, the intraoffice connection program, when transferred to the drum command track 144 in due course, begins to carry out the call processing for this connection. More particularly, the wired logic 170 detects the service request of the register track section and transfers the data stored in the latter track section to the pertinent common registers 160. The wired logic 170 compares the office codes successively received from the drum translator track 148 with the called subscriber's office code repeatedly received from one of the above-mentioned pertinent registers 160 and determines that the intraoffice trunks (IOT) 111 should be used. The wired logic 170 now compares the directory numbers successively received from the drum line track 145 with the called subscriber's directory number repeatedly received from the last-mentioned pertinent one common register 160 to keep the called subscriber's line equipment number in the address register 186 (FIG. 33) and to reserve, via the particular line state circuit 137, the called subscriber's line circuit. The wired logic 170 transfers the called subscriber's line equipment number to another one of the common registers 160. The wired logic 170 selects an idle intraoffice trunk (IOT) 111 and reserves the same via the pertinent trunk state circuit 139. Also, the wired logic 170 retains the trunk equipment number on the calling subscriber's side in the address register 186 and the trunk equipment number on the called subscriber's side in one of the common registers 160. The wired logic 170 subsequently transfers the last-mentioned two trunk equipment numbers to others of the common registers 160. As in the case of the dial tone connection, the wired logic 170 selects an idle main link 121 (FIG. 1A) for interconnecting the calling subscriber's line circuit 107 and the reserved trunk (IOT) 111 on the calling subscriber's side and reserves the same via the particular link state circuit 138.

The wired logic 170 eventually loads the data of the selected trunk (IOT) 111 into the network buffer register 164. The wired logic 170 again carries out the main link matching for the called subscriber's side and retains the data for the latter link setting operation in the network control register 165. The wired logic 170 loads into the network command register 166 the data for the type of connection which informs the network controller 196 (FIGS. 1B and 52) that an intraoffice connection should be made. The mode change wired logic 178 sets the central controller 150 into the link setting operation. After having carried out the double check as in the case of the dial tone connection, the network controller 196 energizes the network common circuit 126 to establish the connection for the called subscriber's side. The network controller 196 transfers the data for the link setting operation on the calling subscriber's side to the network control register 165. Having carried out the double check, the network controller 196 again energizes the network common circuit 126 to complete the connection on the calling subscriber's side. It is to be noted here that the calling subscriber's line equipment number is stored in the register track 149 and transferred to a portion of one of the common registers 160 for eventual use as a part of the data for the link setting operation.

If a local subscriber originates a call to a subscriber in a remote central office, the call processing operation starts when the outgoing connection program is transferred to the drum command track 144 in due course. As in the intraoffice connection, the wired logic 170 detects the service request to transfer the data stored in the register track section 149 to some of the common registers 160, determines that the outgoing trunks (OGT) 114 should be used, selects an idle one of the latter trunks OGT to reserve the same via the particular trunk state circuit 139, retaining in this case, the trunk number of the reserved latter trunk OGT in one of the common registers 160 and subsequently transferring the trunk equipment and the trunk numbers thus obtained to the network control register 165. Furthermore, the wired logic 170 selects an idle main link 121 with reference to the respective portions of the line and the OGT trunk equipment numbers transferred to the accumulator register 161 (FIG. 31). In compliance with the particular program (FIG. 59), the wired logic 170 selects an idle outgoing sender trunk (DPOST) 115 or (MFOST) 116 and reserves the same by the particular trunk state circuit 139. At this moment, the wired logic 170 retains the trunk number in one of the common registers 160 and thereafter transfers the latter number to the network control register 165. The wired logic 170 now transfers the line equipment number from one of the first-mentioned common registers 160 to the network control register 165 and loads into the network command register 166 the data for operating the main and the register sender links 108 and 120, respectively. After the mode change via wired logic 178 and the double check for the peripheral elements concerned with link setting of the main link 108, the network controller 196 causes the network common circuit 126 to carry out the link setting of the main and the register sender links 108 and 120, respectively.

As the numerical signal reaches either a dial pulse incoming trunk (DPICT) 117 or a multifrequency incoming register trunk (MFIRT) 119, the trunk state circuit 139 connected therewith produces logic signals complying with the dial pulse or the multifrequency signals. In accordance with one of the register track scan commands inserted elsewhere in the flow of the programs (FIGS. 54–60), the wired logic 170 stores the latter logic signals in drum register track 149. The incoming connection program, when transferred to the drum command track 144 in due course, carries out the incoming connection. As in the case of the intraoffice and the outgoing connections, the wired logic 170 detects the service request of the register track 149, verifies with reference to the office code that the call is an incoming one, and selects and reserves the desired line circuit 107 with reference to the directory number of the called subscriber. The flow of the last-mentioned incoming connection program, however, proceeds to the selection and the reservation of the desired main link 121. After the central controller mode change and the double check, the network controller 196 activates the network common circuit 126 to establish the desired path through the main link 108.

B. SPECIFIC EXAMPLE

In a particular example of one medium size switching system according to the invention, the numbers of the line circuits 107 (FIG. 6) and the trunks 109 (FIG. 1A) would be about two thousand and five hundred, respectively. In this case, the switching network 106 would comprise a line link frame LLF, a plurality of junctors or B links 203, and a trunk link frame TLF as shown in FIG. 2. The line and the trunk link frames have A links and C links, respectively. For such a switching system of the invention, the drum 140 (FIG. 1B) is equipped with No.0 . . . No.3 program tracks (143-0 . . . 143-3), No.0 and No. 1 command tracks (144-0 and 144-1), and No.0 and No.1 line tracks (145-0 and 145-1). Otherwise, the drum 140 includes one each of a mark track 141, a clock track 142, a trunk track 146, a link track 147, a translator track 148, and a register track 149. In this particular example, the common registers 160 (FIG. 1B) include No.0 and No.1 buffer registers (163-0 and 163-1), No.0 and No.1 network buffer registers (164-0 and 164-1), and No.0 and No.1 network control registers (165-0 and 165-1). Otherwise, the common register 160 embodies one each of an accumulator register 161, an index register 162, a network command register 166 and a register track buffer register 167. Furthermore, each set of the data on the drum translator track 168 occupies two words, these two words forming a translator track section. Similarly, each set of the data on the register track 149 requires four words.

II. PERIPHERAL EQUIPMENT

A. SWITCHING NETWORK and NETWORK COMMON CIRCUIT a. Switches and Links

Referring to FIG. 2, the switching network 106 of the specific example comprises a plurality of line circuits 107, a line link frame (LLF) 201, a trunk link frame (TLF) 202, and a plurality of B links or junctors 203. The line link frame 201 comprises No.0 through No.7 line link frames LLFO . . . LLF7, each constituting one line link frame 206, and is accomplished by a portion of path selection relays illustrated in FIG. 3. The trunk link frame 202 comprises No.0 through No.7 trunk link frames TLFO . . . TLF7, each constituting one trunk link frame 207, and is accomplished by a portion of path selection relays shown in FIG. 4. Each line link frame 206 comprises No.0 through No.7 primary switches (PSW0 . . . PSW7) 211, No.0 through No.7 secondary switches (SSWO . . . SSW7) 212, and a plurality of A links 213. Each trunk link frame 207 comprises No.0 through No.7 primary switches (PSWO . . . PSW7) 221, No.0 through No.7 secondary switches (SSW0 . . . SSW7) 222, and a plurality of C-links 223. Each switch is a ferreed switch which comprises two-wire speech paths and control wires shown in FIG. 5, and path closing coil arrangement depicted in FIGS. 7 and 8. Each primary switch 211 of the line link frames 206 has No.0 through No.31 vertical lines (LV0 . . . LV31) 231 and No.0 through No.7 horizontal lines. Each line link secondary switch 212 has No.0 through No.7 horizontal lines and No.0 through No.7 vertical lines (JLV0 . . . JLV7) 232. Each trunk link primary switch 221 has No.0 through No.7 vertical lines (JTV0 . . . JTV7) 233 and No.0 through No.7 horizontal lines. Each trunk link secondary switch 222 has No.0 through No.7 horizontal lines and No.0 through No.7 vertical lines (TV0 . . . TV7) 234. Each line link primary switch 211 may be composed of four 8×8 ferreed switches, each similar to switches 212, 221 and 222.

The No.0 through No.31 vertical lines 231 of a majority of the line link frame primary switches 211 are connected with the respective line circuits 107. Such vertical lines 231 in other primary switches 211 are connected with the respective outgoing trunks 114. In each line link frame 206, the No.0 through No.7 horizontal lines of the No.0 primary switch (PSW0) 211 are connected with the No.0 horizontal lines of the No.0 through No.7 secondary switches (SSW0 . . . SSW7) 212, respectively, by means of 64 A-links 213. In this pattern, the number of each primary switch (PSW0 . . . PSW7) 211 coincides with the horizontal line number of each of the secondary switches 212 which are interconnected. The No.0 through No.7 vertical lines 232 of the No.0 secondary switch (SSW0) 212 of the No.0 line link frame (LLF0) 206 are connected with the No.0 vertical lines 233 of the No.0 primary switch (PSW0) 221 of each of the No.0 through the No.7 trunk link frames (TLF0 . . . TLF7) 207, respectively, by means of eight B-link junctors 203. In this pattern, the line link secondary switch vertical line number is in one-to-one correspondence with the trunk link frame number, while the line link secondary switch number and the trunk link primary switch number are the same. In each trunk link frame 207 of each of trunk link frames TLF0 . . . TLF7, the No.0 through the No.7 horizontal lines of the No.0 primary switch (PSW0) 221 are connected with the No.0 horizontal lines of the No.0 through the No.7 secondary switches (SSW0 . . . SSW7) 222, respectively, by means of 64 C-links 223. In this pattern also, the primary switch number conforms to the horizontal line number of each of the secondary switches 222. Additional details regarding the ferreed switches may be obtained by referring to the Bell System Technical Journal, supra.

The trunk link secondary switch vertical lines 234 are connected via the known party test and other test arrangement (not shown) with the trunks 109 named above except the multifrequency incoming register and the outgoing sender trunks 119, 115 and 116. Thus, the switching network 106 serves for 2,048 line-side terminals 108L and 512 trunk-side terminals 108T so that the switching network 106 has a concentration ratio of 4:1 and a traffic capacity of 200 Erlangs. Each of the line link primary switch vertical lines 231, each of the A-links, the B-links, and the C-links 213, 203 and 223, and each of the so-called D-lines (not shown here) of the trunks 109 extended near to the trunk link secondary switch vertical lines 234 are coupled via relay contact shown in FIGS. 5A and 5B, and leads 241, 242, 243, 244 and 245 to the idle test circuit 199. According to the instant invention, the line circuits 107 are connected via respective leads 261 to the line state circuits 137 (FIG. 6). Also, the A-links, the B-links, and the C-links 213, 203 and 223, respectively, are connected via leads 262, 263 and 264 with A-link, B-link and C-link state circuits 271, 272 and 273, respectively, which are shown as the link state circuits group 138 in FIG. 1A.

b. Start of Link Set

Referring to FIG. 6, let it be assumed that the No.0 central controller 150 (FIG. 1A) is in operation to initiate the link setting operation as presently explained. A No.0 network action start relay NAS0 (FIG. 3A) connected with a negative battery 310 is operated by the ground effective at relay amplifier 311.1. A plurality of No.0 central control connection relays, such as CC0, are operated by closure of relay contact $nas0^0$ ($nas0^1$, ...) and connects all leads between the operating central controller 150 (No.0) and the network common circuit 126 by closed contacts $cc0^0 \ldots cc0^4$. If No.1 central controller 150′ (FIG. 1B) takes part, relays, such as NAS1 and CC1, in FIG. 3A are operated to connect all leads between the operating central controller 150′ (No. 1) and the network common circuit 126 by the associated closed contacts, not shown, in FIG. 3A. Such lead connection is confirmed by the operating one of central controllers 150 and 150′ by the application of ground via the closed contact $cc0^0$ (or $cc1^0$, not shown) to a lead 311.2 as hereinafter mentioned in part (C) NETWORK CONTROLLER, section (b). It is to be noted that the data including the line equipment (the line link primary vertical line) number LEN, the line link frame junctor number LJEN, the trunk link frame junctor number T-JEN, and the trunk equipment (the trunk link secondary switch vertical line) number 10 are already stored in the network control registers 165 as hereinbelow explained in part (C) just identified.

c. Line Link Path Selection Relays

Referring further to FIGS. 3A and B, the line link frame 206 and the network common circuit 126 comprise a plurality of line link frame path selection relays which can be divided into 34 groups. A first relay group consists of relays 3LF0 . . . 3LF7 which, when operated, select the No.0 through the No.7 line link frames (LLF0 . . . LLF7) 206, respectively. A second relay group common to the No.0 through the No.7 line link frames (LLFO . . . LLF7) 206 consists of relays 3E0 . . . 3E3. A third relay group consists of relays 3A0 . . . 3A31 which are grouped into four subgroups 3A0 . . . 3A7, 3A8 . . . 3A15 (not shown), 3A16 . . . 3A23 (not shown), and 3A24 . . . 3A31. The four subgroups are operative when the relays 3E0 . . . 3E3 are operated, respectively. Seven similar groups are understood to be included in FIGS. 3A and B, but not shown therein for the purposes of simplification. An eleventh, a nineteenth, and a twenty-seventh group consist of relays 3B0 . . . 3B7, 3C0 . . . 3C7, and relays 3D0 . . . 3D7, respectively. Similar 21 groups of relays are understood to be included in FIGS. 3A and B, but not illustrated for the purpose of simplification. In compliance with the data stored in the network control registers 165 (FIG. 1B), one amplifier in each group of relay amplifiers 311.3 . . . 311.10, 311.11 . . . 311.14, 311.15 . . . 311.22, 311.23 . . . 311.30, 311.31 . . . 311.38, and 311.39 . . . 311.46 supplies ground to the corresponding one of the LF, the E, the A, the B, and C, and the D relays as subsequently explained.

Let it be assumed in FIG. 2 for this explanation that the aforementioned line equipment number identifies the No.0 line link frame LLF0, the No.0 line link primary switch PSW0, and the No.0 line link primary switch vertical line LV0, the line link junctor number specifies the No.0 line link secondary switch LLF SSW0 and the No.0 line link secondary switch vertical line JLVO. In response to the line link frame number LLFO, the 3LFO relay (FIG. 3A) is operated by ground supplied by the relay amplifier 311.3 via the closed contact $cc0^1$. In compliance with a portion of the line link primary switch vertical line number LV0, the relay 3E0 is operated by ground received via the relay amplifier 311.11 and the closed contact $cc0^9$. When both relays 3LF0 and 3E0 are operated, the 3A0 through 3A7, the 3B0 through 3B7, the 3C0 through 3C7, and the 3D0 through 3D7 relays for the No.0 line link frame LLF0 are operated because closed contacts $3lfo^0$ and $3e0^0$ extend the negative battery 310 to such relays. The 3A0 through 3A31 relays are selected by means of the coordinate-like arrangement of contacts $3lfo^0$, $3eo^0$, . . . , $3e3^0$, . . . , and $3lf7^0$, $3e0^7$, . . . , $3e3^7$. Therefore, in reply to the remaining portion of the line link primary switch vertical line number LV0, the eA0 relay is operated by ground received via the relay amplifier 311.15, the closed contact $cc0^{13}$, and a diode 320. In correspondence to the line link primary switch number LLFPSW0, the relay 3B0 is operated by ground received via the relay amplifier 311.23, the closed contact $cc0^{21}$, and a diode 360. In conformity to the secondary switch vertical line number JLV0, the relay 3C0 is operated by ground received via the relay amplifier 311.31, the contact $cc0^{29}$, and a diode 370. In compliance with the line link secondary switch number SSW0, the relay 3D0 is operated by ground received via the relay driver 311.39, the closed contact $cc0^{37}$, and a diode 380.

d. Trunk Link Path Selection Relays

Referring to FIG. 4, the trunk link frame path selection relays can be divided into 33 groups. A first group of such relays consists of 4TF0 . . . 4TF7 relays which, when operated, select the No.0 through No.7 trunk link frames 207, respectively. Among second through thirty-third similar relay groups, the second, the tenth, the eighteenth, and the twenty-sixth groups are illustrated consisting of relays 4A0 . . . 4A7, 4B0 . . . 4B7, 4C0 . . . 4C7, and 4D0 . . . 4D7, respectively. These relays are operated via negative battery 310 in accordance with the data stored in the network control registers 165 (FIG. 1A).

Let it be assumed in FIG. 2 for this explanation that the aforementioned trunk link junctor number identifies the No.0 trunk link frame TLF0, the No.0 trunk link primary switch TLF PSW0, and the No.0 trunk link primary switch vertical line TLF JTV0, the trunk equipment number specifies the No.0 trunk link secondary switch SSW0 and the No.0 trunk link secondary switch vertical line TV0. In response to the trunk link frame number TLF0, the 4TF0 relay is operated by ground received via the relay amplifier 411.47 and the closed contact $cc0^{45}$. In reply to the primary switch vertical line number JTV0, the 4A0 relay is operated by ground received via the relay amplifier 411.55, the closed contact $cc0^{53}$, and a diode 420. In compliance with the trunk link primary switch number TLF PSW0 the 4B0 relay is operated by ground received via the relay amplifier 411.63, the contact $cc0^{61}$, and a diode 430. In conformity to the trunk link secondary switch vertical line number TV0, the 4C0 relay is operated by ground received via the relay amplifier 411.71, the closed contact $cc0^{69}$, and a diode 440. In correspondence to the trunk link secondary switch number SSW0, the 4D0 relay is operated by ground received via the relay amplifier 411.79, the closed contact $cc0^{77}$, and a diode 450.

e. Speech Path and Control Wire

FIG. 5A shows two-wire speech paths (A and B lines) and control wires (C lines) of the No.0 line link frame LLF0, whose primary switch (PSW0) vertical lines 231 are connected with 256 line circuits 107, respectively, and whose secondary switch (SSW0) vertical lines 232 are connected with the 64 B-link junctors 203, respectively. When the 3A0, the 3B0, the 3C0 and the 3D0 relays are operated, the so-called C-line 501C of the No. 0 vertical line LV0 of the No.0 line link primary switch LLF PSW0 is connected via closed $3a0^0$, $3b0^0$ and $cc0^{85}$ contacts and lead 241 with the idle test circuit 199 (FIG. 5A). Also, the so-called C-line 506C of the A-link 213 connected with the C line of the No.0 horizontal line of the No.0 primary switch PSW0 is connected via closed contacts $3d0^0$, $3b0^1$ and $cc0^{86}$ and the lead 242 with the idle test circuit 199. The state circuit leads 262 (FIG. 2) are connected with the respective C lines such as, for example, line 506C of the links 213.

FIG. 5B shows two-wire speech paths and control wires of the No.0 trunk link frame TLFO, whose primary switch (PSW0) vertical lines 233 are connected with the 64 B-links 203, respectively, and whose secondary switch (SSW0) vertical lines 234 are connected with the miscellaneous trunks 109, respectively. When the 4A0, the 4B0, the 4C0, and the 4D0 relays in FIG. 4 are operated, the C line 511C of a junctor connected with the C line of the No.0 vertical line 233 of the No.0 trunk link primary switch TLF PSW0 is connected via closed contacts $4b0^0$, and $4a0^0$, and $cc0^{87}$ (FIG. 5A) and the lead 243 with the idle test circuit 199. Also, the C-line 516C of the No.0 horizontal line of the No.0 trunk link primary switch PSW0 is connected via closed contacts $4b0^8$ and $4d0^0$ (FIG. 5B) and $cc0^{88}$ and the lead 244 with the idle test circuit 199 in FIG. 5A. In addition, the D-line 521D of the trunk 109 is connected via closed contacts $4c0^0$ and 4d0 (FIG. 5B) and $cc0^{89}$ and the lead 245 to the idle test circuit 199 in FIG. 5A.

f. Line Circuit 107

Referring to FIG. 6, a line circuit 107 comprises A, B, and C lines 602A, 602B and 602C, respectively, connected with a predetermined one of the vertical lines 231 of a majority of the line link primary switches 211 in FIG. 2. The A and the B-lines 602A and 602B have an A and a B-branch lines 603A and 603B, respectively. The A-branch line 603A terminates at negative battery 604. The B-branch line 603B is connected to lead 261 and to first and second further branch lines 603B1 and 603B2 which latter two lines are extended to ground and a positive battery 605, respectively. The C-line 602C includes the CO relay 6CO connected with another positive battery 606 which may also be the positive battery 605.

When the subscriber's set 101 is in the on-hook state and the line circuit 107 connected thereto is idle, ground is present on the lead 261 and a positive potential from the positive battery 606 is present via the operating winding of relay 6CO on the C-line 602C. When the subscriber goes off-hook to originate a call, a negative potential from the negative battery 604 is applied to the lead 261. The positive potential remains on the C-line 602C. When the requested one of the trunks 109 is seized in compliance with the originated call, ground then placed on the seized trunk 109 is extended via the trunk link frame 202 in FIG. 2, the junctors 203, and the line link frame 201 to the C-line 602C. This ground serves to energize the CO relay 6CO to open contacts $6co^0$ and $6co^1$ and to close contact $6co^2$ whereby a positive potential is applied to the lead 261 for a purpose that is presently mentioned.

When a call reaches the line circuit 107 via the line link frame 201 while the subscriber's set is in the on-hook state, ground placed on the C-line 602C from one of the intraoffice trunks IOT 111 or one of the incoming trunks 117 and 118 operates the CO relay 6CO to apply the positive potential to lead 261 as just stated.

g. Pulse Path

FIGS. 7 and 8 show pulse path closing coil arrangements of the No.0 line and the No.0 trunk link frames LLF0 and TLF0, respectively, together with a No.0 line link, a No.1 line link, a No.0 trunk link, and a No.1 trunk link pulser 700, 701, 800 and 801 for such arrangements. When the idle state of the calling subscriber's line circuit 107 in FIGS. 2 and 6 is confirmed by the idle test circuit 199, ground received via a relay amplifier 711.87 is applied via the closed contact $cc0^{90}$ to the operating winding of pulser driving relay 7PA0. Operation of the relay 7PA0 is confirmed by the operating central controller 150 in FIG. 1B via contacts $pa0^0$ and $cc0^{91}$ and a lead 711.88. Other closed contacts $pa0^1$ and $pa0^2$ supply ground to trigger the No.0 line and the No.0 trunk link pulsers 700 and 800. Leads 501C and 602C form a single lead having portions appearing in FIGS. 5A and 6, respectively.

The triggered line link pulser 700 supplies a pulse current in a circuit including the contact $cc0^{92}$, a lead 711, a closed contact $3a0^8$, eight driving coils of the No.0 vertical line LVO of the No.0 line link primary switch LLF PSW0, a lead 712, 32 driving coils of the No.0 horizontal line of the switch PSW0, A link 213, a closed contact $3b0^2$, eight driving coils of the No.0 horizontal line of the No.0 line link secondary switch LLFSSWO, a lead 713, eight driving coils of the No.0 vertical line JLVO of the switch SSW0, closed contacts $3c0^0$ and $3d0^8$, a lead 714, and the closed, contact $cc0^{93}$ back to the pulser 700. Thus, as it is well known, the three ferreed contacts at the cross-points of the No.0 vertical and the No.0 horizontal lines of the No.0 primary and the No.0 secondary switches PSW0 and SSW0, respectively, close in the line link frame 201 (FIG. 2) while the contacts at the remaining cross-points thereof continue in the break state thereby obviating other connections. In the like manner, the triggered No.0 trunk link pulser 800 supplies a pulse current in a circuit including the circuit components having the reference numerals and alphabets corresponding to those for the line link pulser 700, to close the ferreed contacts at the cross-points of the No.0 vertical and the No.0 horizontal lines of the No.0 primary and the No.0 secondary switches PSW0 and SSW0, respectively, close in the trunkline frame 202 while the remaining cross-points thereof continue in a break state to obviate other connections. Ground potential supplied via the pulser 700, the closed contact $cco^{94}$ and the lead 711.89 indicates the operation of the latter pulser to the central controller 150 in FIG. 1B. The operation of the pulser 800 is indicated to the central controller 150 by ground applied via a closed contact $cc0^{97}$ to lead 811.90.

It is noted here that the line circuit 107, when connected with no trunks 109, supplies a positive potential from battery 606 in FIG. 6 to the C-lines 602C and 501C of the latter line circuit and the line link primary switch (PSW0) vertical line 231 in FIG. 5A. When the A-link 213, the B-link 203, and the C-link 223 in FIGS. 5A and B are idle (when no ferreed contacts are closed), no potential is placed on the C-lines 506C, 511C and 516C in FIGS. 5A and B. Each trunk 109 supplies, in the manner described below, a negative potential to the D-line 521D (FIG. 5B) when the former is idle (roughly speaking). As will appear later, the idle test circuit 199 (FIG. 5A) checks these potentials to detect the idle states of the line circuit 107, the A-link 213, the B-link 203, the C-line 223, and a particular one of the trunks 109 specified by the combination of the path selection relays. The idle test circuit 199 also activates the specified one of trunks 109 by sending a ground pulse via lead 245 to the D-line 521D in the manner explained hereinafter.

When the specified one of the trunks 109 is activated, ground is supplied in the manner later described to the D-line 521D (FIG. 5B) of such trunk 109 and to the C-lines 516C, 511C, 506C, and 501C (501C being an extension of C-line 602C) of the C-link 223, the B-link 203, the A-link 213, and the line circuit 107. This is checked in the manner explained below in part (C) NETWORK CONTROLLER, subsection (b), by the idle test circuit 199, which thereby detects completion of the connection between the selected one of the trunks 109 and the subscriber's set 101. Having so detected, the operating central controller 150 removes ground supplied via the relay amplifier 311.1 thereby eventually to release the contacts of the CCO relay to disconnect the network common circuit 126 therefrom. Even after the termination of the conversation, the particular ferreed contacts remain in the closed state until a different combination of the speech path selection relays is operated to complete a different speech path. This extends the positive potential of the positive battery 606 to the C-lines 506C, 511C, and 516C of the A-link 213, the B-link 203, and the C-link 223 even after such links are released from service.

B. TRUNKS and REGISTER SENDER LINK a. General

FIGS. 9 through 16, inclusive, disclose circuit diagrams of some of the trunks 109 shown in FIG. 1A and described hereinafter. The intraoffice trunks (IOT) 111, the outgoing trunks (OGT) 114, the dial pulse and the multifrequency incoming trunks (DPICT and MFICT) 117 and 118 and the like are concerned with speech transmission and accompany IOT state circuits (IOT SC) 901, OGT state circuits (OGT SC) 1101, DPICT and MFICT state circuits (DPICT SC and MFICT SC) 1401 and 1501, and similar trunk state circuits, respectively. The tone trunks (TNT) 113 and similar trunks, such as talky trunks, serve to send the busy tone and other service signals to the calling subscriber and may accompany simple trunk state circuits explained hereinafter. A talky trunk supplies a preselected and prerecorded talking announcement such, for example, as —the number has been changed—, —the phone has been disconnected—, —incorrect dialing, please repeat your call—, and the like. The originating register trunks (ORT) 112, the multifrequency incoming register trunks (MFIRT) 119, the dial pulse and the multifrequency outgoing sender trunks (DPOST and MFOST) 115 and 116, and others are involved in receiving or transmitting numerical signals and accompany ORT state circuits (ORT SC) 1001, MFIRT state circuits (MFIRT SC) 1601, DPOST and MFOST state circuits (DPOST SC and MFOST SC) 1201 and 1301, and like trunk state circuits, respectively. The trunks 109 have a common negative battery 906. The OGT 114 and the MFICT 118 have a common positive battery 1107. Some trunks, such as the IOT 111, the DPICT 117 and the MFICT 118 have a common ring-back tone generator 9RBT and a common ringing generator 9RG. The tone trunks (TNT) 113 have a common busy tone generator (not shown). The trunks (ORT) 112 have a common dial tone generator 10DT. The trunk state circuits 901 . . . 1601, and so on, are identified as the trunk state circuits (TKSC) 139 in FIG. 1A. The trunks 109 are of the known construction, except suitable circuit means are provided for connecting the respective trunks 109 with the corresponding state circuits as above indicated.

b. Intraoffice Trunk (IOT) 111

Figure 9:
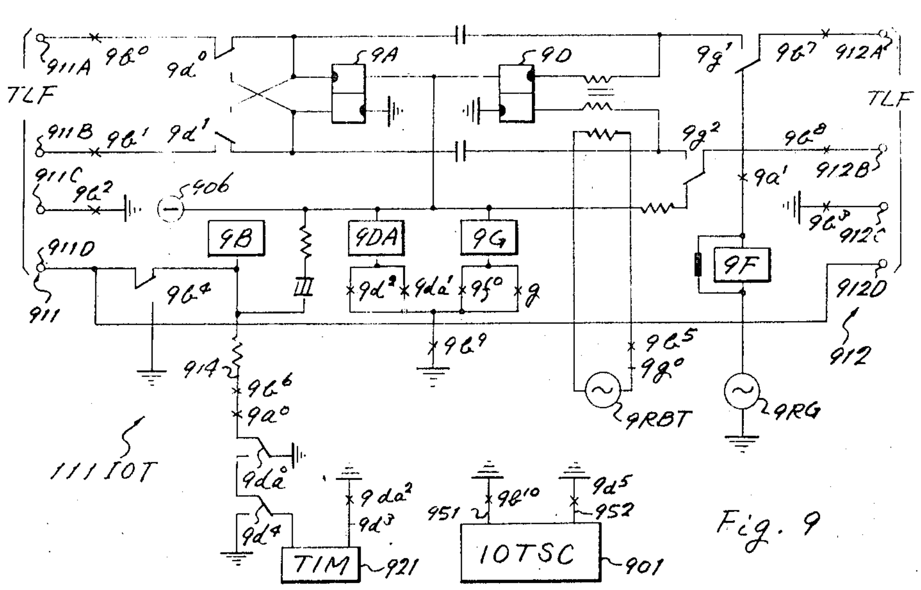

FIG. 9 shows each intraoffice trunk (IOT) 111 comprising an input 911 and an output 912 connected with two particular vertical lines 234 of the trunk link secondary switchs 222 in FIGS. 2 and 6, for example. The input 911 includes input terminals connected in corresponding lines 911A, 911B, 911C and 911D, respectively. The lines 911A, B, C and D may be considered extensions of the lines A, B, C and D, respectively, in FIG. 5B. The output 912 comprise output terminals connected in corresponding lines 912A, 912B, 912C and 912D, respectively. The trunk (IOT) 111 provides an information channel extending from a local calling subscriber to a local called subscriber.

It was previously mentioned that prior to the seizing of the trunk (IOT) 111, the idle test circuit 199 (FIG. 5A) determines the busy/idle state of a trunk (IOT) 111 by detecting the potential on the input D-line 911D of such trunk (and thereby the potential on line 912D) so that when such tested trunk is idle, the trunk (IOT) 111 is activated to busy by the idle test circuit 199 which now puts ground on the lines 911D and 912D via the line 521D in FIG. 5B as previously noted. As a result of such activation, the B-relay 9B is operated by negative battery 906 to extend the connection from the calling subscriber's set 101 (FIG. 3) via the switching network 106 (FIGS. 2, 5A and B), the input 911, and closed contacts $9b^0$ and $9b^1$ to the A-relay 9A for supervising the calling subscriber's loop. Upon the operation of the B-relay 9B, closed contacts $9b^2$ and $9b^3$ place ground via the respective C-lines 911C and 912C on the C-line 602C of the calling subscriber's line circuit 107 (FIG. 3) and the corresponding C-line 602C in the called subscriber's line, not shown. Also, a transfer contact $9b^4$ places ground on the D-lines 911D and 912D. In addition, the audible ringing signal or the ringing tone is inductively transmitted from the ring-back tone generator 9RBT via contacts $9g^0$, $9b^5$, $9b^0$, and $9b^1$ and the switching network 106 just identified to the calling subscriber's set 101. Upon operation of the A-relay 9A, the B relay 9B is held in the operated state by a self-holding circuit 914 via contacts $9b^6$, $9a^0$ and $9da^0$ connected to ground. At the same time, the ringing current is delivered from the ringing generator 9RG via a ringing trip relay or F-relay 9F, contacts $9a^1$, $9g^1$, and $9b^7$ and the switching network 106 (FIGS. 2, 5A and B), to the ringing circuit (not shown) of the called subscriber set 101. The ringing current returning via the last-mentioned switching network 106, contacts $9b^8$ and $9g^2$, and the negative battery 906 to ground.

When the called subscriber answers such ringing current by going off-hook, the F-relay 9F is operated via the current of the ringing generator 9RG, the contacts $9a^1$, $9g^1$, and $9b^7$, the switching network 106, the direct current circuit now formed through the called subscriber's set 101, not shown, again the switching network 106, and the contacts $9b^8$ and $9g^2$, to the negative battery 906. Upon operation of the F-relay 9F, the G-relay 9G is operated via contacts $9b^9$ and $9f^0$. Upon the operation of the G-relay 9G, the F-relay 9F and the ringing generator 9RG are disconnected from the called subscriber's loop by the contacts $9g^1$ and $9g^2$, and at the same time the D-relay 9D is connected with this loop to supervise the same and to reverse the polarity of the speech current supplied from the negative battery 906 to the calling subscriber via contacts $9d^0$ and $9d^1$. Also, at this time the transmission of the audible ringing tone to the calling subscriber is terminated by the contact $9g^0$. Coincidentally, an auxiliary relay or the DA relay 9DA is operated via contacts $9b^9$ and $9d^2$.

When the calling subscriber hangs up to go on-hook, the A-relay 9A returns to the unoperated state due to the break of the direct current circuit at the latter's set 101. This restores in turn the B relay 9B to the unoperated state by the contact $9a^0$. Upon restoration of the B-relay 9B, the relays 9D, 9DA, and 9G are restored to the normal state.

When the called subscriber hangs up to go on-hook, the D-relay 9D and the polarity of the speech current to the calling subscriber are restored to normal. At this moment, however, the DA-relay 9DA is still operated via a self-holding contact $9da^1$. Therefore, a restoration timing circuit (TIM) 921 is set into operation by ground supplied thereto via contacts $9da^2$ and $9d^3$ and by the negative battery 906 via the contacts $9b^6$, $9a^0$, $9da^0$ and $9d^4$. The restoration timing circuit 921 removes the ground from the self-holding circuit 914 after the lapse of a predetermined time interval in a known manner to restore the B-relay 9B to the normal state. Therefore, the intraoffice trunk (IOT) 111 returns to the idle state even if the calling subscriber does not hang up.

The intraoffice trunk IOT state circuit 901 is connected with a first lead 951 which is supplied with ground and no definite potential while the calling subscriber's loop is and is not in the closed state, respectively. The IOT state circuit 901 is also connected with a second lead 952 on which ground and no specific potential is placed when the called subscriber's loop is and is not in the closed state, respectively. Thus, the IOT state circuit 901 monitors whether the calling and the called subscriber's loop are in the closed state or not.

c. Originating Register Trunk (ORT) 112

Figures 10, 12, 13, 16:
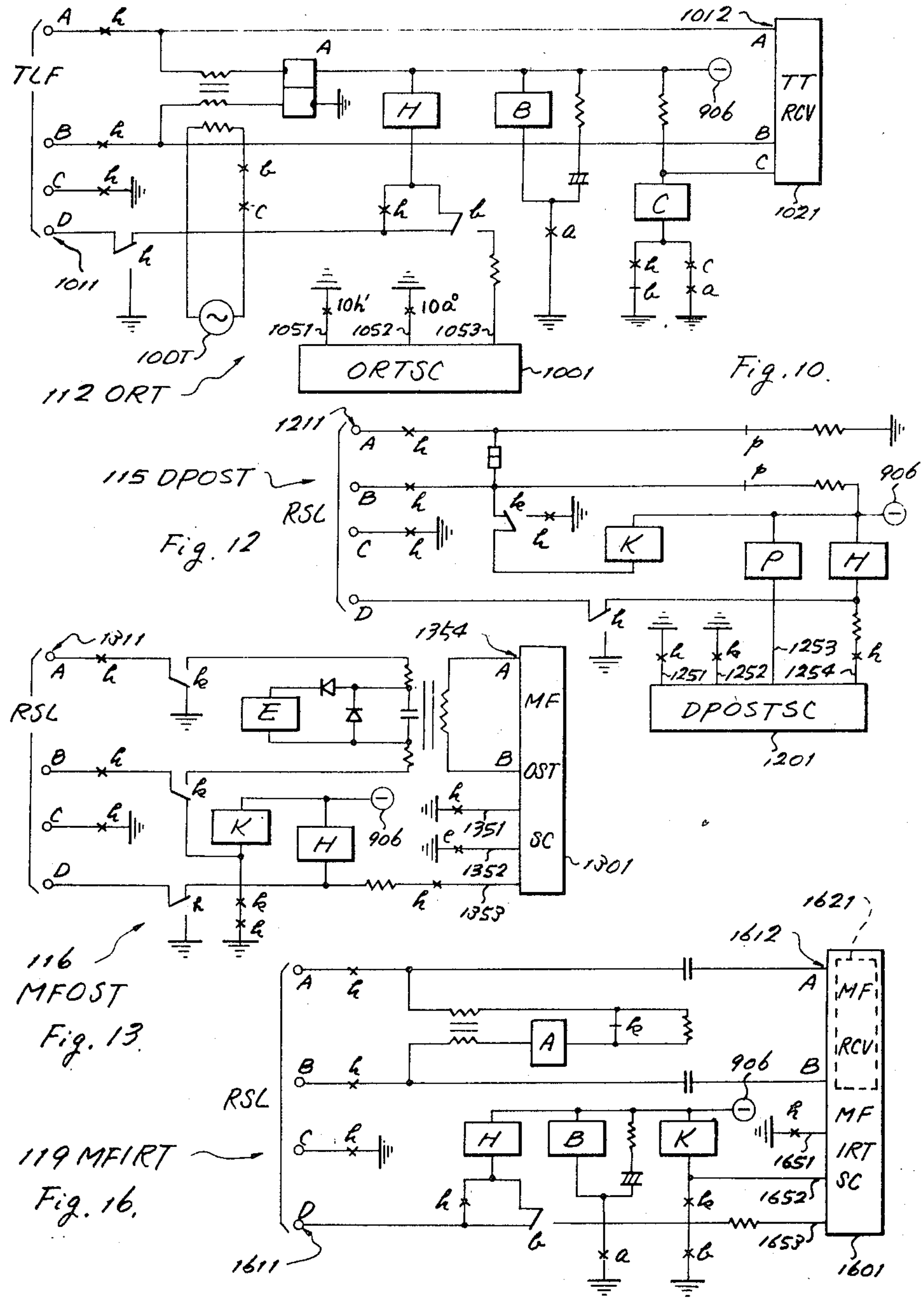

FIG. 10 shows each outgoing register trunk (ORT) 112 comprising an input 1011 connected with a prescribed trunk link secondary switch vertical line 234 (FIGS. 2 and 5A and B) and an output 1012 connected to a pushbutton receiver (TTRCV) 1021. Each trunk (ORT) 112 initiates and terminates the transmission of the dial tone generated by the dial tone generator 10DT to the calling subscriber and serves to transmit the dial pulses received from a calling subscriber of the type to the ORT state circuit 1001, which is connected with first, second, and third leads 1051, 1052 and 1053. Also, each trunk (ORT) 112 serves to transfer the pushbutton signals sent from a calling subscriber of the type to the touch tone receiver 1021.

When trunk (ORT) 112 is activated by a ground pulse supplied to the input D line from the idle test circuit 199 in FIG. 5A, the H relay is operated to operate in turn the A and the C relays and thereafter the B relay. The second lead 1052 is supplied with ground via contact $10a^0$ as soon as the A relay is connected with the calling subscriber's set 101 in FIGS. 1A and 6. When sent from the calling subscriber, the dial pulses intermittently restore the A relay which repeatedly opens contact $10a^0$ in the second lead 1052. The first lead 1051 is supplied with ground via contact $10h^1$ while the H relay is in the operated state. The third lead 1053 receives ground from its state circuit 1001 in a manner explained below.

d. Outgoing Trunk (OGT) 114

Figure 11:
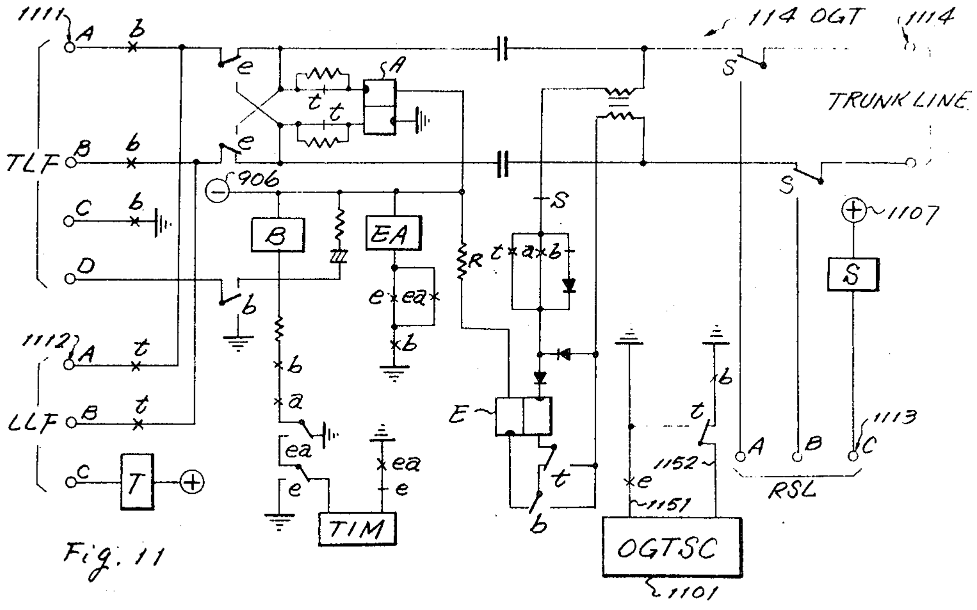

FIG. 11 shows each outgoing trunk (OGT) 114 comprising three different inputs 1111, 1112 and 1113 connected with a predetermined vertical line 234 of the trunk link secondary switch 222 (FIG. 2), a prescribed vertical line 231 of the line link primary switch 211 (FIG. 2) and the register sender link 120, respectively. The trunk (OGT) 114 further comprises outgoing terminal 1114 connected with a particular trunk line 102 (FIG. 1A). This outgoing trunk (OGT) 114 serves to extend an information channel from a local calling subscriber to a called subscriber in a distant office or from a calling subscriber in the distant office via the switching network 106 (FIG. 1A) to a called subscriber in still another distant office. The trunk (OGT) 114 may be used with the trunklines 102 connected to dial pulse and multifrequency signaling facilities. The OGT state circuit 1101 is connected with first and second leads 1151 and 1152.

e. Dial Pulse Outgoing Sender Trunk (DPOST) 115

FIG. 12 shows each dial pulse outgoing sender trunk (D-POST) 115 comprising an output 1211 connected with the register sender link (RSL) 120. The DPOST state circuit 1201 is connected with first, second, third, and fourth leads 1251, 1252, 1253 and 1254.

f. Multifrequency Outgoing Sender Trunk (MFOST) 116

FIG. 13 shows each multifrequency outgoing sender trunk (MFOST) 116 comprising an output 1311 connected with the register sender link 120. The MFOST state circuit 1301 is connected with first, second, third, and fourth and fifth leads 1351, 1352, 1353 and 1354.

g. The Dial Pulse Incoming Trunk (DPICT) 117

Figures 14, 15:
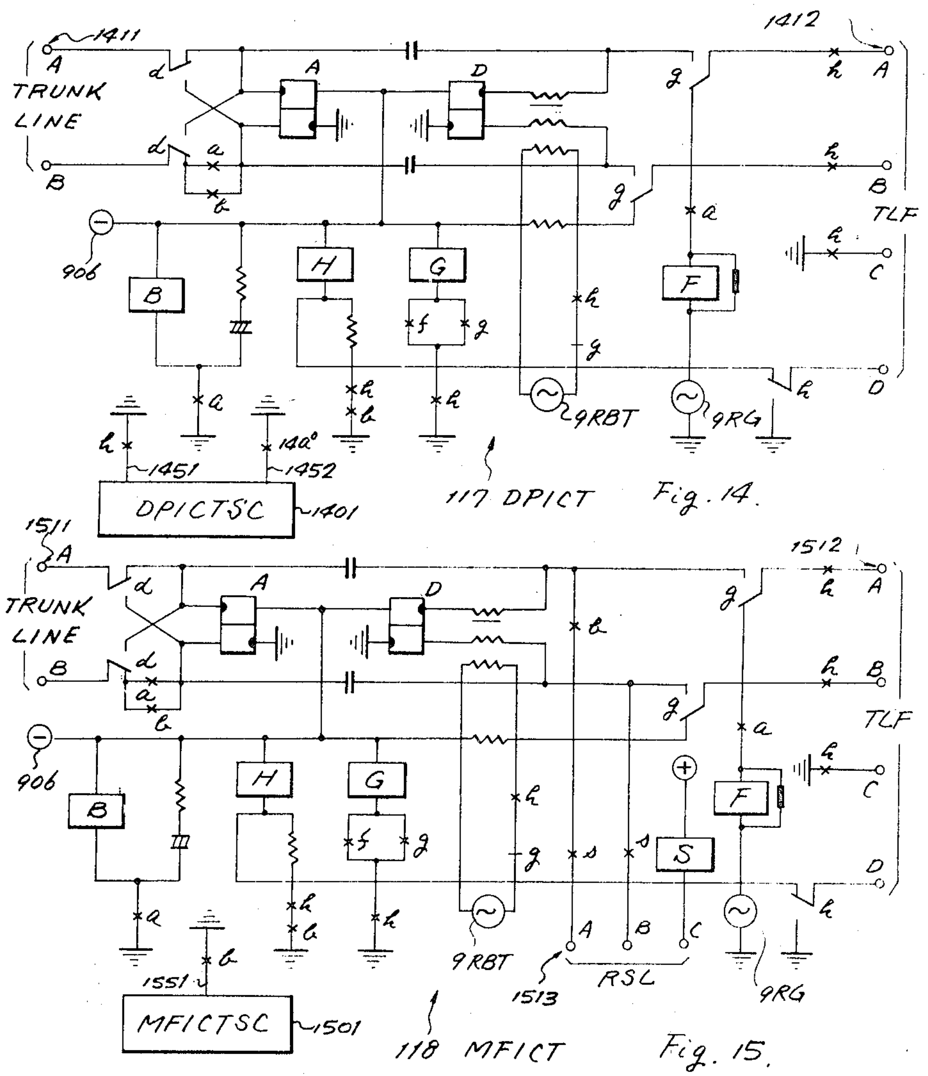

FIG. 14 shows each dial pulse incoming trunk (DPICT) 117 comprising incoming terminals 1411 connected with a particular trunk line 102 and an output 1412 connected with a predetermined one of the trunk link (TLFO . . . 7) secondary switch (SSWO . . . 7) vertical lines 234. Each trunk (DPICT) 117 sends the dial pulses received from a calling subscriber of another office to the DPICT state circuit 1401 which is connected with first and second leads 1451 and 1452. Each trunk (DPICT) 117 also serves to provide an information channel extending from a calling subscriber of another office to a local called subscriber or to a called subscriber in still another office via the switching network 106 in FIG. 1A.

h. Multifrequency Incoming Trunk (MFICT) 118

FIG. 15 shows each multifrequency incoming trunk (M-FICT) 118 comprising incoming terminals 1511 connected with a trunkline 102 and two outputs 1512 and 1513 connected with a trunk link (TLFO . . . 7) secondary switch (SSWO . . . 7) vertical line 234 and with the register sender link 120, respectively. Each trunk (MFICT) 118 enables each multifrequency incoming register trunk (MFIRT) 119 to receive the multifrequency incoming signal and to provide an information channel from a calling subscriber of another office to a local called subscriber or to a called subscriber of still another office via the switching network 106 in FIG. 1A. The MFICT state circuit 1501 is connected with a lead 1551.

i. Multifrequency Incoming Register Trunk (MFIRT) 119

FIG. 16 shows each multifrequency incoming register trunk (MFIRT) 119 comprising an input 1611 connected with the register sender link 120 and an output 1612 connected with a multifrequency signal receiver (MF RCV) 1621 provided in an MFIRT state circuit 1601, the latter being also connected with first, second, and third leads 1651, 1652, and 1653. Each trunk (MFIRT) 119 serves to receive the multifrequency signal sent from a calling subscriber at another office.

j. Register Sender Link (RSL) 120

The register sender link 120 (FIG. 1A) is similar to the line link frames (LLFO...7) 206 (FIGS. 2 and 5A) in construction and operation and has a concentration ratio of 4:1 in the particular example of the instant description. The register sender link 120 serves only for the purpose of reducing the number of trunks DPOST, MFOST and MFIRT 115, 116 and 119, respectively. It is therefore possible to assume, for the purpose of describing the instant invention, that trunks DPOST 115 and MFOST 116 are directly connected with trunks OGT 114 and trunks MFIRT 119 with trunks MFICT 118. In response to an outgoing call from a local subscriber, an outgoing trunk (OGT) 114 (FIG. 1A) is activated by ground placed on the first input D line (521D in FIG. 5B for example) by the idle test circuit 199 in FIG. 5A. Also, a dial pulse outgoing sender trunk (DPOST) 115 or a multifrequency outgoing sender trunk (MFOST) 116 is activated, where the H relay is operated by ground placed on the D line in FIG. 12 or FIG. 13 by the idle test circuit 199. Meanwhile, the trunk (OGT) 114 and the trunk (DPOST) 115 or the trunk (MFOST) 116 are intercoupled by the register sender link 120. Therefore, the ground on the outgoing sender trunk C line (FIG. 12 or 13) is extended to the trunk (OGT) S relay which connects the trunkline 102 via the OGT output 1114 and the register sender link 120 with the A and the B lines of either the outgoing dial pulse sender trunk 115 (FIG. 12) or the outgoing multifrequency sender trunk 116 in FIG. 13. The A line of the trunkline 102 thus receives ground, which is extended to the incoming A line of the equivalent trunk (DPICT) 117 or the trunk (MFICT) 118 in the other office, not shown.

The equivalent incoming trunk A relay (FIG. 14 or 15) is now operated to operate the B relay and to place ground via the incoming B line, the trunkline 102, the outgoing trunk B line, and the register sender link 120, back to the B line of the outgoing sender trunk 115 (FIG. 12) or 116 (FIG. 13) to operate the K relay therein. In the trunk (DPOST) 115, the P (FIG. 12) relay is operated via lead 1253 by the DPOST state circuit 1201 (FIG. 23) in accordance with the dial pulses to convey the signal current via the contacts p, the equivalent incoming trunk A relay, and its contact $14a^0$, to the DPICT state circuit 1401 of the other office, not shown. As for the trunk (MFOST) 116, a trunk (MFIRT) 119 is activated in the other office and is coupled with the trunk (MFICT) 118 by the register sender link 120 of the latter office. The equivalent negative potential of the battery 906 in the ICT 118 is thus extended via the D relay in this trunk 118, the register sender link 120 to the A relay of the MFIRT 119. Therefore, the incoming trunk D relay is operated to reverse the polarity of the speech current and thereby to operate, via the trunkline 102, the OGT outgoing terminals 1114, the register sender link 120, and the outgoing sender trunk output 1311, the outgoing sender trunk E relay. Now, the MFOST state circuit 1301 sends out the multifrequency signal current to the multifrequency signal receiver 1621 of the other office, not shown.

When the signal current transmission ends, ground given from the trunk (DPOST) or the trunk (MFOST) state circuit 1201 or 1301 to the self-holding contact of the outgoing sender trunk H relay is changed to the negative potential to restore the H relay. This restores the outgoing sender trunk 115 (FIG. 12) or 116 (FIG. 13) and the connection between the register sender link 120 and the outgoing trunk 114 (FIG. 11). As for the trunk (MFICT) 118 and the trunk (MFIRT) 119 of the other office, not shown, the incoming register H relay is also restored to normal to disconnect the register sender link 120 from the trunk (MFICT) 118. This restores the D relay of the trunk (MFICT) to normal. Thus, ground is placed at the present moment on the outgoing B line of the trunk (OGT) 114 (FIG. 11) from the incoming trunk (D-PICT) 117 or (MFICT) 118 of the other office. After the called subscriber goes off-hook, the polarity of the speech current flowing through the trunkline 102 (FIG. 1A) is reversed due to the operation of the incoming trunk D relay in the other office. Therefore, the outgoing trunk E relay is set into operation.

In compliance with a transit call, a ground connection is extended from a trunkline 102 (FIG. 1A) via an incoming trunk (DPICT) 117 or (MFICT) 118 and the switching network 106 to the input 1112 of trunk (OGT) 114 in FIG. 11. As a consequence, the T relay is operated. Meanwhile, either trunk (D-POST) 115 or trunk (MFOST) 116 is activated. Also, the register sender link 120 intercouples the activated outgoing trunk (OGT) 114 with the activated outgoing sender trunk (DPOST) 115 or (MFOST) 116. The related trunk (DPICT) 117 or (MFICT) trunk 118 and the trunk (MFIRT) 119 operate in the manner mentioned above.

An incoming call sent via the trunkline 102 from another office places ground on the incoming A line of either trunk (DPICT) 117 or trunk (MFICT) 118 connected with the latter trunkline 102. The related trunks operate in the manner mentioned above.

When the calling subscriber hangs up, the outgoing trunk A relay (FIG. 11) is released to restore the B relay. As a result, a direct current flows to the negative battery 906 (FIG. 11), via a resistor R, the operating windings of the E relay, rectifiers, the outgoing terminals 1114, the trunkline 102, the incoming terminals 1411 or 1511, a half-winding of the corresponding incoming trunk A relay and ground for holding the E relay. Due to the resistor R in FIG. 11, the incoming trunk A, B, H, G and D relays in trunk (DPICT) 117 or (MFICT) trunk 118 are released to place negative potential on the A line of the trunk (OGT) 114 outgoing terminals 1114 and to remove any potential from the B line of the latter outgoing terminals. This restores the outgoing trunk E relay to normal.

When the called subscriber hangs up, the incoming trunk D relay in trunk DPICT 117 or (MFICT) 118 is released to restore the polarity of the speech current therein to normal. The incoming trunk A relay in the latter respective trunks is held in the operated state. On the other hand, the resulting negative and ground potentials on the A and the B lines of the trunk (OGT) outgoing terminals 1114 no longer holds the E relay operated. Thus, the trunk (OGT) 114 is restored to normal by the function of the restoration timing circuit (TIM), except the direct current flows through the route mentioned above for holding the E relay. The resulting release of the incoming trunk A relay in trunk (DPICT) or (MFICT) in FIG. 14 or FIG. 15, disconnects the incoming terminals 1411 or 1511 from ground. This completely restores the outgoing trunk (OGT) 114 in FIG. 11 and the incoming trunks (DPICT) 117 or (MFICT) 118 in FIGS. 14 or 15 to the normal state.

III. NETWORK STATE CIRCUIT (NWSC)

a. General

Referring to FIG. 17, the line state circuits (LSC) 137 in FIGS. 1A and 2 are grouped into No.0 and No.1 line state circuit group 1700 and 1701, respectively. The A, the B, and the C-link state circuits (LKSC) 271, 272, and 273 as in FIG. 1A and the trunk state circuits (TKSC) 139 form the respective state circuits groups. The address register 186 (FIG. 33) supplies to the Nos.0 and 1 line, the B link, and the trunk state circuit groups 1700, 1701, 272 and 139 the address information signals AINF (FIG. 33) via an address register information gate 1706 supplied with a logic "1" address register information gate signal GAB from the pertinent one of the command execution wired logics 170 (FIGS. 1A, 39, 40, 41 and 43) and via No.0 line, No.1 line, B link, and trunk state circuit address information gates 1710, 1711, 1712 and 1713, respectively, supplied with the respective logic "1" Nos.0 and 1 line, B link, and trunk state circuit group selection signals GLSCO (FIG. 39), GLSC1 (FIG. 39), GLKSC (FIG. 41), and GTKSC (FIG. 40) from the pertinent one of the wired logics 170 (FIGS. 1A, 39, 40 and 41). Likewise, the index register 162 (FIGS. 1B and 31) supplies the index address information signals AINFX through the last-mentioned gates to the network state circuit 139 via index address information gate 1716 supplied with the index address information gate signal GAX from the pertinent one of the wired logics 170 (FIGS. 1B and 50A). Network control registers 165 (0 and 1 in FIG. 31) supplies to the A and the C link state circuit groups 271 and 273 the A and C link address information signals AINFAC (FIG. 52) via an A and a C link state circuit address information gate 1718 and 1719 supplied with the corresponding one of logic "1" A link and C-link state circuit group selection signals GLKSCA and GLKSCC produced in FIG. 41. The address information signals AINF, AINFX and AINFAC consist of logic "0" and "1" or the obverse and the reverse signals $S_0$, $\bar{S}_0$, $S_1$, $\bar{S}_1$, ..., $S_9$ and $\bar{S}_9$. Each of the Nos.0 and 1 lines, the A, the B, and the C links, and the trunk state circuit groups 1700, 1701, 271, 272, 273 and 139 comprises a wiring circuit 1720 supplied with the obverse and the reverse signals for rearranging these signals in such a manner that a No. 0 group $\bar{S}_0$, $\bar{S}_1$, . . . , and $\bar{S}_9$, a No.1 group $S_0$, $\bar{S}_1$, $\bar{S}_2$, . . . , and $\bar{S}_9$, a No.2 group $\bar{S}_0$, $S_1$, $\bar{S}_2$, . . . , and $\bar{S}_9$, a No.3 group $S_0$, $S_1$, $\bar{S}_2$, . . . , and $\bar{S}_9$, a No.4 group, . . . , and a No.1023 group $S_0$, $S_1$, . . . , and $S_9$ may be supplied to a No.0, a No.1, a No.2, . . ., and a No.1023 (if any) individual state circuits, respectively, of the state circuit group. It will thus be understood that the central controller 150 designates one of the individual line, link, and trunk state circuits at a time.

Figure 39:
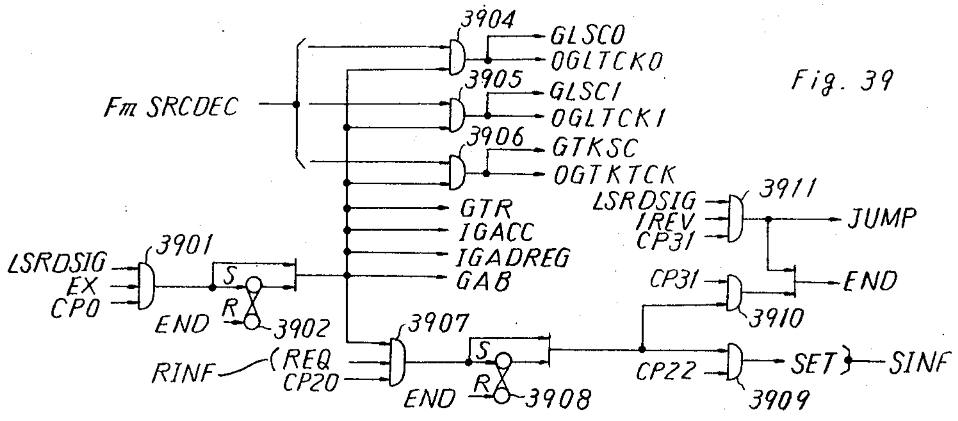
Figure 41:
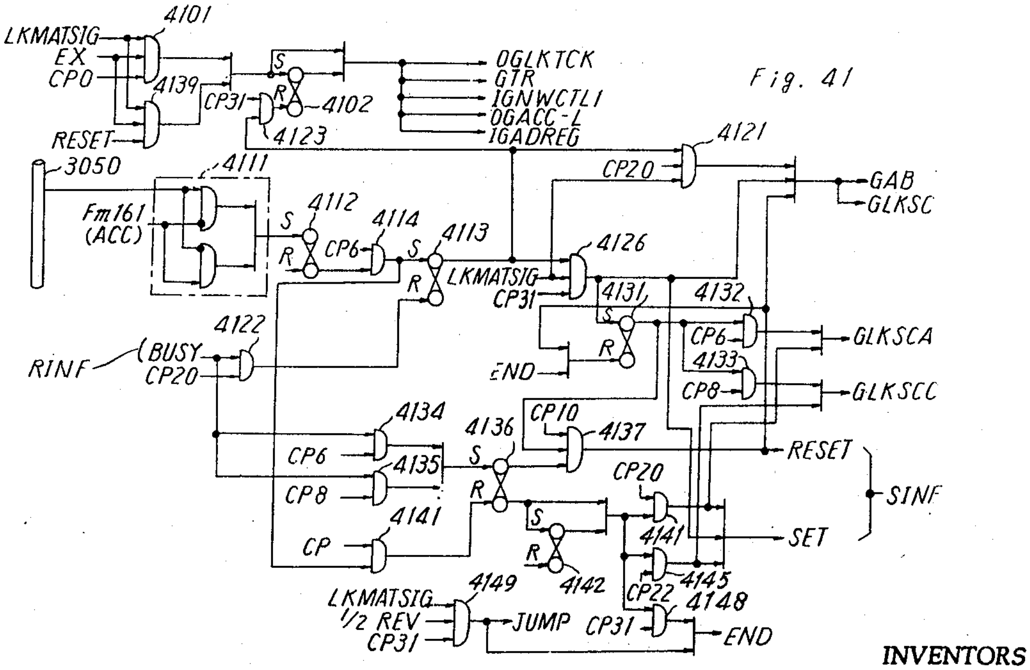
Figure 40:
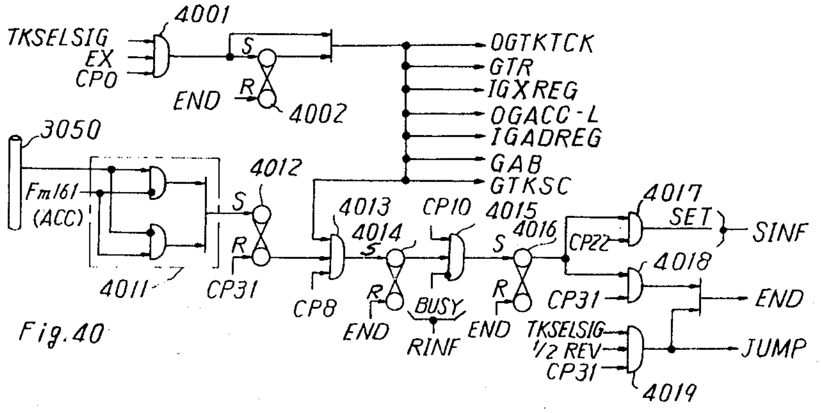

The central controller 150 supplies, besides the address information signals AINF, AINFX and AINFAC, various supply information signals SINF (FIG. 39) to the individual state circuits and receives therefrom various receive information signals RINF (FIGS. 39 through 41). The supply information signals SINF are, for example, the set and the reset signals SET and RESET for reserving the designated one of the state circuits and for cancelling the reservation. The receive information signals RINF are, for example, the busy signal BUSY from the designated state circuit except the DPICT and the MFICT state circuits 1401 and 1501 which are not reserved by the subject office but by the preceding offices. The central controller 150 thus detects via the state circuits the busy/idle state and the line service request state of the line circuits 107, the links 121, and the trunks 109 connected with the designated one of the state circuits and receives the dial and the multifrequency information from such state circuits. The central controller 150 also reserves the necessary line circuits 107, the links 121, and the trunks 109 by the respective state circuits and makes the state circuits restore the trunks 109 and send the dial and the multifrequency information.

b. Converters $C_1$, $C_2$ and $C_3$

FIGS. 18A, 18B and 18C disclose circuit connections of converters $C_1$, $C_2$ and $C_3$, respectively, used in the network state circuit 136 and the network controller 196 for converting the signals supplied to inputs 18A1, 18B1, and 18C1 into the signals provided at outputs 18A2, 18B2 and 18C2 in the following manner:

| Inputs to $C_1$, $C_2$ and $C_3$ | Outputs of $C_1$ | Outputs of $C_2$ | Outputs of $C_3$ |
|---|---|---|---|
| Negative | logic 0 | logic 1 | logic 1 |
| ground | logic 0 | logic 0 | logic 1 |
| positive | logic 1 | logic 0 | logic 0 |
| open | logic 1 | logic 0 | logic 0 |

These converters are hereinafter referred to as converters of the $C_1$, the $C_2$, and the $C_3$ types.

c. Line State Circuit (LSC) 137

FIG. 19 shows a line state circuit 137 comprising a first and a second converter 1901 and 1902 of the $C_1$ and $C_2$ types, respectively, connected with the line circuit lead 261 (FIG. 6). Assuming that the No.0 line state circuit of the No.0 line state circuit group (FIG. 17) is in consideration at the moment, a decoding gate 1910 which is an AND gate produces a "1" signal when the reverse signals $\bar{S}_0$, $\bar{S}_1$, . . . , and $\bar{S}_9$ become all logic "1" and the No.0 line state circuit group selection signal GLSCO becomes "1." At this moment when the line state circuit 137 and consequently the line circuit 107 connected therewith is designated, the No.0 central controller 150 (as the case may be, the No.1 central controller 150') supplies the supply information signals SINF via a supply gate 1911 and receive the receive information signals RINF via a receive gate 1912, which latter gates 1911 and 1912 are now opened by the output of the decoding gate 1910.

When the subscriber's set 101 is in the on-hook state in FIG. 6 and no reserving signal reaches the line circuit 107, the converters 1901 and 1902 supplied with ground produce logic "0" signals. A reserve flip-flop 1921 remains in the reset state into which it was driven either by the reset signal RESET or in a manner described later. A second flip-flop 1922 also remains in the reset state into which it was driven by such logic "0" signals via an INHIBIT gate 1923 and a controlled gate 1924 when the particular line state circuit 137 in FIG. 6 was designated as just mentioned. A busy OR-gate 1931 therefore produces a logic "0" busy signal BUSY. Inasmuch as one of three inputs is logic "0," a request AND-gate 1941 produces a "0" request signal REQ.

When the subscriber's set 101 in FIG. 6 is put into the off-hook state, the converters 1901 and 1902 supplied with a negative potential produce a logic "0" and a "1" signal, respectively. These logic "0" and "1" signal, respectively. These logic "0" and "1" signals do not change the respective states of flip-flops 1921 and 1922. The busy OR-gate 1931 produces a logic "0" busy signal BUSY. Inasmuch as the three are all logic "1," the request AND-gate 1941 now produces a "1" request signal REQ to indicate the line service request or, namely, the dial tone connection request of the line circuit 107.

Having received the logic "1" request signal REQ via the receive gate 1912 when designation has reached the particular line state circuit 137, the controller 150 sends a logic "1" set signal SET via the supply gate 1911 to the reserve flip-flop 1921. This turns the busy signal BUSY to logic "1" and the request signal REQ to logic "0."

When the dial tone connection is complete, the converters 1901 and 1902 supplied with a positive potential produce logic "1" and "0" signal, respectively. The logic "1" signal resets the reserve flip-flop 1921 via an OR-gate 1942 and sets the second flip-flop 1922 via a connection 1943 and the controlled gate 1924. The busy signal BUSY and the request signal REQ are still "1" and "0," respectively. The particular line state circuit 137 memorizes that the dial tone connection has been finished.

When the calling and the called subscribers go on-hook, the particular line state circuit 137 returns to the idle state and delivers a logic "0" busy signal BUSY and a logic "0" request pulse REQ.

In response to a call from another subscriber, the controller 150 designates the desired line state circuit 137 and confirms by the logic "0" busy and request signals BUSY and REQ that the line state circuit 137 is idle. The controller 150 now reserves the line state circuit 137 by sending a logic "1" set pulse SET. The reserved line state circuit 137 delivers a "1" busy signal BUSY and a "0" request signal REQ.

When the call from the other subscriber reaches the line circuit 137, the positive potential on the line state circuit lead 261 in FIG. 6 produces a logic "1" busy and a logic "0" request signal BUSY and REQ.

d. Link State Circuit (LKSC) 138 in FIG. 1A or 271, 272 or 273 in FIG. 2.

FIG. 20 shows a link state circuit 138 comprising a converter 2001 of the above-noted $C_3$ type connected with one of the A-link, B-link and the C-link leads 262, 263 and 264, a decoding gate 2010, a supply gate 2011 and a receive gate 2012, the latter gates being similar to the corresponding gates in the line state circuit 137 just explained.

When the A, B, or C link 213, 203 or 223 is idle, the converter 2001 supplied either with no potential or with a positive potential produces a logic "0" signal to let reserve flip-flop 2021 remain in the reset state into which it was driven either by the reset signal RESET or in a manner described below. Therefore, busy OR-gate 2031 produces a logic "0" busy signal BUSY when the particular link state circuit 138 (271, 272 or 273) is identified.

When the link 213, 203 or 223 is busy, the converter 2001 supplied with ground turns its output to a logic "1." This resets the flip-flop 2021, if in the set state, via an OR-gate 2032 and yet produces a logic "1" busy signal BUSY every time the particular link state circuit 138 (271, 272 or 273) is specified.

When the telephone conversation is terminated, the leads 262, 263 and 264 are supplied with a positive potential to indicate the state of the concerned link as idle.

(e) Intraoffice (IOT SC) 901 and Outgoing Trunk State Circuit

Figure 21:
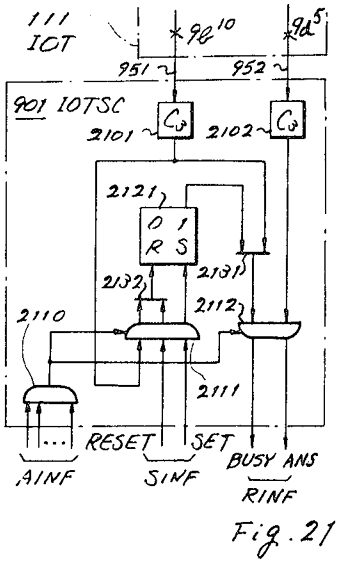

FIG. 21 shows each IOT state circuit 901 comprising first and second converters 2101 and 2102, both of the above-noted $C_3$ type, connected with first and second leads 951 and 952, respectively, of an intraoffice trunk IOT. The state circuit 901 further comprises decoding, supply, and receive gates 2110, 2111, and 2112 all similar to the corresponding gates in the line state circuit 137 in FIG. 19 as just explained.

When a trunk (IOT) 111 is idle, the converters 2101 and 2102 supplied with no definite potentials produce logic "0" signals. A reserve flip-flop 2121 remains in the reset state into which it was driven either by the reset signal RESET or in a manner described below. Therefore, a busy OR-gate 2131 produces a logic "0" busy signal BUSY. The logic "0" output of the second converter 2102 is received by the central controller 150 via the receive gate 2112 as a logic "0" answer signal ANS.

On reserving a trunk (IOT) 111, the controller 150 designates the IOT state circuit 901 and confirms if such state circuit is idle. The controller 150 now sends a logic "1" set signal SET to the flip-flop 2121 via the supply gate 2111. The No.1 output of the flip-flop 2121 thus turns into a logic "1" signal, which becomes a logic "1" busy signal BUSY in the output of gate 2112. The answer signal ANS in the output of gate 2112 is still a logic "0."

At the instant the trunk (IOT) 111 is activated, the first converter 2101 is supplied with ground to produce a logic "1" output signal which resets the flip-flop 2121 via the supply gate 2111 and an OR-gate 2132 and takes over the No.1 output of the flip-flop 2121 to become a logic "1" busy signal BUSY.

When the called subscriber's loop is complete, the second converter 2102 supplied with ground produces a logic "1" signal which is received by the controller 150 as a logic "1" answer signal ANS.

When the trunk (IOT) 111 becomes idle, the outputs of the first and the second converters 2101 and 2102 return to a logic "0" output. Inasmuch as the flip-flop 2121 has already been reset, the IOT state circuit 901 is restored to normal.

f. Originating Register Trunk State Circuit (ORT SC) 1001

FIG. 22 shows each ORT state circuit 1001 comprising first and second converters 2201 and 2202 both of the above-noted $C_3$ type, and an amplifier 2203 connected with the first, second and third leads 1051, 1052 and 1053, respectively, of an originating register trunk (ORT) 112 in FIG. 10. The state circuit 1001 further comprises decoding, supply, and receive gates 2210, 2211 and 2212 all similar to the corresponding gates in the line state circuit 137 just described.

When the trunk (ORT) 112 in FIG. 10 is idle, a reserve flip-flop 2221 remains, due to a logic "0" output of the first converter 2201, in the reset state into which it was driven either by the reset signal RESET or in a manner later described. A busy OR-gate 2231 therefore produces a logic "0" busy signal BUSY via gate 2212 which is opened when the particular state circuit 1001 is designated.

On reserving the trunk (ORT) 112 for the dial tone connection, the central controller 150 designates the trunk 112, confirms the idle state thereof, and supplies a logic "1" set signal SET to the reserve flip-flop 2221 to turn the busy signal BUSY into a logic "1."

When the trunk (ORT) 112 is activated, the logic "1" output of the first converter 2201 resets the reserve flip-flop 2221 and takes over the function of producing the logic "1" busy signal BUSY.

When a local calling subscriber's loop is completed, the originating register trunk (ORT) A relay (FIG. 10) supplies ground to the lead 1052. By this time, the H relay has already operated. When the first digit of the dial pulses is received at the trunk (ORT) 112, the second converter 2202 changes its logic "1" output to a succession of logic "0" outputs which activate a first INHIBIT gate 2250 to repeatedly reset a minimum pause counter 2251. The successive pause clock pulses PAUSE CLOCK having a repetition period of, for example, 120 milliseconds step the counter 2251 via a second INHIBIT gate 2252 whose inhibit input is the No.3 output of the counter 2251. The successive logic "0" outputs of the second converter 2202 step, via a first inverter 2270, a dial pulse counter 2271 which is reset by each logic "1" number reception signal NUM REC (FIG. 50A) to deliver the dial pulse counts. Incidentally, the counter 2271 is kept in the reset state via a second inverter 2272 as long as the first converter 2201 produces a logic "0" output. The No.2 output of the counter 2251 sets a flag flip-flop 2281 via an AND-gate 2282 supplied with the outputs of the converters 2201 and 2202. As soon as the dial pulse pauses are detected, the controller 150 receives logic "1" flag signals FLAG now the received gate 2212 and then returns logic "1" reception signals NUM REC via the supply gate 2211 to reset the flag flip-flop 2281.

Having received all digits of the dial pulses originated by the local calling subscriber, the central controller 150 sends a logic "1" release signal RELEASE (FIG. 50B), via the supply gate 2211, to a third flip-flop 2291 which has been in the reset state via a third inverter 2292 from the time the trunk (ORT) 112 was activated. The flip-flop 2291 is now set to remove ground from lead 1053 connected in the output of the amplifier 2203.

The trunk (ORT) 112 therefore returns to normal to disconnect the first lead 1051 (FIG. 10) from ground. A logic "0" output of the converter 2201 resets via the third inverter 2292 the third flip-flops 2291 to restore the ORT state circuit 1001 to normal.

g. Outgoing Trunk State Circuit (OGT SC) 1101

The OGT state circuit 1101 (FIG. 11) has the same structure and function as the IOT state circuit 901 (FIG. 21) just described and is therefore thought to require no further description at this time.

h. Dial Pulse Outgoing Sender Trunk State Circuit (DPOST SC) 1201

Figure 23:
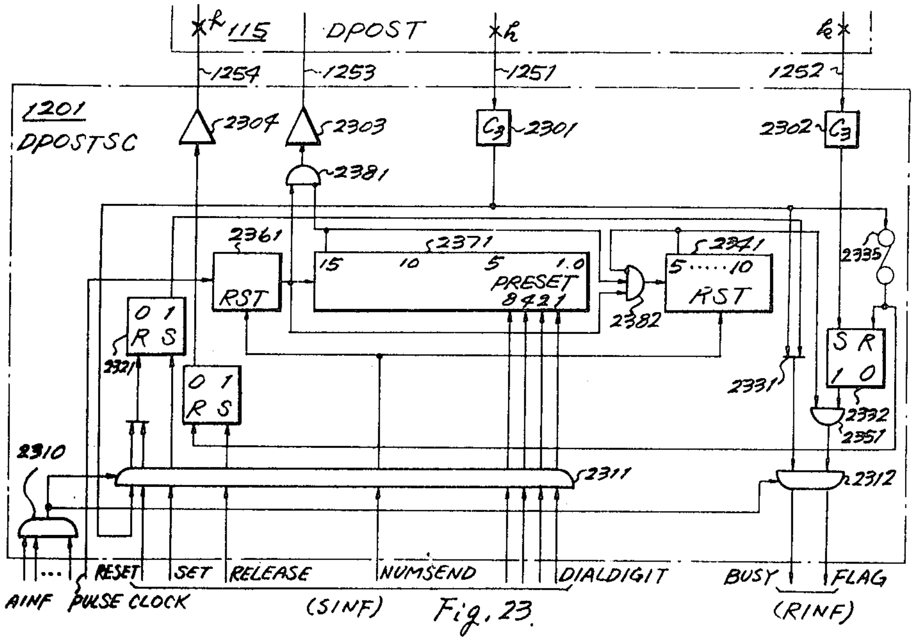

FIG. 23 shows a DPOST state circuit 1201 comprising first and second converters 2301 and 2302 both of the above-noted $C_3$ type, connected to first and second leads 1251 and 1252, and first and second amplifiers 2303 and 2304 connected to the third and fourth leads 1253 and 1254, respectively, of each trunk (DPOST) 115 and decoding, supply, and receive gates 2310, 2311 and 2312 similar to the corresponding gates of the line state circuit 137 explained above.

When the trunk (DPOST) 115 is idle, a logic "0" output of the first converter 2301 permits a reserve flip-flop 2321 to remain in the reset state so that a busy OR-gate 2331 may produce a logic "0" busy signal BUSY, and at the same time resets a second flip-flop 2332 via an inverter 2335.

On reserving a trunk (DPOST) 115, the central controller 150 designates the particular DPOST state circuit 1201, confirms the idle state thereof, and supplies a logic "1" signal SET via gate 2311 to set the first flip-flop 2321 to turn the last-mentioned logic "0" busy signal BUSY into logic "1."

When the DPICT A relay in the next office, not shown, is operated, the DPOST K relay in FIG. 12 is operated to place ground on the second leads 1252 (FIGS. 12 and 23) to the second flip-flop 2332 to turn the No.1 output thereof to a logic "1." A minimum pause counter 2341 comprises No.0 through No.5 stages and usually produces a logic "1" output from the No.5 stage. Due to these logic "1" signals, a flag AND-gate 2351 produces a logic "1" flag signal FLAG. Having received the logic "1" flag signal FLAG via the receive gate 2312, the controller 150 supplies a logic "1" number send signal NUM SEND (FIG. 50A) via the supply gate 2311 to reset the minimum pause counter 2341 and a clock pulse counter 2361, the latter counter being a ternary counter stepped by the pulse clock pulses PULSE CLOCK having a repetition period of, for example, 32 milliseconds. At the same time, the controller 150 supplies via four leads DIAL DIGIT and supply gate 2311 one's complement of the binary digit representing the first decimal digit of the dial pulses to the No. 1, 2, 4 and 8 inputs of a dial pulse counter 2371, which stores the complement and, with each logic "1" output of the clock pulse counter 2361, is stepped towards a full count of 15 or, namely 1111 in the binary code to deliver, if fully stepped, a full count signal to a first INHIBIT gate 2381 whose output is connected via the first amplifier 2303 with the third lead 1253. The logic "1" output of the clock pulse counter 2361 is also sent to the first INHIBIT gate 2381 and to a second INHIBIT gate 2382. For example, if the decimal digit is eight or, namely, 1000 in the binary code, the one's complement is 0111 which is seven in the decimal code. The dial pulse counter 2371, stepped by eight logic "1" outputs of the clock pulse counter 2361 reaches the full count of 15 to produce the full count signal. The first INHIBIT gate 2381 therefore delivers eight pulses to the third lead 1253. When supplied with such a full count signal, the minimum pause counter 2341 begins to count the logic "1" outputs of the clock pulse counter 2361 until five logic "1" outputs are counted, when the logic "1" output from the No.5 stage inhibits further count by the minimum pause counter 2341 and produces another logic "1" flag signal FLAG. When all dial pulses are sent out in this manner, the controller 150 restores to normal the reserved trunk (DPOST) 115 in FIG. 12 via the logic "1" signal RELEASE and the DPOST state circuit 1201 in FIG. 22 as in the case of the trunk (ORT) 112 and the ORT state circuit 1001 as just explained.

i. Multifrequency Outgoing Sender Trunk State Circuit (MFOST SC) 1301

Figure 24:
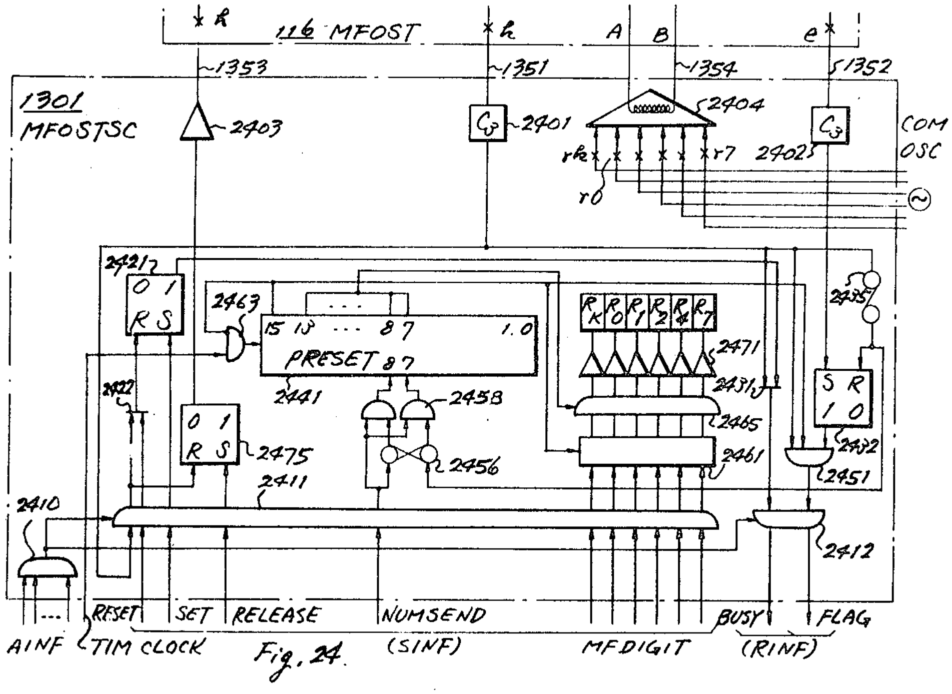

FIG. 24 shows each MFOST state circuit 1301 comprising first and second converters 2401 and 2402 of the above-explained $C_3$ type having inputs connected to leads 1351 and 1352, an amplifier 2403 having an output connected to lead 1353, and a buffer amplifier 2404 having A and B lines which are connected to lead 1354, all latter leads terminating at trunk (MFOST) 116 as shown in FIG. 13.

When the trunk (MFOST) 116 is idle, the first converter 2401 produces a logic "0" output signal due to which a reserve flip-flop 2421 remains in the idle or reset state into which it was driven either in a manner described below or by a reset signal RESET (FIG. 41) supplied thereto via the supply gate 2411 and an OR-gate 2422 when the particular MFOST state circuit 1301 is designated. A busy OR-gate 2431 therefore produces a logic "0" busy signal BUSY. The logic "0" output signal of converter 2401 resets a second flip-flop 2432 via an inverter 2435.

On reserving a trunk (MFOST) 116, the central controller 150 specifies the MFOST state circuit 1301, confirms the idle state thereof, and supplies a logic "1" signal SET to set the reserve flip-flop 2421 to change the last-mentioned logic "0" busy signal BUSY into a logic "1" busy signal BUSY.

When the trunk (MFOST) 116 in FIG. 13 is connected with a trunk MFICT 119 via the register sender link 120, ground placed on the second lead 1352 in FIGS. 13 and 24 sets the second flip-flop 2432 to change the No.1 output thereof to a logic "1." A timing counter 2441 is a hexadecimal counter which has No.0 through No.15 stages and usually produces a logic "1" output at the No.15 stage. Inasmuch as the three inputs to flag AND-gate 2451 are now logic "1," this gate produces a logic "1" output flag signal FLAG. Having received the logic "1" flag signal FLAG via the receive gate 2412, the controller 150 supplies a logic "1" number send signal NUM SEND (FIG. 50A) which sets via the supply gate 2411 a delayed flip-flop 2456. The No.0 output of the flip-flop 2456 is still a logic "1" at the time of appearance of the "1" number send signal NUM SEND to preset via a key pulse AND-gate 2458 the timing counter 2441 at the No.7 stage. At the same time, the controller 150 sends a two-out-of-six code key pulse signal via six leads MF DIGIT (FIG. 50B) and the supply gate 2411 to a digit register 2461. The timing counter 2441 is stepped via an INHIBIT gate 2463 activated by timing pulses TIM CLOCK whose repetition period is, for example, 16 milliseconds which is about one-eighth of the repetition period of the multifrequency signal digits following the key pulse signal. The contiguous logic " 1" outputs from the No.7 through No.13 stages of the timing counter 2441 are supplied to a controlled gate 2465 which allows passage of the key pulse signal to amplifiers 2471 for operating relays RK, R0, R1, R2, R4 and R7 (FIG. 24).

In response to the code for the key pulse signal, contacts *rk* and *r2* of the operated relays transmit the corresponding two of the preselected frequency signals generated by common oscillators COM OSC. Meanwhile, the timing counter 2441 is stepped to produce a logic "1" signal from the No.15 stage and thereby to produce another "1" flag signal FLAG. Having received this flag signal FLAG, the controller 150 sends another logic "1" number send signal NUM SEND which presets the timing counter 2441 at the No.8 stage via a multifrequency signal AND-gate 2472 whose other input is a No.1 output of the delayed flip-flop 2456 set by the preceding number send signal NUM SEND. Except that the duration and the combination of the opened relay contacts may not be the same as in the case of the key pulse signal, each digit of the multifrequency signal is similarly sent from the buffer amplifier 2404 to the fourth lead 1354 in the manner similar to the transmission of the key pulse signal.

When the controller 150 has sent a predetermined number of the logic "1" number send signals NUM SEND, it then supplies a logic "1" release signal RELEASE (FIG. 50B) in response to a new logic "1" flag signal FLAG to restore the trunk (MFOST) 116 and the MFOST state circuit 1301 to normal as in the case of the ORT trunk (ORT) and ORT state circuit 1001 as previously described. Incidentally, the delayed flip-flop 2456 is reset, together with a third flip-flop 2475, by the output of the inverter 2435.

j. Dial Pulse Incoming Trunk State Circuit (DPICT SC) 1401

Figure 25:
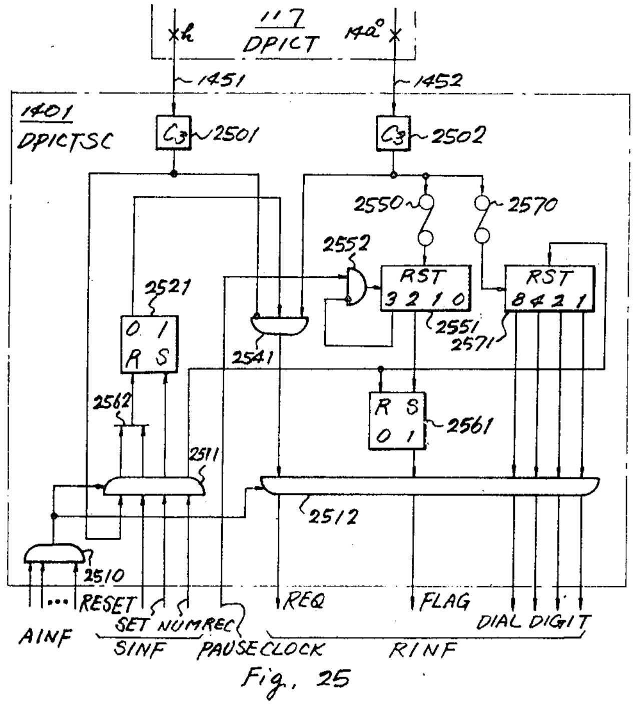

FIG. 25 shows each DPICT state circuit 1401 comprising first and second converters 2501 and 2502, both of the above-noted $C_3$ type, connected with first and second leads 1451 and 1452, respectively, of a trunk (DPICT) 117 in FIG. 14, together with decoding, supply, and receive gates 2510, 2511, and 2512*a*, all similar to the corresponding gates in the line state circuit 137 in FIG. 19.

When the trunk (DPICT) 117 is idle, the converters 2501 and 2502 produce logic "0" output signals. Due to the logic "0" output signal of the first converter 2501, a reserve flip-flop 2521 remains in the reset state into which it is driven by the reset signal RESET or in a manner described later. As a consequence, request INHIBIT gate 2541 produces a logic "0" line service request REQ which is sent via receive gate 2512 to the central controller 150 (FIG. 39). The logic "0" output signal of the second converter 2502 resets via a first inverter 2550 a minimum pause counter 2551 which has No. 0 through No. 3 steps and is stepped, via an INHIBIT gate 2552, activated by successive pause clock pulses PAUSE CLOCK. The No. 2 output of the pause counter 2551 serves as a set input to a flag flip-flop 2561 which is reset by a logic "1" number reception signal NUM REC (FIG. 50A). The No. 3 output of the pause counter, 2551 serves as the inhibit input to the INHIBIT gate 2552 to stop the stepping of the latter counter. Inasmuch as the counter 2551 is held in the reset state, the No.1 output of the flag flip-flop 2561 provides a logic "0" flag signal FLAG (FIG. 50A). The logic "0" output of the second converter 2502 steps via a second inverter 2570 a dial pulse counter 2571 which is a binary counter driven into the reset state by the logic "1" number reception signal NUM REC (FIG. 50A) to produce all logic "0" signals at the respective stages whose "1" outputs signify counts of 1, 2, 4, and 8, respectively.

When the DPICT A relay in FIG. 14 is operated, ground placed on the second lead 1452 actuates the request INHIBIT gate 2541 to produce a logic "1" signal, which is received by the controller 150 via the receive gate 2512*a* as a logic "1" request signal REQ when designation proceeds to the particular state circuit 1401.

Having received the logic "1" request signal REQ (FIG. 39), the controller 150 sends a logic "1" set (FIG. 39) signal SET to the reserve flip-flop 2521 via the supply gate 2511 and an OR-gate 2562 to restore the request signal REQ (FIG. 39) to a logic "0." The first digit dial pulses received by the trunk (DPICT) 117 intermittently remove ground from the second lead 1452 to repeatedly reset the minimum pause counter 2551 and to step the dial pulse counter 2571. The duration of the intermittent removal of ground is about scores of milliseconds long. The duration between the dial pulse digits or the dial pulse pause is at least about 650 milliseconds. When the logic "1" of No.2 output of the minimum pause counter 2551 sets the flag flip-flop 2561 during the dial pulse pause, the controller 150 receives a logic "1" flag signal FLAG and in response thereto sends a logic "1" number reception signal NUM REC (FIG. 50A) to turn the flag signal FLAG to a logic "0" and to reset the dial pulse counter 2571 which, upon resetting, delivers the number of the first digit pulses. When each digit pulse is received, the minimum pause counter 2551 produces a logic "1" signal at the No.3 output. The DPICT state circuit 1401 returns to the normal state when the trunk (DPICT) 117 in FIG. 14 is restored to normal.

k. Multifrequency Incoming Trunk State Circuit (MFICT SC) 1501

Figure 26:
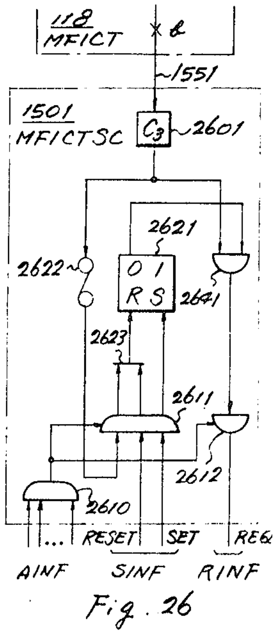

FIG. 26 shows each MFICT state circuit 1501 comprising a converter 2601 of the above-noted $C_3$ type connected to the lead 1551 of a trunk (MFICT) 118 in FIG. 15, together with decoding, supply, and receive gates 2610, 2611 and 2612, all similar to the corresponding gates in the line state circuit 137 in FIG. 19.

When the trunk (MFICT) 118 is idle, the converter 2601 produces a logic "0" output signal which resets a reserve flip-flop 2621 via inverter 2622, supply gate 2611, and OR-gate 2623. A request AND-gate 2641 therefore produces a logic "0" signal sent as an incoming connection request signal REQ to the central controller 150 in FIG. 39, when the particular trunk state circuit 1501 is designated.

When the trunk (MFICT) B relay in FIG. 15 is operated, the logic "1" output signal of the converter 2601 holds the No.0 output of the flip-flop 2621 in the logic "1" state wherein the logic "1" request signal REQ is produced.

Having received the logic "1" request signal REQ via the receive gate 2612 when the particular trunk (MFICT) 118 in FIG. 15 is specified, the central controller 150 supplies a logic "1" signal SET (FIG. 39) via the supply gate 2611 to set the flip-flop 2621 to replace the logic "1" signal with a logic "0" request signal REQ.

l. Multifrequency Incoming Register Trunk State Circuit (MFIRT SC) 1601

Figure 27:
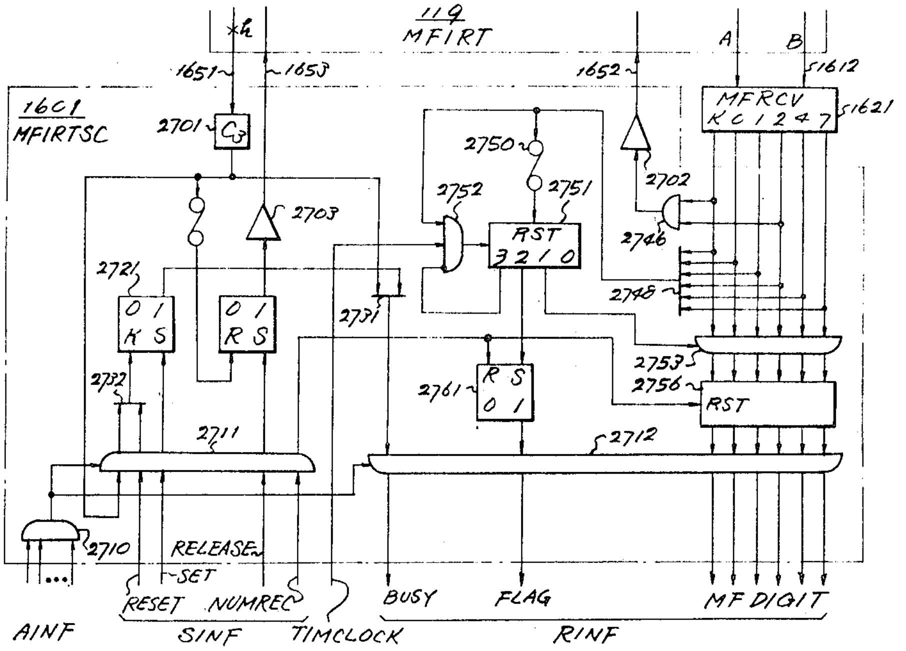

FIG. 27 shows each MFIRT state circuit 1601 comprising a converter 2701 of the above-noted $C_3$ type, and first and second amplifiers 2702 and 2703 connected to first, second and third leads 1651, 1652 and 1653 of the trunk (MFIRT) 119 in FIG. 19, together with decoding, supply, and receive gates 2710, 2711 and 2712, all similar to the corresponding gates in the line state circuit 137 in FIG. 19.

When the trunk (MFIRT) 119 is idle, a reserve flip-flop 2721 remains in the reset state into which it was driven either by the reset signal RESET or in a manner described later. A busy OR-gate 2731 therefore produces a logic "0" busy signal BUSY.

In response to an incoming call, the central controller 150 designates a particular trunk (MFIRT) 119 by supplying a logic "1" signal SET to set the reserve flip-flop 2721 via the supply gate 2711. This changes the logic "0" busy signal BUSY into a logic "1" signal. When the trunk (MFIRT) H relay in FIG. 16 is operated, a logic "1" output signal of the converter 2701 resets the flip-flop 2721 via the supply gate 2711 and an OR-gate 2732 and takes over the No.1 output of this flip-flop 2721 to hold the logic "1" busy signal BUSY.

Now, the key pulse signal, which is one of the multifrequency signals, is sent via the trunk (MFIRT) 119 and the output 1612 to the multifrequency receiver 1621 in FIGS. 16 and 27 which has Nos. K, 0, 1, 2, 4 and 7 outputs. This receiver produces logic "1" signals at its No. K and 2 outputs upon reception of the key pulse signal, and converts each digit of the multifrequency signal into a two-out-of-six logic "1" code as in the manner of the well-known crossbar switching system. These No. K and 2 output signals activate AND-gate 2746 to put ground via amplifier 2702 on the second lead 1652 to operate the trunk MFIRT K relay in FIG. 16.

On the other hand, the output code of the multifrequency receiver 1621 is sent via an OR-gate 2748 to an inverter 2750 to cancel the reset of a timing counter 2751 and to an INHIBIT gate 2752 to allow the timing pulses TIM CLOCK to step the counter 2751. The logic "1" at the No.1 output of the counter 2751 stimulates controlled gate 2753 to transfer the last-mentioned output code to a register 2756. The logic "1" of the No.2 output of the counter 2751 sets a flag flip-flop 2761 to produce a "1" flag signal FLAG, which announces to the central controller 150 that a digit of the multifrequency signal has been received. Having received each digit of the multifrequency signal from the register 2756 via the receive gate 2712, the central controller 150 sends a logic "1" number reception signal NUM REC (FIG. 50A) to reset the flag flip-flop 2761 and the pulse register 2756. The logic "1" of the No.3 output of the counter 2751 actuates INHIBIT AND-gate 2752 to inhibit further stepping of the counter 2751. Having received all digits of the multifrequency signal, the central controller 150 sends a logic "1" release signal RELEASE (FIG. 50B) to restore the trunk (MFIRT) 119 in FIG. 16 and the state circuit 1601 in FIG. 27 to normal as in the case of the trunk (ORT) 112 and the ORT state circuit 1001 previously explained.

m. Notes

Wiring circuits 1720 constitute address information decoder 136'.

The timing pulses TIM CLOCK are supplied from a common timing pulse source to the trunk state circuits MFIRTSC and MFOSTSC. The pulse clock pulses PULSE CLOCK are supplied from a common pulse clock pulse source to the trunk state circuits DPOSTSC. The pause clock pulses PAUSE CLOCK are supplied from a common pause clock source to the trunk state circuits ORTSC and DPICTSC. Incidentally, these three types of pulses have repetition periods whose ratios are of simple rational numbers. It is therefore possible to produce these pulses by frequency multiplying and demultiplying the pulses produced by a single pulse source.

IV. MAGNETIC DRUM and a Portion of CENTRAL CONTROLLER Including COMMAND TRANSFER CONTROL LOGIC CIRCUITS a. Memory Patterns on Program and Command Tracks in FIG. 1B FIG. 28(*a*) shows the fundamental word layout or memory pattern for a command word consisting of the following memory areas:

| Bit Position | Name of Area (number of bit positions) | Description |
|---|---|---|
| 0 | command track change information (1) | whether or not the command tracks 144 should be interchanged |
| 1–5 | bit position information BIT (5) | one of 32 bit positions in a word |
| 6–11 | source information SRC (6) | one of the data tracks 143–149 or registers 161–167 (FIG. 1B), 186 (FIG. 33), 188 (FIG. 36) and 189 (FIG. 36) from which the data should be derived |
| 12–17 | destination information DST (6) | ditto, to which the data should be sent |
| 18–23 | operational information OP (6) | kind of the commands |
| 24–30 | next command address NC (7) | the address of the command to be executed next |
| 31 | parity check bit PAR (1) | |

FOr the purpose of convenience, the informations stored in the Nos.0 through 23 bit positions are called the instructions.

FIG. 28(*b*) shows a word of the call command CALL having in the Nos.1 through 5 bit positions of the bit position information area BIT the segment address of the program segment to be transferred from the program tracks 143 concerned to that one of the command tracks 144 which does not store the program segment being executed.

A word of the register service request detection command RSRD has, in the bit position information area BIT, the data which designate timing flag bit (TMF) or callback flag bit (CBF) in the register track described later.

FIG. 28(*c*) shows a word of the line service request detection and the directory number translation and busy test commands LSRD and NG&GT having no data in the Nos.0 through 5 bit positions. In an LSRD word, the source information area SRC designates one of the line and the trunk tracks 145 and 146 along which the detection is to be carried out and from which the data of the word selected through command execution is to be left in the accumulator register 161. The destination information area DST is not provided with any data.

FIG. 28(*d*) shows a word of the trunk selection, the link matching, the office code translation, the command track change, the register track hunt, the register track scanning, the register timing, and the mode change commands TKSEL, LKMAT, OFCTRL, CTCG, RTH, RTS, RTM and MDCG, having the data only in the operation information, the next command address, and the parity check bit areas OP, NC and PAR, respectively.

FIG. 28(*e*) shows a word of the data transfer command MOVE comprising in the bit position information area BIT the data specifying that bit position of a word, up to which transfer of the data is to be carried out.

FIG. 28(*g*) shows a word of the immediate load command I-LOAD having in the data area DATA of the Nos.0 through 15 bit positions the data to be transferred to the accumulator register 161 (FIG. 31) and in the upper/lower information area U/L of the No. 16 bit position the datum designating whether the data of the data area DATA is to be transferred to the upper half (Nos.16 through 31 bit positions) of the accumulator register 161 or to the lower half (Nos.0 through 15 bit positions) thereof. When a logic "1" or a logic "0" datum is stored in the upper/lower information area U/L, the data in the data area DATA are transferred to the upper or the lower half of the destination register (in the present case, the accumulator 161 in FIG. 31).

FIG. 28(*h*) shows a word of the conditional "1" and the conditional "0" jump commands 1JUMP and 0JUMP comprising the command track change information area, the bit position information area BIT, and the source information area SRC. If the command track change information area stores a logic "1" datum, the access to the command tracks 144 (0 or 1) is changed from one to the other during execution of the conditional "1" and the conditional "0" jump commands 1JUMP and 0JUMP, provided that the logic "1" or the logic "0" datum is stored in one of the registers 161 . . . 166 (FIG. 31) at the bit position designated by the bit position information area BIT (FIG. 28*h*).

b. Memory Patterns on Line, Trunk, Link, Translator and Register Tracks in FIG. 1B FIG. 29(*a*) shows each word of the line tracks 145 consisting of the following memory areas:

| Bit Position | Name of Area (number of bit positions) | Description |
|---|---|---|

| | | |
|---|---|---|
| 0–19 | directory number DN (20) | the directory number of the local subscriber |
| 20–26 | service class LCLASS (7) | the service class of the subscriber, such as an individual, a party, an ordinary public (coin), a consignee public, a one-way, a pilot number class |
| 27–30 | chart class CHART (4) | the chart class of the subscriber, namely, the charging class and the route class |
| 31 | parity check bit PAR (1) | |

Figure 3B:
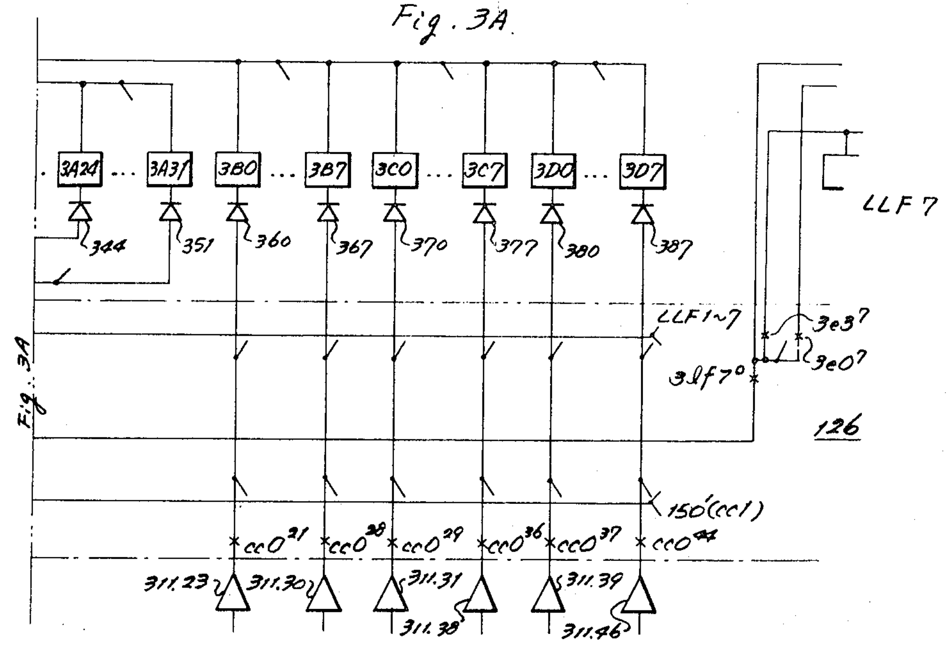

The address of the word represents the equipment number of the line circuit 107 in FIGS. 1A and 3, except the most significant digit which is represented by the number of the line track 145 in FIG. 1B.

Figure 29:
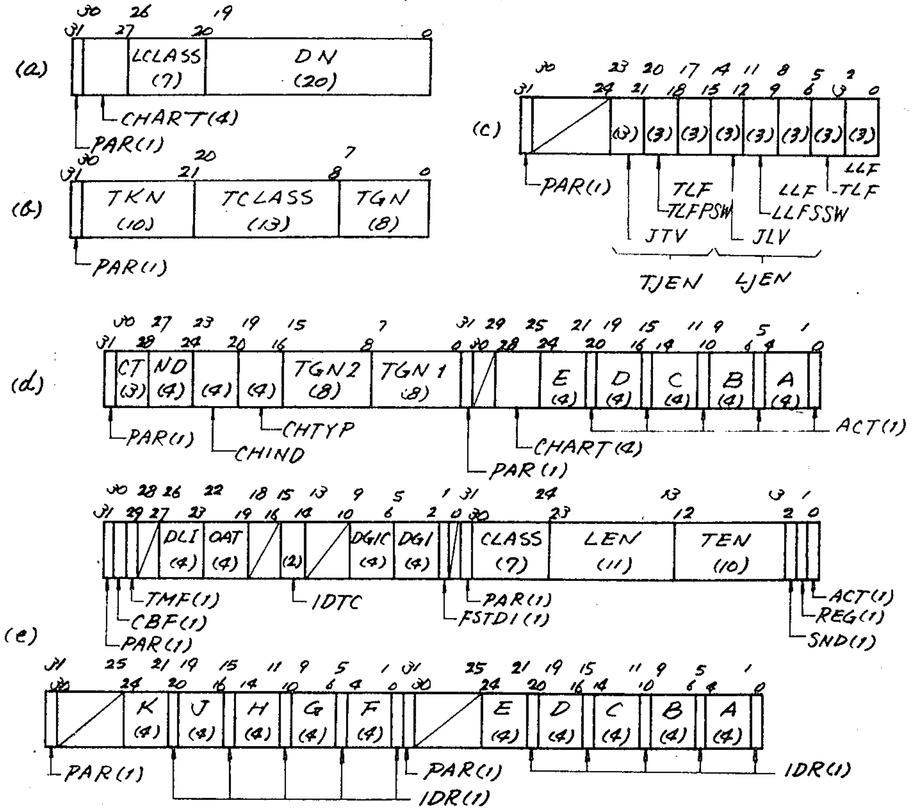

FIG. 29(*b*) shows each word of the trunk track 146 consisting of the following memory areas:

| Bit Position | Name of Area (number of bit positions) | Description |
|---|---|---|
| 0–7 | trunk group number TGN (8) | |
| 8–20 | trunk class T CLASS (13) | whether the trunk 109 is a tone or a talky trunk, a digit sending trunk, a digit receiving trunk, a charging trunk, a trunk for maintenance operation, or one of the others; for example, a 1 datum in the No. 8 bit position represents the ORT trunk class |
| 21–30 | trunk number TKN (10) | the trunk number for trunks connected with the register sender link 120 |
| 31 | parity check bit PAR (1) | |

The addresses of the respective word represent the equipment number of the trunks 109.

FIG. 29(*c*) shows each word of the link track 147 consisting of the following memory areas:

| Bit Position | Name of Area (number of bit positions) | Description |
|---|---|---|
| 0–2 | line link frame number LLF (3) | for example, LLF0, LLF1–LLF7 ) |
| 3–5 | trunk link frame number TLF (3) | for example, TLF0, TLF1–TLF7 |
| 6–8 | line link frame number LLF (3) | the line link frame junctor equipment number LJEN |
| 9–11 | line link secondary switch number LLFSSW (3) | (same: LJEN) |
| 12–14 | line link secondary switch vertical line number JLV (3) | (same: LJEN) |
| 15–17 | trunk line frame number TLF (3) | the trunk line frame junctor equipment number TJEN |
| 18–20 | trunk link primary switch number TLFPSW (3) | (same: TJEN) |
| 21–23 | trunk link primary switch vertical line number JTV (3) | (same: TJEN) |
| 24–30 | no data (7) | |
| 31 | parity check bit PAR (1) | |

The address of the word represents the equipment number of a particular junctor.

FIG. 29(*d*) shows a memory segment of the translator track 148 consisting of No.0 and No.1 words $W_0$ and $W_1$ which have an even-numbered and an odd-numbered address, respectively, and which consists of the following memory areas:

| Bit Position | Name of Area (number of bit positions) | Description |
|---|---|---|
| No. 0 word: | | |
| 0, 5, 10, 15 and 20 | activity ACT (1) | whether the memory area following each of the activity areas ACT's contains any information or not |
| 1–4, 6–9, 11–14, 16–19 and 21–24 | office code A, B, C, D, and E (4) | office code to be called either by the local subscriber or, by the preceding office |
| 25–28 | chart class CHART (4) | the chart class of the local subscriber who would originate a call |
| 29–30 | no data (2) | |
| 31 | parity check bit PAR (1) | |
| No. 1 word: | | |
| 0–7 and 8–15 | trunk group numbers TGN1 and TGN2 (8) | the trunk group numbers determined on the basis of the office code and the chart class |
| 16–19 | charging type CHTYP (4) | for example, metering, AMA, |
| 20–23 | charging index CHIND (4) | the system based on which the local subscriber is to be charged for the call defined by the office code and the chart class |
| 24–27 | number of digits ND (4) | the number of digits to be dialed for the call defined by the code |
| 28–30 | connection type CT (3) | the type of connection, such as an intra-office, an outgoing, an incoming, or a transit connection |
| 31 | parity check bit PAR (1) | |

FIG. 29(*e*) shows a memory segment of the register track 149 consisting of No.0 through No.3 words $W_0$ through $W_3$, which have the addresses of $4n$, $4n+1$, . . . and $4n+3$, where $n$ is an integer, respectively, and which consists of the following memory areas:

| Bit Position | Name of Area (number of bit positions) | Description |
|---|---|---|
| No. 0 word $W_0$: | | |
| 0 | activity ACT (1) | whether any data are stored in the register track memory segment or not |
| 1 | registering REG (1) | whether the memory segment is registering the dial information or not |
| 2 | sending SND (1) | whether the memory segment is sending the dial information or not |
| 3–12 | trunk equipment number TEN (10) | the equipment number of the register and the sender trunk concerned with the dial information |
| 13–23 | line equipment number LEN (11) | the equipment number of the line circuit or the incoming trunk calling for this memory segment |
| 24–30 | class CLASS (7) | the service class of the subscriber having the line equipment number of the preceding area LEN and the trunk having trunk equipment number area TEN; for example, the trunks ORT 112 are represented by a 1 datum at the No. 24 bit position |
| 31 | parity check bit PAR (1) | |
| No. 1 word $W_1$ | | |
| 0 | no significance (1) | |
| 1 | first digit FSTD1 (1) | whether the dial information to be dealt with is the first digit or not |
| 2–5 | digit information | the number of digits to be registered or sent |

| | | |
|---|---|---|
| | DGI (4) | |
| 6–9 | digit count DIGC (4) | the number of digits having been registered or sent |
| 10–13 | no significance (4) | |
| 14–15 | interdigit timing count IDTC (2) | the lapse of time from the registering of a digit to the registering of the next digit |
| 16–18 | no significance (3) | |
| 19–22 | overall timing OAT (4) | the overall time the memory segment is in use |
| 23–26 | delete information DLI (4) | the number of digits to be deleted on sending out the dial information |
| 27–28 | no significance (2) | |
| 29 | timing flag TMF (1) | full count of the interdigit timing count IDTC or overall timing OAT |
| 30 | call back flag CBF (1) | completion of registering the whole dial information |
| 31 | parity check bit PAR (1) | |
| Nos. 2 and 3 words $W_2$ and $W_3$: | | |
| 0, 5, 10, 15, and 20 | identification record IDR (1) | whether the following area has the dial information or not |
| 1–4, 6–9, 11–14, 16–19, and 21–24 | dial information A, B, C, D, E, F, G, H, J, and K | the dial information |
| 25–30 | no significance (6) | |
| 31 | parity check bit PAR (1) | |

c. Magnetic Drum 140 and a Portion of Central Controller 150

FIG. 30 shows the magnetic drum 140 comprising read and the write heads 141R, 142R, 143-0R, -1R, -2R, -3R, 144-0R, 1R, 145-0R/W, 145-1R/W, 146R/W, 147 R/W, 148 R/W, 149R, 144-0W, 144-1W and 149W accompanied with read and write amplifiers 141RA, 142RA, 143-0RA, -1RA, -2RA, -3RA, 144-0RA, -1RA, 145-0RA, -0RA, -1RA, -1WA, 146RA, -WA, 147RA, -WA, 148RA, -WA, 149 RA, 144-0WA, 144-1WA and 149WA. Read amplifiers 141RA . . . 149RA are followed by switching equipment means such as, for example, relay contacts for supplying the read out information selectively to the central controller 150 or the central controller 150'. Write amplifiers 144-0WA, 1WA and 149WA are preceded by like switching equipments. The switching equipments are controlled in a ganged relation by relays (not shown), such as the central control connection relay CC0 for use with central controller No.0 and relays CC1 for use with the central controller 150'.

FIG. 30 also shows the central controller 150 comprising Nos.0 through three-track output AND-gates 3000, 3001, 3002 and 3003 which are supplied with a Nos.0 through 3 program track output gate signals OGPROG0, OGPROG1, OGPROG2, and OGPROG3, respectively, produced one at a time in the manner described later in part B Instruction Execution Wired Logics, section; (a) Call Wired Logic 176. When one of the latter program track output gate signals is a logic "1," the data are read out of the corresponding one of the program tracks (via the associated read head, read amplifier, and switching equipment) into No.0 and a No.1 command track input AND-gates 3010 and 3011. No.0 and No.1 command track repeat AND-gates 3012 and 3013 are supplied with the respective outputs, if any, of the Nos.0 and 1 command track read amplifiers 144-0RA and 144-1RA via the appropriate switching equipments. The No.0 command track input and repeat AND-gates 3010 and 3012 are also supplied, as the other inputs, with the output of a No.0 program segment transfer AND-gate 3020. Likewise, the No.1 command track input and repeat AND-gates 3011 and 3013 are supplied with the output of a No.1 program segment transfer AND-gate 3021. The transfer AND-gates 3020 and 3021 receive a program segment transfer signal PROGTRANS produced in FIG. 38 in the course of execution of a call command which becomes clear later in explanation. No.0 and No.1 command track output AND-gates 3022 and 3023, respectively, are arranged to deliver the data read out of a program segment to the command register 187 in FIG. 36. A command track selection flip-flop 3030 supplies the No.0 output to the No.0 program segment transfer and the No.1 command track output AND-gates 3020 and 3022 and the No.1 output to the No.1 program segment transfer and the No.0 command track output AND-gates 3021 and 3023. The arrangement is therefore such that, in case the program segment transfer signal PROGTRANS is a logic "1," a program segment is written into and circulated in that one of the Nos.0 and 1 command tracks 144 which is specified by the command track selection flip-flop 3030 while another program segment previously stored in the other of the command tracks 144 is delivered to the command register 187. The flip-flop 3030 produces a logic "1" signal at one of the Nos.0 and 1 outputs and begins to produce the same at the other output when supplied via a logic "1" command track change pulse TC (FIGS. 47 and 48) produced in a manner mentioned later during execution of the command track change, the conditional "1" jump, or the conditional "0" jump command.

Components of central controller 150 mentioned above are called the command transfer logic circuits 172 in Section (g) "Wired Logics for Call Processing" of part (A)" General, Chapter (I) "Specific Embodiment."

The central controller 150 further comprises No.0 and No.1 line, trunk, link, translator, and register output AND-gates 3041, 3042, 3043, 3044, 3045, and 3046, respectively, which receive No.0 and No.1 line, trunk, link, translator, and register track output gate signals OGLTCK0, OGLTCK1, OGTKTCK, OGLKTCK, OGTRLTCK, and OGREGTCK, respectively, as mentioned later, for supplying the data from the respective tracks via the read heads, the read amplifiers, and the switching means to an early bus 3050. The central controller 150 also comprises No.0 and No.1 line, trunk, link, translator, and register track input gates 3051, 3052, 3053, 3054, 3055, and 3056 supplied with No.0 and No.1 line, trunk, link, translator, and register track input gate signals IGLTCK0, IGLTCK1, IGTKTCK, IGLKTCK, IGTRLTCK, and IGREGTCK, respectively, and specified below.

A register track-buffer register AND-gate 3061 loads the data from the register track 149 into the buffer register 167 when a logic "0" write gate open signal WGOP (explained later) is supplied to the gate 3061 via an inverter 3062. A data input AND-gate 3063 loads write data WDATA (described later) to the buffer register 167 when the write gate open signal WGOP is logic "1." A buffer register-register track AND-gate 3064 stores the data from the buffer register 167 to the register track 149 when a logic "0" special write gate open signal SWGOP (specified later) is supplied to this gate 3064 via an inverter 3065. A special data input AND-gate 3066 stores special write data SWDATA to the register track 149 when the special write gate open signal SWGOP is logic "1."

FIG. 31 shows the central controller 150 still further comprising registers including accumulator, index, No.0 and No.1 buffer, No.0 and No.1 network buffer, No.0 and No.1 network controls, and network command register-bus AND-gates 3101, 3102, 3103, 3104, 3105, 3106, 3107, 3108, and 3109, which receive accumulator, index, No.0 and No.1 buffer, No.0 and No.1 network buffer, No.0 and No.1 network control, and network command register-bus signals OGACC-B, OGXREG-B, OGBUF0-B, OGBUF1-B, OGNWBUF0, OGNWBUF1, OGNWCTL0, OGNWCTL1, and OGNWCOM, respectively, for supplying the data loaded in the respective registers 161 . . . 166 to the early bus 3050. Accumulator, index, No.0 and No.1 buffer, No.0 and No.1 network buffer, No.0 and No.1 network control, and network command register input AND-gates 3111, . . .,and 3119 supplied with accumulator, index, No.0 and No.1 buffer, No.0 and No.1 network buffer, No.0 and No.1 network control, and a network command input gate signals IGACC, IGXREG, IGBUF0, IGBUF1, IGNWBUF0, IGNWBUF1, IGNWCTL0, IGNWCTL1, and IGNWCOM, load the data from a late bus 3120 into the respective registers 161 . . . 166, respectively A bus AND-gate 3130 supplies the data from the early bus 3050 to the late bus 3120 when a "1" bus gate signal GTR (FIGS. 38. . . ) is supplied thereto. Accumulator, index, and No.0 and No.1 buffer register-data AND-gates 3131, 3132, 3133, and 3134, when activated with a logic "1" accumulator, index, No.0 buffer, or a No.1 buffer-data signal OGACC-D, OGXREG-D, OGBUF0-D, or OGBUF1-D, delivers the data from the respective registers to the data input AND-gate 3063 for the register track buffer register 167. The accumulator register 161 is still further served by an accumulator-logic AND-gate 3141 supplied with an accumulator-logic signal OGACC-L for delivering the accumulator content to various command execution logic circuits and for circulating the data through the accumulator register 161.

V. CENTRAL CONTROLLER

A. CONTROL WIRED LOGICS a. Bit Counter BITCTR) 183

Figure 32:
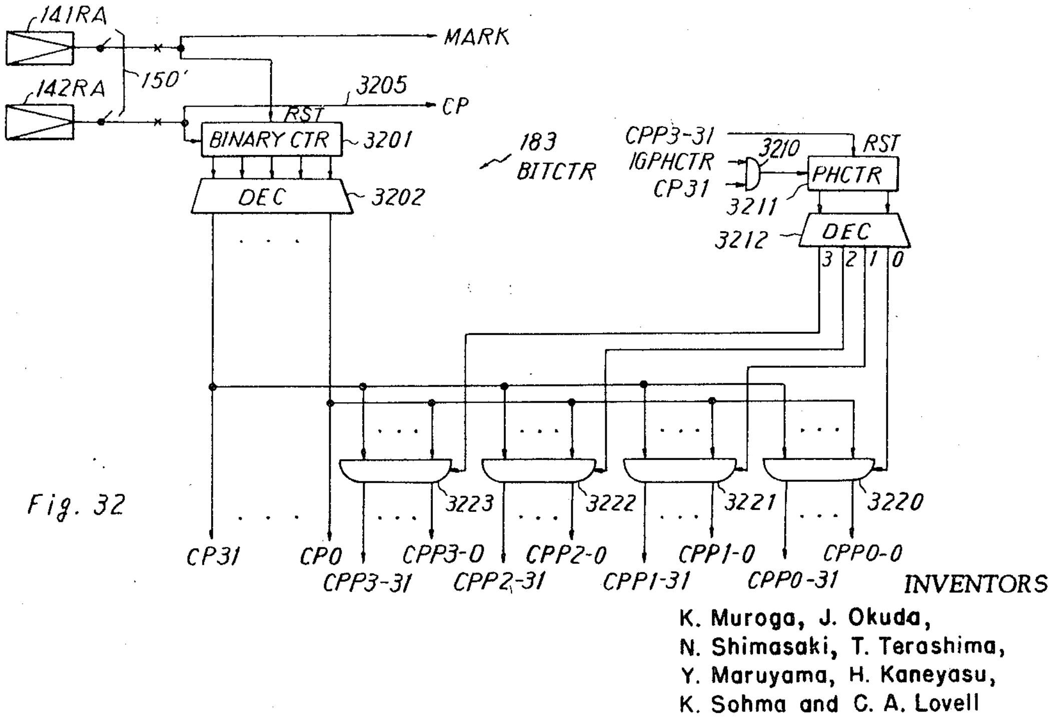

FIG. 32 shows bit counter 183 comprising a binary counter (BINARY CTR) 3201 of five stages and a clock pulse decoder (DEC) 3202 for providing No.0 and No.31 clock pulses CPO and CP31 at the beginning and the end of each word with the Nos.0 through 31 clock pulses CP0 . . . CP31 on different leads. Besides such leads, a further lead 3205 is provided on which clock pulses Cp are placed in bit series.

The binary counter 3201 supplied with the clock pulses CP from the clock track 142 (FIG. 1B) via the clock track read head 142R (FIG. 1B), the clock track read amplifier 142RA, and the switching equipment, and is reset by a mark pulse MARK read from the mark track 141 once in each revolution of the drum 140. The bit parallel output pulses of the respective stages vary from 00000 produced at the instance of the reset, to 00001, 00010, 00011, . . . ,11111, 00000, 00001, . . . as the clock pulses CP are supplied from the clock track 142. The 00000 output pulses thus appear at the beginning of each word. The clock pulse decoder 3202 distributes the 00000, the 00001, . . ., and the 11111 output pulses on No.0, No.1 . . ., No.31 signal leads, respectively, in response to the Nos.0, . . .31 clock pulses CP0, CP31.

A logic "1" phase counter input gate signal IGPHCTR produced in a manner later described during execution of register track scanning and register timing commands RTS and RTM, respectively, allows No.31 clock pulses CP31 to pass through a phase counter input AND-gate 3210 to a phase counter (PHCTR) 3211 which is a binary counter of two stages for the purpose of this explanation. The bit parallel output pulses of the respective stages therefore vary from 00 via 01 and 10 to 11. Such outputs are supplied to a decoder (DEC) 3212 to be successively delivered therefrom via the respective No.0, and 3 leads as the control signals to a No.0, a No.1, a No.2, and a No.3 controlled gate 3220, 3221, 3222, and 3223, each of which allows the Nos.0 through 31 clock pulses CP0 . . . CP31 to pass therethrough when the control input thereto is logic "1," lasting during the Nos.0 through 31 clock pulse period. In this manner, the controlled gates 3220, 3221, 3222, and 3223 successively produce a No.0 through a No.31 clock pulse CPP0-0 . . .CPP0-31 of the No.0 phase, a No.0 through a No.31 clock pulse CCP1-0 . . . CPP1-31 of the No.1 phase, a No.0 through a No.31 clock pulse CCP2-0 . . . CCP2-31 of the No.2 phase, and a No.0 through a No.31 clock pulse CCP3-0 . . . CCP31-31 of the No.3 phase, respectively. The last clock pulse CCP3-31 resets the phase counter 3211. The Nos.0 through 3 phase clock pulses are thus derived in synchronism with a No.0 through a No.3 word as counted from the time point following the No.31 clock pulse which started production of these clock pulses CPP0-0 . . . CPP3-31.

b. Word Counter (WRDCTR) 184 and Address Register (ADREG) 186

Figure 33:
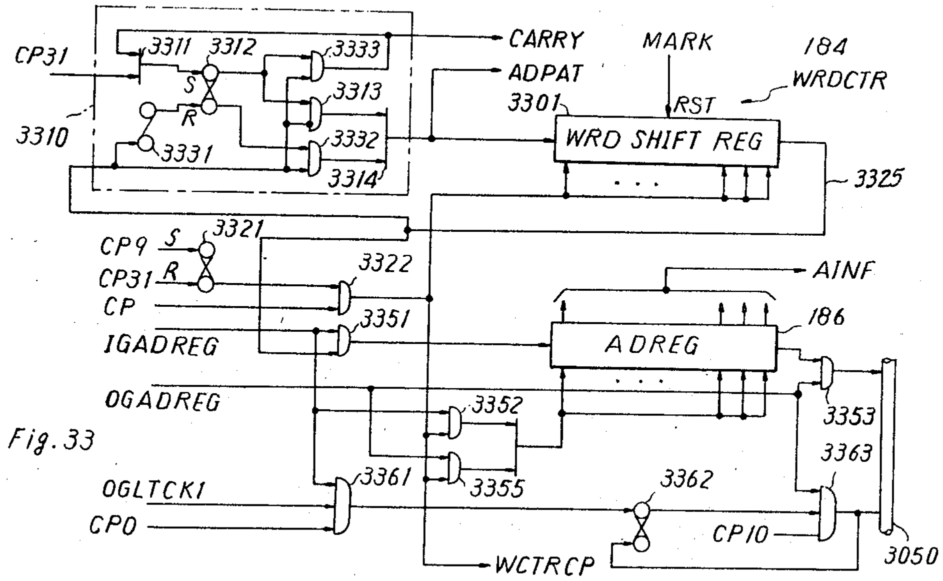

FIG. 33 shows the word counter 184 comprising a 10-bit shift register (WRD SHIFT REG) 3301 reset by each mark pulse MARK. The preceding No.31 clock pulse CP31 supplied to a serial adder 3310 sets via an adder input OR-gate 3311acarry flip-flop 3312 whose logic "1" set output is supplied via an INHIBIT gate 3313 and an adder output OR-gate 3314 to the shift register 3301 at the time point of the next following No.0 clock pulse. A step flip-flop 3321 is set by the preceding No.31 clock pulse CP31 and reset by the next succeeding No.9 clock pulse CP9 to allow the Nos.0 through 9 clock pulses among the clock pulses CP to serve, via a word counter shift clock AND-gate 3322, as word counter shift clock pulses WCTRCP. The shift register 3301 is shifted by the latter shift clock pulses to supply at the time point of the No.0 clock pulse a first logic "0" pulse via a lead 3325 back to the serial adder 3310. This first "0" pulse resets via an inverter 3331 the carry flip-flop 3312 to produce no logic "1" output via an adder output AND-gate 3332 and thereby to remove the logic "1" output of the serial adder 3310 at the time point of the No.1 clock pulse. The following Nos.1 through 8 clock pulses produce no change in the serial adder 3310 and the shift register 3301 except that the logic "1" datum is shifted to the No.0 bit position of the shift register 3301 by the time point of the No.9 clock pulse. The following No.31 clock pulse CP31 again sets the carry flip-flop 3312. Inasmuch as a logic "1" pulse is now supplied to the lead 3325 from the shift register 3301, no logic "1" pulse is produced from the serial adder 3310 but a carry pulse CARRY via a carry output AND-gate 3333. It is now known that the logic states of various pulses at various time points are as follows:

| Time | Lead 3325 | Reset Output | Set Output | AND 3332 | Inhibit 3313 | Carry |
|---|---|---|---|---|---|---|
| MARK | 0 | 0 | 1 | 0 | 1 | 0 |
| CP1 | 0 | 1 | 0 | 0 | 0 | 0 |
| . | | | | | | |
| . | | | | | | |
| . | | | | | | |
| CP0 | 1 | 0 | 1 | 0 | 0 | 1 |
| CP1 | 0 | 0 | 1 | 0 | 1 | 0 |
| CP2 | 0 | 1 | 0 | 0 | 0 | 0 |
| . | | | | | | |
| . | | | | | | |
| . | | | | | | |
| CP0 | 0 | 0 | 1 | 0 | 1 | 0 |
| CP1 | 1 | 1 | 1 | 1 | 0 | 0 |
| CP2 | 0 | 1 | 0 | 0 | 0 | 0 |
| . | | | | | | |
| . | | | | | | |
| . | | | | | | |
| CP0 | 1 | 0 | 1 | 0 | 0 | 1 |
| CP1 | 1 | 0 | 1 | 0 | 0 | 1 |
| CP2 | 0 | 0 | 1 | 0 | 1 | 0 |
| CP3 | 0 | 1 | 0 | 0 | 0 | 0 |
| . | | | | | | |
| . | | | | | | |
| . | | | | | | |
| CP0 | 0 | 0 | 1 | 0 | 1 | 0 |
| CP1 | 0 | 1 | 0 | 0 | 0 | 0 |
| CP2 | 1 | 1 | 0 | 1 | 0 | 0 |
| CP3 | 0 | 1 | 0 | 0 | 0 | 0 |
| . | | | | | | |
| . | | | | | | |
| . | | | | | | |
| CP0 | 1 | 0 | 1 | 0 | 0 | 1 |
| CP1 | 0 | 0 | 1 | 0 | 1 | 0 |
| CP2 | 1 | 1 | 0 | 1 | 0 | 0 |
| CP3 | 0 | 1 | 0 | 0 | 0 | 0 |
| . | | | | | | |
| . | | | | | | |
| . | | | | | | |

With reference to the binary code, it is seen that the serial adder 3310 bit serially produces sets of address pattern pulses ADPAT, each pulse pattern being representative of the address of the word to be immediately subsequently read from the drum 140. The shift register 3301 stores such pattern pulses ADPAT so that the content may show at least after the No.9 clock pulse time point the address just mentioned. Also, it is seen that the carry pulses CARRY are produced when carries occur in the binary numbers representing the addresses.

When the address register input gate signal IGADREG produced in a manner described later is a logic "1," the content of the shift register 3301 is supplied in bit series to the address register 186 via an address register input AND-gate 3351 in synchronism with each set of the word counter shift clock pulses WCTRCP supplied also thereto via an address register step AND-gate 3352. The address register 186 being a 10-bit shift register therefore produces at the No.9 clock pulse time point at the latest the address information signals AINF, which represent the common address of the word being read from the data tracks 143 . . . 149 (FIG. 1B) and remain unchanged either until commencement of the next supply of the content of the shift register 3301 or until commencement of the transfer of the content of the address register 186 via an address register output AND-gate 3353 to the early bus 3050 during execution of the data transfer command MOVE, or forever if the address register input gate signal IGADREG is turned to a logic "0" at or prior to the No.31 clock pulse time point.

When the address register output gate signal OGADREG provided in the manner later described is a logic "1," the word counter shift clock pulses WCTRCP are supplied via an address transfer step AND-gate 3355 to the address register 186 to effect the transfer therefrom as just mentioned above.

In this connection, it is noted that the line equipment number is given by a binary number of 11 digits. In order to provide the eleventh bit, the No.1 line track output gate signal OGLTCKI is delivered to an "eleventh" AND-gate 3361 which is also supplied with the address register input gate signal IGADREG. The No.0 clock pulse CP0 preceding the No.9 clock pulse for resetting the step flip-flop 3321 sets via this AND-gate 3361 an "eleventh" flip-flop 3362 whose logic "1" set output allows the succeeding No.10 clock pulse CP10 to pass through an "eleventh" output AND-gate 3363, when the address register output gate signal OGADREG is logic "1," to become the eleventh bit pulse. Logic "0" and "1" eleventh pulses show that the line circuit 107 (FIG. 3) is accommodated in the Nos.0 and 1 line tracks 145, respectively, in FIG. 30.

c. Revolution Counter (REVCTR) 185

Figure 34:
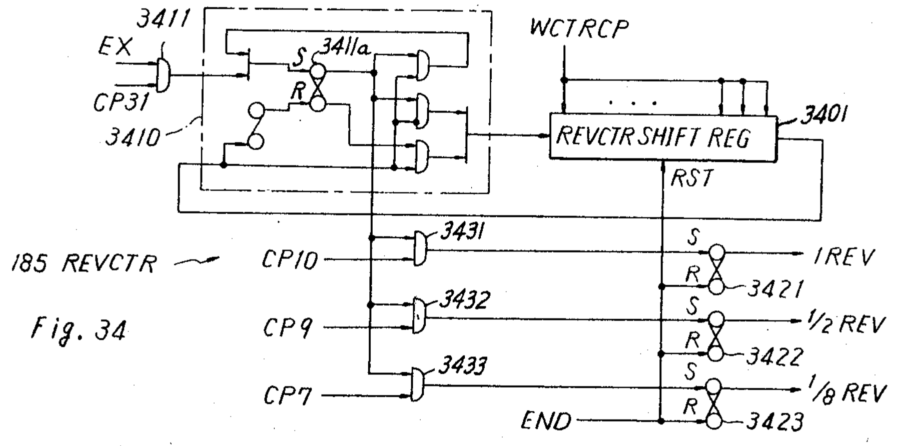
Figure 35:
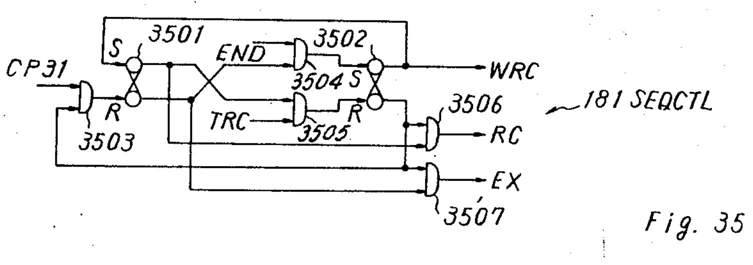
Figure 36:
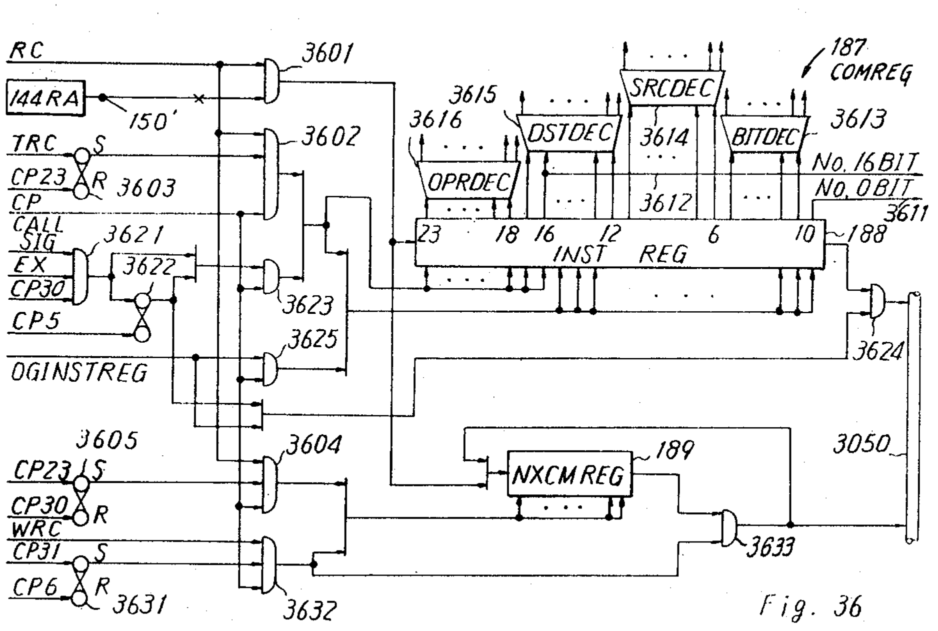

FIG. 34 shows a revolution counter 185 comprising a 10-bit shift register (REVCTR SHIFT REG) 3401 supplied with the word counter shift clock pulses WCTRCP and pulses from a serial adder 3410 which, in turn, receives pulses from an input AND-gate 3411 at the time points of the successive No.31 clock pulses during application thereto of the logic "1" command execution signal EX mentioned later in conjunction with the sequence controller 181 (FIG. 35). The serial adder 3410 is similar in structure and operation to the word counter serial adder 3310 as just mentioned. The shift register 3401, however, is reset by an end pulse END described later relative to the instruction execution logic circuits at either the end or the jump of the command execution (except the jump caused by the mode change command), so that the count stored in the shift register 3401 is always equal to the number of words read from the drum 140 as counted from the beginning of the particular command.

A reference made to the list cited in connection with the word counter 183 (FIG. 32) readily reveals that a No.10, a No.9, and a No.7 clock pulse CP10, CP9, and CP7 appear in synchronism with the logic "1" reset outputs of an adder flip-flop 3411*a* when the counts in the revolution counter 185 is equal to $2^{10}$, $2^9$, $2^7$. Therefore, a full, a half, and a one-eighth flip-flop 3421, 3422, and 3423 are set by the output pulses of the corresponding ones of AND-gates 3431, 3432, and 3433 until reset by an end pulse END, to produce full, half, and one-eighth revolution signals 1REV, 1/2REV, and 1/8REV, respectively.

d. Sequence Controller 181

FIG. 35, shows a sequence controller 181 successively specifying the following three states:

1 The wait command state after completion of execution of a command, searching for the command to be loaded in the command register 187 (FIG. 36) for subsequent execution, the state being identified by a logic "1" wait-read-command, (or, shortly, wait command) signal WRC, 2 The read command state of loading a command from the command track 144 (0 or 1 in FIG. 30) having the program segment being executed into the command register 187 (FIG. 36), the state being designated by a logic "1" read command signal RC, and 3 The command execution state of executing a command loaded in the command register 187 (FIG. 36), the state being represented by a logic "1" command execution signal EX.

A logic "1" wait command signal WRC, when produced, sets a first flip-flop 3501. In this state where a second flip-flop 3502 is in the set state, it is impossible for a No.31 clock pulse CP31 to pass through a first input AND-gate 3503 and for an end pulse END to pass through a second AND-gate 3504. A logic "1" wait command termination pulse TRC described later, however, resets via a third input AND-gate 3505 the second flip-flop 3502 to produce a "1" read command signal RC via a first output AND-gate 3506. In this state, it is impossible for an end pulse END to pass through the first input AND-gate 3504 and for another wait command termination pulse TRC to change the state. A No.31 clock pulse CP31, however, resets via the first input AND-gate 3503 the first flip-flop 3501 to produce a command execution signal EX via a second output AND-gate 3507. In this state, it is impossible for another No.31 clock pulse to change the state and for a wait command termination pulse TRC to pass through the third AND-gate 3505. An end pulse END, however, sets the second flip-flop 3502 to produce a new wait command signal WRC.

In this manner, the sequence controller 181 produces, in response to a relevant one of a No.31 clock pulse CP31, a termination pulse TRC, and an end pulse END, a sequence of three states represented by the signals EX, RC and WRC mentioned above. Inasmuch as the appearance of a wait command termination pulse TRC and an end pulse END takes place at the time point of the No.31 clock pulse and the flip-flops 3501 and 3502 are the delayed type, the logic "1" wait command signal WRC, the logic "1" read command signal RC, and the logic "1" command execution signal EX appear and disappear at the successive No.0 clock time positions.

e. Command Register (COMREG) 187 and a Portion of Wired Logics for Some Commands Referring to FIG. 36, it is at first assumed that the sequence controller 181 just-mentioned produces a logic "1" read command signal RC. During execution of normal flow of a program segment, the instruction and the next command address registers 188 and 189 are supplied with a command from that address of the command tracks 144 which is designated by the previous content of the next command address register 189 via a command AND-gate 3601 supplied with the read command signal RC. The instruction and the next command address registers 188 and 189 handle 24-bits and seven-bits, respectively. An instruction step AND-gate 3602 supplied with that set output of a first flip-flop 3603 set by a termination pulse TRC and reset by the succeeding No.23 clock pulse CP23 which assumes the logic "1" state during a time interval covering the Nos.0 through 23 clock pulse time positions, allows the clock pulses CP within the latter time interval to become a set of shift clock pulses for the instruction register 188. A next command address step AND-gate 3604 supplied with that set output of a second flip-flop 3605 set by the No.23 clock pulse CP23 and reset by the No.30 clock pulse CP30 which becomes a logic "1" during a time interval of the Nos.24 through 30 clock pulse time points, makes the clock pulses CP within the latter time interval serve as the shift clock pulses for the next command address register 189. The Nos.0 through the No.23 and the Nos.24 through 30 bit positions of each command word, namely, the instruction and the next command address are loaded into the instruction and the next command address registers 188 and 189, respectively. The Nos.0 and 16 bit positions of the instruction loaded in the instruction register 188 are derived via No.0 bit line and No.16 bit line 3611 and 3612, respectively. The bit, the source, the destination, and the operation code areas BIT, SRC, DST, and OP, respectively, of the instruction are decoded by bit, source, destination, and operation decoders (BITDEC, SRCDEC, DSTDEC, and OPRDEC) 3613, 3614, 3615, and 3616, respectively, to be supplied on one each of $2^5$ or 32 output leads and one each of three sets of $2^6$ or 64 output leads, respectively.

If a logic "1" call signal CALLSIG is supplied from the operation decoder 3616 via one of the 64 leads to a call signal input AND-gate 3621, a No.0 clock pulse CP0 supplied thereto together with the logic "1" command execution signal EX (FIG. 35) sets a third flip-flop 3622 which is reset by the succeeding No.5 clock pulse CP5 so that shift clock pulses are supplied via a segment address transfer step AND-gate 3623 to the instruction register 188 for the Nos.0 through 5 clock pulse interval and so that the logic "1" set output may be supplied to an instruction register output AND-gate 3624 to deliver to the early bus 3050 the instruction data loaded at the Nos.0 through 5 bit positions in the instruction register 188.

A logic "1" instruction register output gate signal OGINSTREG produced during execution of the data load and store commands either for the Nos.0 through 15 or for the Nos.16 through 31 clock pulse time positions in the manner later described, opens the instruction register output AND-gate 2624. Furthermore, the logic "1" instruction register output gate signal OGINSTREG allows either the Nos.0 through 15 or the Nos.16 through 31 clock pulses among the clock pulses CP to pass through a data transfer step AND-gate 3625 to become shift clock pulses for the No.0 through the No.15 bit positions of the instruction register 188. Therefore, the Nos.0 through 15 bit positions of an immediate load command are transferred from the instruction register 188 via the early bus 3050 to the accumulator register 161 (FIG. 31) as will appear later.

Figure 37:
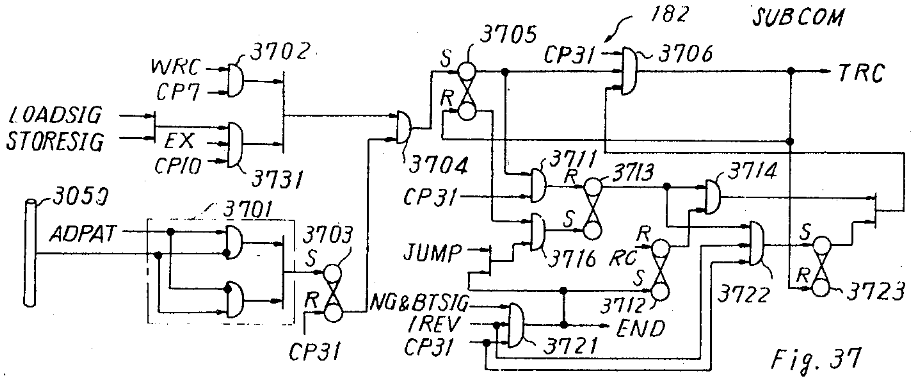

During appearance of a logic "1" wait command signal WRC, a logic "1" set output of a fourth flip-flop 3631 set by a No.31 clock pulse CP31 and reset by a No.6 clock pulse CP6 allows the clock pulses CP to pass through a next command transfer AND-gate 3632 to be supplied to a next command address register output AND-gate 3633 and to become shift clock pulses, which transfer the next command address from the next command address register 189 via the early bus 3050 to a subsequent command logic circuit 182 described in the following explanation.

f. Subsequent Command Logic Circuit (SUBSCOM) 182 and a Portion of Wired Logics for some Commands FIG. 37 shows a subsequent command logic circuit 182 comprising an exclusive-OR-gate 3701 for comparing a series of address pattern pulses ADPAT supplied thereto from the word counter serial adder 3310 with a pulse sequence supplied also thereto via the early bus 3050 from various data tracks 143 . . . 149 (FIG. 1B) and source registers, such as the accumulator, the index, . . . , the address, the instruction, and the next command address registers 161 . . . 167 (FIG. 1B), 187 (188 and 189 in FIG. 36). While a logic "1" wait command signal WRC is supplied to a wait command AND-gate 3702, that pulse sequence is supplied to the exclusive-OR-gate 3701 from the next command address register 189 (FIG. 36) which identifies the address of the command to be executed next in the same one of the command tracks 144. When seven logic "1" and/or logic "0" pulses of this pulse sequence as counted from the time point of a No.0 clock pulse are identical with a set of the address pattern pulses ADPAT representing the common address of the data tracks 143 . . . 149 to be read next, the exclusive-OR-gate 3701 produces no disagreement pulse. As a consequence, a disagreement flip-flop 3703 remains in the reset state into which it was driven by the preceding No.31 clock pulse CP31 at least until the necessary comparison ends at the time point of the No.7 clock pulse. Under the circumstances, the No.7 clock pulse CP7 passes through the wait command AND-gate 3702 and then an identity AND-gate 3704 to set an identity flip-flop 3705, which now delivers a logic "1" set output to termination AND and jump reset AND-gates 3706 and 3711. Inasmuch as the logic "1" wait command signal WRC follows a logic "1" read command and the subsequent logic "1" instruction execution signals RC and EX, a busy test full revolution flip-flop 3712 remains in the reset state into which it was driven by the logic "1" read command signal RC on reading the command having the next command address found identical with the common address. In case a jump flip-flop 3713 is in the reset state and the termination AND-gate 3706 has been supplied with a logic "1" signal via a not-jump AND-gate 3714, the No.31 clock pulse CP31 following the No.7 clock pulse having reached the termination AND-gate 3706 now passes therethrough to become a termination of wait command pulse or, shortly, a termination pulse TRC which produces a logic "1" read command signal RC (FIG. 35) and resets the identity flip-flop 3705.

If a bit of the address pattern pulses ADPAT is different from the corresponding bit of the next command address, the exclusive-OR-gate 3701 produces a "1" output pulse which sets the disagreement flip-flop 3703. Whenever such a disagreement or a nonidentity occurs before appearance of each No.7 clock pulse, the wait command signal WRC remains in the logic "1" state to continue the application of the same next command address to the exclusive-OR-gate 3701. Therefore, the next command address which remains unchanged in the next command address register 189 is compared with the successive sets of the address pattern pulses ADPAT until an identity is found to terminate the comparison, thereby producing a termination pulse TRC as just mentioned.

Now, the command identified by the next command address previously stored in the next command address register 189 begins to be stored afresh in the command register 187 at the No.24 clock pulse time point immediately following the termination pulse TRC.

A jump pulse JUMP, if produced at the end of the execution of a command in the manner to be described below, passes through a jump input AND-gate 3716 to set the jump flip-flop 3713. In this case the termination AND-gate 3706 is not supplied with a logic "1" signal from the not-jump AND-gate 3714. Therefore, the No.31 clock pulse CP31 following the No.7 clock pulse having set the identity flip-flop 3705 cannot become a termination pulse TRC but only passes through the jump reset AND-gate 3711 to reset the jump flip-flop 3713. The following No.31 clock pulse CP31 now passes through the termination AND-gate 3716. The jump pulse JUMP thus causes the command having the next address plus one to be loaded into the next command address register 189.

If execution of a directory number translation and busy test command described later does not come to an end before the drum 140 completes one revolution, the No.31 clock pulse CP31 which appears at the end of the one revolution passes through a busy test AND-gate 3721 supplied with a logic "1" directory number translation and busy test signal NG&BTSIG and a logic "1" full revolution signal IREV, to become an end pulse END and to set the jump flip-flop 3713 and the busy test full revolution flip-flop 3712. This end pulse END causes the sequence controller 181 (FIG. 35) to produce a logic "1" wait command signal WRC which initiates the comparison described above. Even if an identity is found, the No.31 clock pulse CP31 following the No.7 clock pulse cannot pass through the termination AND-gate 3706 but only resets the jump flip-flop 3713. The next No.31 clock pulse CP31 passes through a two-jump AND-gate 3722 to set a two-jump flip-flop 3723. It is therefore the next following No.31 clock pulse CP31 which passes through the termination AND-gate 3706 to become a termination pulse TRC and to reset the identity and the two-jump flip-flops 3705 and 3723. It is thus appreciated that the command having the next address plus two is loaded in this case into the next command address register 189.

Referring further to FIG. 37, it is now assumed that a data store or load command STORE or LOAD signal is stored in the command register 187 during the read command state to deliver a logic "1" data store or load signal STORESIG or LOADSIG via the relevant one of the output leads of the operation decoder 3616 to a load and store input AND-gate 3731, to which a logic "1" command execution signal EX begins to be supplied when the read command state comes to an end at the No.31 clock pulse time point. The No.0 clock pulse appearing at the beginning of the command execution signal EX causes the index register 162 (FIG. 31) to supply its content to various exclusive-OR gates, such as the exclusive-OR-gate 3701, via the early bus 3050 in a manner later mentioned. The content of the index register 162 in this case is the address of the word on that one of the data tracts 143 . . . 149 which is specified in a manner later described to serve as the source or the destination register. If the address consisting of ten bits is identical with the address pattern pulses ADPAT the exclusive-OR-gate 3701 produces no logic "1" output pulse. The No.10 clock pulse CP10 supplied to the load and store input AND-gate 3731 plays the role of the No.7 clock pulse for comparing the next command address with the address pattern pulses ADPAT and produces a logic "1" terminal pulse TRC. In this connection, it should be mentioned that the jump flip-flop 3713 is in the reset state into which it was driven during the wait command state preceding the execution of the data load or store command STORE or LOAD being executed.

B. INSTRUCTION EXECUTION WIRED LOGICS a. Call Wired Logic 176

Referring to FIG. 38, it is assumed that a call command CALL signal is loaded into the command register 187 (FIG. 37) during the read command state to deliver a logic "1" call signal CALLSIG via the relevant one of the output leads of the operation decoder 3616 to a call input AND-gate 3801 to which a logic "1" command execution signal EX begins to be supplied when the read command state comes to an end at the No.31 clock pulse time point. The No.0 clock pulse CP0 appearing at the beginning of the command execution signal EX therefore sets, via the call input AND-gate 3801, a call input flip-flop 3802, whose logic "1" set output is delivered to a section timing AND-gate 3809 and a track timing AND-gate 3810 to allow passage of the logic "1" set outputs of a section number flip-flop 3813 and a track number flip-flop 3814 therethrough, which are set by the No.0 and the No.3 clock pulses CP0 and CP3 and reset by the No.3 and the No.5 clock pulses CP3 and CP5, respectively. Meanwhile, the logic "1" call signal CALLSIG causes the content of the instruction register 188 to be supplied in bit series to the early bus 3050 at the Nos.0 through the following No.5 clock pulse time positions in the manner mentioned above. The segment number which identifies the program segment to be transferred and is loaded in the instruction register 188 (FIG. 36) at the No.1 through the No.5 bit positions is transferred via the early bus 3050 and a section number AND-gate 3815 open for a first period covering the No.1 through the No.3 clock pulses into a track section number register (SECT REG) 3816 of three bits and via a track number AND-gate 3817 open for a second period of the No.4 and the No.5 clock pulse time points into a program track number register (PROG. TRACK REG) 3818 of two bits. The section number and the track number registers 3816 and 3818 are stepped by the clock pulses CP supplied via a section and a track step AND-gate 3821 and 3822, respectively, open for the first and the second periods, respectively. A program track number decoder (TRACK DEC) 3823 thus produces one of the program track output gate signals OGPROG0, OGPROG1, OGPROG2, and OGPROG3 on the corresponding one of the four output leads for use in the No.0 central controller 150 in FIG. 30.

The next No.31 clock pulse CP31 passes through and end AND-gate 3830 to become an end pulse END, which in the instant case represents the completion of a first portion of the call command execution, namely, completion of production of the program track output gate signal OGPROG from the track number register 3818 and storage of the track section number in the section number register 3816. The end pulse END causes the sequence controller 181 (FIG. 35) to produce a logic "1" wait command signal WRC. This actuates the subsequent command logic circuit 182 (FIG. 37) to begin comparison for the next command address contained, as in other various commands, in the call command CALL whose first portion has thus far been executed. The end pulse END resets the input flip-flop 3802 and sets a program segment transfer flip-flop 3831 which now produces a logic "1" program segment transfer signal PROGTRANS to transfer various program segments successively from the program track 143 (FIGS. 1B and 30) specified by the program track output gate signal OGPROG (0 . . . 3 in FIG. 30) to that one of the command tracks 144 (FIG. 30) which does not store the program segment being executed.

Meanwhile, the logic "1" output of a transfer flip-flop 3841 set by the No.6 clock pulse CP6 and reset by the No.9 clock pulse CP9 is supplied to the section step AND-gate 3821 to provide another set of shift clock pulses consisting of the Nos.7 through 9 clock pulses. The logic "1" set output of flip-flop 3841 is also supplied to a section number register output AND-gate 3842. The track section number is thus transferred from the section number register 3816, together with the logic "1" set output of the transfer flip-flop 3841, to a comparator 3851 which is an exclusive-OR gate effective for every Nos.7 through 9 clock pulse period. The comparator 3851 also supplied with the address pattern pulses ADPAT produces no disagreement pulses if the bits of the track section number are identical with the respective Nos.7 through 9 bits of the address pattern pulses ADPAT (FIG. 33) which, roughly speaking, represent in combination the most significant three digits of the addresses and hence the program section number of the program segment being transferred at the moment. So long as the identity holds, a disagreement flip-flop 3852 reset by every preceding No.31 clock pulse CP31 is maintained in the reset state. From the binary expression of the address, it is known that a carry pulse CARRY occurs each time the read heads and hence the command track write heads 144 W (FIG. 1B) scan the No.6 bit position of the No.127 word of a track section. The coincident carry and No.6 clock pulses CARRY and CP6 set, via a coincidence AND-gate 3861, a coincidence flip-flop 3862 which is reset by every No.31 clock pulse CP31. The No.10 clock pulse CP10, following the No.6 clock pulse having set the coincidence flip-flop 3862, sets, via a transfer commencement AND-gate 3863, a transfer commencement flip-flop 3866 whose logic "1" set output is delivered to one input of a transfer termination AND-gate 3871. The next coincident carry and No.6 clock pulses CARRY and CP6 now set via the transfer termination AND-gate 3871 a transfer termination flip-flop 3872 which supplies a logic "1" set output to a final end AND-gate 3876 at the No.6 clock pulse time point during the time when the No.127 word of the required program segment is being transferred. The following No.31 clock pulse CP31 which resets the transfer commencement and termination flip-flop 3866 and 3872, resets the program transfer flip-flop 3831 to produce, instead of the logic "1" program segment transfer signal PROGTRANS, a logic "1" command track change permission signal CTCGOK to be described later in conjunction with the conditional "1" and "0" jump commands.

When the comparator 3851 produces a disagreement pulse, the disagreement flip-flop 3852 is set at the No.9 clock pulse time point at the latest, with the result that the following No.10 clock pulse CP10 never sets the transfer commence flip-flop 3866 until the identity is found in the course the revolution of the drum 140 (FIG. 1B).

b. Line Service Request Detection Command LSRD

Referring to FIG. 39, it is assumed that a line service request detection command LSRD from command track 144-0 or -1 in FIG. 30 is loaded into the command register 187 during the read command state to deliver a logic "1" line service request detection signal LSRDSIG to the relevant one of the output leads of the operation decoder (OPRDEC) 3616 and to deliver a logic "1" track signal to one of the output leads of the source decoder (SCRDEC) 3614. Because of the logic "1" line service request detection signal LSRDSIG, No.0 clock pulse CP0 appearing at the beginning of the command execution signal EX passes through an input AND-gate 3901 to set input flip-flop 3902. As a consequence of the latter flip-flop set state and a logic "1" output from decoder (SRCDEC) 3614, one of track AND-gates 3904, 3905, and 3906 produces the related one of the No.0 line, the No.1 line, and the trunk track output gate signals OGLTCK0, OGLTCK1, and OGTKTCK and the corresponding one of the No.0 line, the No.1 line, and the trunk state circuit group selection signals GLSC0, GLSC1, and GTKSC. At the same time, the flip-flop 3902 produces logic "1" bus gate signal GTR, accumulator register input gate signal IGACC, address information register input gate signal IGADREG, and address register information gate signal GAB.

The information read from the pertinent one of the No.0 line, the No.1 line, and the trunk tracks 145-0, 145-1, and 146 in FIG. 30, is therefore transferred via early bus (EB) 3050 and late bus (LB) 3120 to the accumulator register 161 (FIG. 31). In addition, the address information signals AINF (FIG. 33) designates the line equipment and the trunk equipment numbers from the No.9 clock pulse time position.

If one or more state circuits of the No.0 line, the No.1 line, and the trunk state circuit group 1700, 1701, and 139 produce the logic "1" line service request signals REQ (RINF in FIGS. 19, 22 etc.), a first logic "1" request signal REQ detected during one revolution of the drum 140 passes through a request detection AND-gate 3907 at the time point of the subsequent No.20 clock pulse CP20 to set a request detection flip-flop 3908. Now, the No. 22 clock pulse CP22 passes through a set AND-gate 3909 to become a set pulse SET (SINF) for reserving the line circuit 107 or the trunk 109 (FIG. 1A) which has the address retained in the address register 186 (FIG. 33). The following No.31 clock pulse CP31 passes through an end AND-gate 3910 to become an end pulse END, which resets the input and the request detection flip-flops 3902 and 3908 and causes the sequence controller 181 (FIG. 35) to produce a logic "1" wait command signal WRC.

By the time a logic "1" read command signal RC (FIG. 35) ends, the command register 187 (FIG. 36) has stored, in place of the line service request detection command LSRD (register 188 in FIG. 36) executed in the manner so far described, a next command specified by the next command address (register 189 in FIG. 36) contained in the executed line service request detection command LSRD.

As will be clear from the above, the end pulse END terminates the various signals OGLTCK0, OGLTCK1, or OGTKTCK, GTR, IGACC, IGADREG, GAB, and GLSC0, GLSC1, or CTKSC. The address register 186 (FIG. 33) therefore contains that common address of the data tracks 143 . . . 149 which represents, as for the line and the trunk tracks 145 and 146, the line and the trunk equipment numbers of the line circuit 107 whose dial tone connection request was detected and of the trunk 109 whose incoming connection request was detected. In addition, the accumulator register 161 (FIG. 31) stores the data relating to the directory number, the service class, and the chart class of the subscriber accompanying the last-mentioned line circuit 107 or the trunk group number, the trunk class, and the trunk number of the last-mentioned trunk 109.

When an originating or an incoming call cannot be detected after one complete revolution of the drum 140, the full revolution signal 1REV becomes logic "1." As a result, the No.31 clock pulse CP31 passes through a jump AND-gate 3911 to become a jump pulse JUMP and at the same time an end pulse END.

c. Trunk Selection Command TKSEL

Referring to FIG.40, it is assumed that a trunk selection command TKSEL loaded in the command register (187 in FIG.36) delivers a logic "1" trunk selection signal TKSELSIG via the relevant one of the operation decoder output leads (OPRDEC 3616) to an input AND-gate 4001, through which the No.0 clock pulse CP0 accompanying the command execution signal EX sets an input flip-flop 4002 to become logic "1" trunk track output gate signal OGTKTCK, bus gate signal GTR, index register input gate signal IGXREG, accumulator-logic signal OGACC-L, address register input gate signal IGADREG, address register information control gate signal GAB, and trunk state circuit group selection signal GTKSC.

The information read out of the trunk track 146 (FIG. 30) is therefore sent via the early bus 3050 to the index register 162 (FIG. 31) and to an exclusive-OR-gate 4011 which receives another input from the accumulator register 161 (FIG.31) supplied, during execution of the preceding microcommands, with the trunk group number of the trunk to be selected.

When the trunk group number supplied from the trunk track 146 (FIG. 30) at the Nos.0 through 7 clock pulse period becomes identical with that supplied from the accumulator register 161 (FIG. 31) the exclusive-OR-gate 4011 does not set a disagreement flip-flop 4012 which is reset by every preceding No.31 clock pulse CP31. The immediately following No.8 clock pulse CP8 sets via an identity AND-gate 4013 an identity flip-flop 4014 whose logic "1" set output is supplied to an idle INHIBIT gate 4015. If a logic "0" busy signal BUSY is received from the trunk state circuit 139 designated at the No.10 clock pulse time point, the logic "1" set output sets via the INHIBIT gate 4015 an idle detection flip-flop 4016. As a consequence, the No.22 clock pulse CP22 passes through a set AND-gate 4017 to become a set pulse SET (SIMF) supplied to the designated trunk state circuit 139 (FIG.22 . . .). The following No.31 clock pulse CP31 passes through an end AND-gate 4018 to become an end pulse END. At this time, the content of the relevant word on the trunk track 146 is retained in the index register 162.

If no logic "0" busy signal BUSY is received from all of the trunk state circuits 139 (FIG. 22 . . . 27) of the identified trunk group during a half revolution of the drum 140, the No.31 clock pulse CP31 appearing together with a "1" half revolution signal 1/2REV and the trunk selection signal TKSELSIG passes through a jump AND-gate 4019 to become a jump pulse JUMP and at the same time an end pulse END.

d. Link Matching Command LKMAT LKMATSIG

Referring to FIG. 41, it is assumed that a logic "1" link matching signal LKMARSIG is supplied to an input AND-gate 4101, through which the No.0 clock pulse CP0 accompanying appearance of the command execution signal EX sets an input flip-flop 4102 to produce logic "1" link track output gate signal OGLKTCK (FIG.30), bus gate signal GTR, No.1 network control register input gate signal IGNWCTL1 (FIG.31), accumulator-logic signal OGACC-L (FIG. 31), and address register input gate signal IGADREG (FIG. 33).

The information read out of the link track 147 (FIG. 30) is therefore successively transferred via the early bus 3050 to an exclusive-OR-gate 4111 and to the No.1 network control register 165-1 (FIG.31). The No.0 network control register 165-0 (FIG. 31) is loaded, during execution of the preceding microcommands, with the line and the trunk equipment numbers LEN and TEN (FIG. 29*e*). The accumulator register 161 (FIG.31) is loaded with the line and the trunk link frame numbers LLF and TLF (FIG.29*c*) at the Nos.0 through 5 bit positions. The exclusive-OR-gate 4111 compares the data supplied from the accumulator register 161 with the data read out of the link track 147, for the NOS.0 through 5 clock pulse period. When the agreement is reached, a disagreement flip-flop 4112 remains in the reset state at least until the No.5 clock pulse time point. Thereafter, the following No.6 clock pulse CP6 sets a B-link idle flip-flop 4113 via an identity AND-gate 4114.

The logic "1" set output of the B-link idle flip-flop 4113 and the logic "1" link matching signal LKMATSIG causes the following No.20 clock pulse CP20 to pass through an address AND-gate 4121 to become logic "1" address register information gate signal GAB and B-link state circuit group selection signal GLKSC, which cooperate to designate a B-link state circuit together with the address information signals AINF sent from the address register 186 (FIG.33). In case the B-link busy signal BUSY is logic "1" (FIG. 20), the same No.20 clock pulse CP20 resets via a B-link busy AND-gate 4122 the B-link idle flip-flop 4113 to turn the set output into a logic "0" signal. This precludes the following No.31 clock pulse CP31 from resetting the input flip-flop 4102 via a comparison termination AND-gate 4123 and thus requires a repetition of comparison. In case the B-link busy signal BUSY is logic "0," the B link idle flip-flop 4113 remains in the set state so that the comparison may be terminated by the following No.31 clock pulse CP31 supplied to the termination AND-gate 4123. In the latter case, the same No.31 clock pulse CP31 passes through a B-link set AND-gate 4126 to become a logic "1" address register information gate signal GAB, B-link trunk state circuit group selection signal GLKSC, and B link set pulse SET for specifying the sought B-link 203 (FIGS. 2 and 6) and reserving the same and to set an A and C link address flip-flop 4131. Also, various gate signals OGLKTCK, GTR, IGNWCTL1, OGACC-L, and IGADREG turn to a logic "0" so that the No.1 network control register 165-1 (FIG. 31) may be loaded with the data of the link track 147 (FIG. 30) pertaining to the reserved B-link 203 and that the address register 186 (FIG. 33) may retain the address information signals AINF of the reserved B-link 203.

The following No.6 and No.8 clock pulses CP6 and CP8 therefore pass through A and C link address AND-gates 4132 and 4133 to become an A and a C link state circuit group selection signal GLKSCA and GLKSCC, respectively. The A and the C link busy signals BUSY are received at A and C busy AND-gates 4134 and 4135, respectively, from the A and the C link state circuits (FIG. 20) designated by the A and the C link states circuit group selection signals GLKSCA and GLKSCC and the A and C link address information signals AINF-AC produced by the Nos.0 and 1 network control registers 165 (0 or 1 in FIG. 31) as later described. If at least one of the A and the C link busy signals BUSY is logic "1," at least one of the above-mentioned No.6 and No.8 clock pulses CP6 and CP8 sets an A or C link busy flip-flop 4136, whose logic "1" set output in cooperation with the logic "1" set output of the A and C link address flip-flop 4131 makes the following No.10 clock pulse CP10 pass through a B link reset AND-gate 4137 to become logic "1" address register information gate signal GAB, B link state circuit group selection signal GLKSC, and B link reset pulse RESET for again identifying the sought and reserved B-link 203 and cancelling the reservation (FIG. 20). The B-link reset pulse RESET is also supplied to a restart AND-gate 4139 for repeating the link matching operation and to the A and C link address flip-flop 4131 to reset the same and thereby to make the same ready for the repeated operation.

If both the A and the C link busy signals BUSY are logic "0," the A or C link busy flip-flop 4136 remains in the reset state into which it is successively driven by every clock pulse CP passing through an A and C link idle AND-gate 4141 supplied with the logic "1" set output of the B-link idle flip-flop 4113. The logic "1" reset output of the A or C link busy flip-flop 4136 sets an A and C link idle flip-flop 4142. The following No.20 and No.22 clock pulses CP20 and CP22 therefore pass through an A and a C link set AND-gates 4144 and 4145 to become logic "1" A link state circuit group selection signal GLKSCA and A link set pulse SET and logic "1" C link state circuit group selection signal CLKSCC and C link set pulse SET, respectively, for reserving the A and the C links (FIGS. 2 and 20). Also, the following No.31 clock pulse CP31 passes through an end AND-gate 4148 to become an end pulse END, which resets the A and C link idle flip-flop 4142.

When the required idle A, B, and C links are not found before completion of a half revolution of the drum 140, a half revolution signal ½ REV together with the signal LKMATSIG enables a No.31 clock pulse pass through a jump AND-gate 4149 to become a jump pulse JUMP and the end pulse END.

e. Office Code Translation Command OFCTRL

Figure 42:
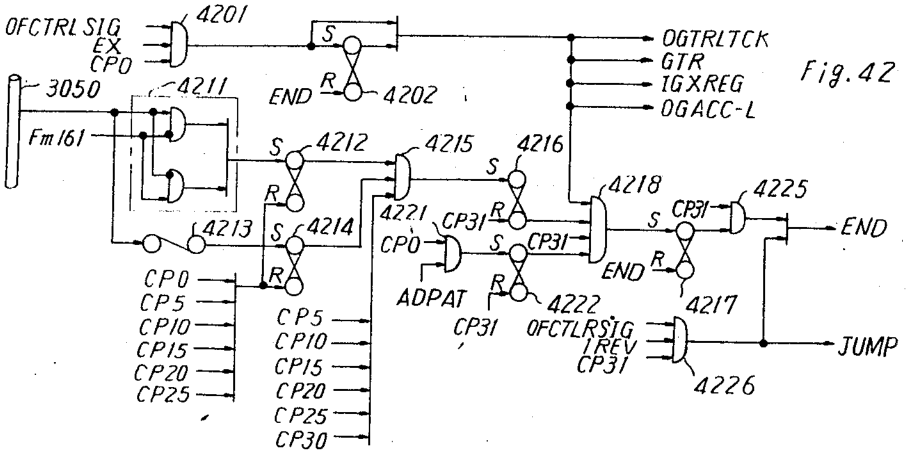

Referring to FIG. 42, it is assumed that a logic "1" office code translation signal OFCTRLSIG is supplied to an input AND-gate 4201, through which a No.0 clock pulse CP0 occurring at the beginning of a logic "1" command execution signal EX sets an input flip-flop 4202 to produce logic "1" translator track output gate signal OGTRLTCK, bus gate signal GTR, index register input gate signal IGXREG, and accumulator-logic signal OGACC-L.

The information read out of the translator track 148 (FIG. 30) is supplied successively to an exclusive-OR-gate 4211 via the early bus 3050 and to the index register 162 (FIG. 31). At the same time, the office code of the called subscriber and the chart class of the calling subscriber preset in the accumulator register (ACC) 161 (FIG. 31) are sent to the exclusive-OR-gate 4211. When even a bit supplied via the early bus 3050 is not identical with the corresponding bit delivered from the accumulator register (ACC) 161, the exclusive-OR-gate 4211 produces a disagreement pulse to set a disagreement flip-flop 4212 which is reset by any one of the Nos.0, 5, 10, 15, 20 and 25 clock pulses CP0, CP5, CP10, CP15, CP20, CP25. Meanwhile, logic "1" and/or "0" pulses representing the data placed on the translator track 148 (FIG. 30) are supplied via the early bus 3050 and an inverter 4213 to set input of a disagreement check flip-flop 4214 which is also reset by any one of the Nos.0, 5, 10, 15, 20 and 25 clock pulses. Inasmuch as at least one logic "0" pulse appears during each of the Nos.1 through 4, Nos.6 through 9, Nos.11 through 14, Nos.16 through 19, Nos.21 through 24, and Nos.26 through 29 clock pulse periods, the disagreement check flip-flop 4214 sends a logic "1" set output to a disagreement AND-gate 4215. Under this circumstance, an overall disagreement flip-flop 4216 reset by the preceding No.31 clock is set so that a subsequent No.31 clock pulse CP31 cannot set an identity flip-flop 4217 via an identity AND-gate 4218.

When the least significant digit of the address pattern pulses ADPAT is a logic "1," the No.0 clock pulse CP0 sets via an even address AND-gate 4221 an even-address flip-flop 4222 which is reset by every No.31 clock pulse CP31 so that no logic "1" set output may be produced while an odd-numbered words are being read. If an identity is found in the meantime by the exclusive-OR-gate 4211 between the data read from the translator track 148 (FIG. 30) up to No.29 bit position of an even-numbered word and the data preset in the accumulator register (ACC) 161 (FIG. 31), the No.31 clock pulse CP31 appearing at the end of the even-numbered word sets the identity flip-flop 4217 via the identity AND-gate 4218. The next following No.31 clock pulse CP31 occurring at the end of the next following odd-numbered word passes through an end AND-gate 4225 to become an end pulse END which resets the logic circuit flip-flop 4202. The data loaded now into the index register 162 (FIG. 31) is the data of the No.1 word $W_1$ (FIG. 29*e*) of the translator track 148 (FIG. 30) as a result of the requested translation.

When an identity of the bits being compared in the exclusive-OR-gate 4211 is not found during one complete revolution of the drum 140, the No.31 clock pulse CP31 appearing together with the end of the "1" full revolution signal 1REV and signal OFCTLRSIG passes through a jump AND-gate 4226 to become a jump pulse JUMP and an end pulse END.

f. Directory Number Translation and Busy Test Command NG&BT

Figure 43:
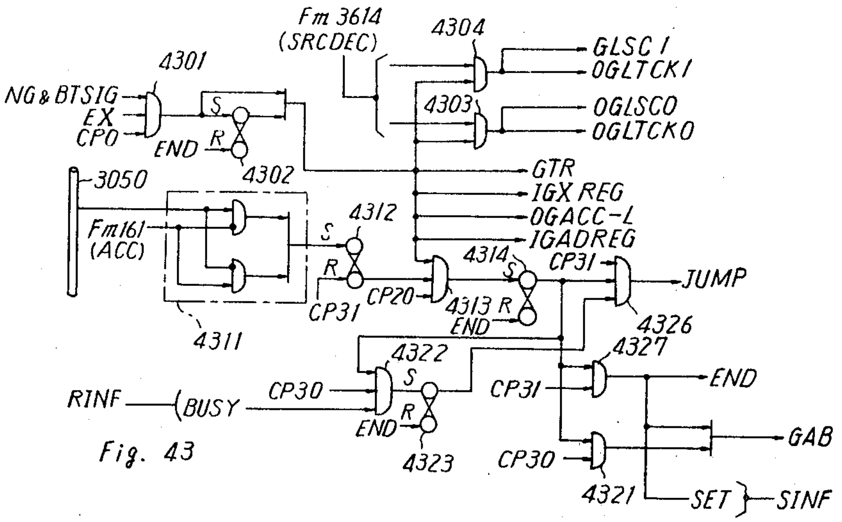

Referring to FIG. 43, it is assumed that a logic "1" directory number translation and busy test signal NG&BTSIG is supplied to an input AND-gate 4301, through which the No.0 clock pulse CP0 appearing together with the logic "1" command execution signal EX stes an input flip-flop 4302. A logic "1" line track signal supplied from the source decoder (SCR-DEC) 3614 passes through the relevant one of the line track AND-gates 4303 and 4304 to become the related one of the Nos.0 and 1 line track output gate signals OGLTCK0 and OGLTCK1. The input flip-flop 4302 further produces logic "1" bus gate signal GTR, index register input gate signal IGXREG, accumulator-logic signal OGACC-L, and address register input gates signal IGADREG. The logic "1" line track signal further provides the corresponding one of the Nos.0 and 1 line state circuit group selection signals GLSC0 and GLSC1.

The information on the designated one of the line tracks 145 (0 or 1 in FIG. 30) is successively sent via the early bus 3050 to an exclusive-OR-gate 4311 to which the corresponding information of the accumulator register 161 (ACC) (FIG. 31) is also supplied. So long as the identity is maintained between the called local subscriber's directory number supplied from the accumulator register (ACC) 161 and the directory number stored on the designated one of the line tracks 145 (0 or 1 in FIG. 30), a disagreement flip-flop 4312 remains in the reset state into which it was driven by the preceding No.31 clock pulse CP31. The following No.20 clock pulse CP20 therefore sets via an identity AND-gate 4313 an identity flip-flop 4314. The next No.30 clock pulse CP30 passes through an address AND-gate 4321 to become a logic "1" address register information gate signal GAB, which cooperates with the address information signal AINF to cause the busy signal BUSY to be received from the designated line circuit 107 (FIG. 19).

If the busy signal BUSY is a logic "1", the same No. 30 clock pulse CP30 sets via a busy AND-gate 4322 a busy flip-flop 4323. Therefore, the following No.31 clock pulse CP31 passes through a jump AND-gate 4326 to become a jump pulse JUMP. If the busy signal BUSY is a logic "0," the No.31 clock pulse CP31 passes through an end/set AND-gate 4327 to become a logic "1" address register information gate signal GAB, a set pulse SET (FIG. 19) for reserving the designated line circuit 107, and an end pulse END.

If an identity is not found during a full revolution of the drum 140, the command subsequently executed is what has an address equal to the next address plus two, as mentioned in conjunction with the subsequent command logic circuit 182 (FIG. 37).

g. Data Transfer Command Move

Figure 44:
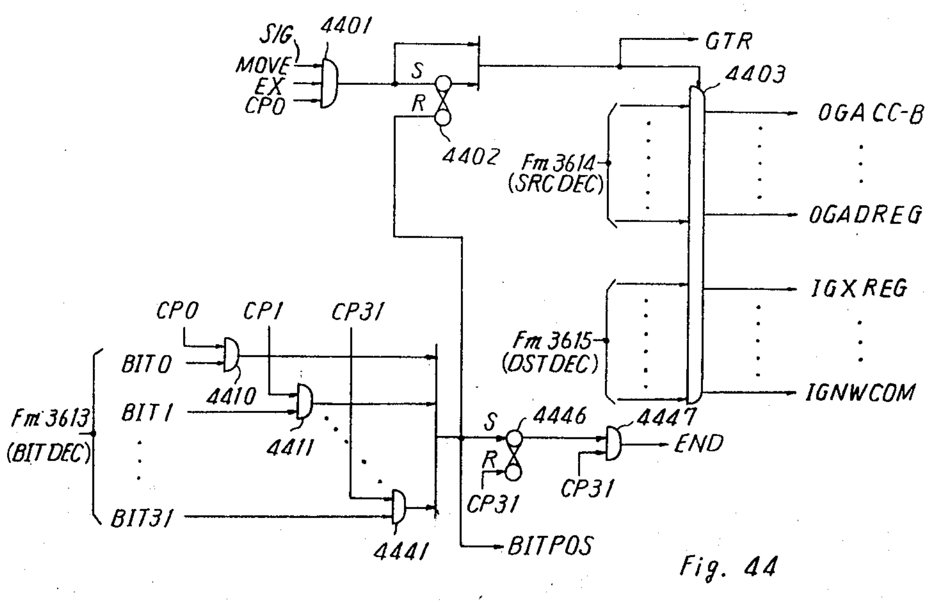

Referring to FIG. 44, it is assumed that a logic "1" data transfer signal MOVESIG is supplied to an input AND-gate 4401, through which a No.0 clock pulse CP0 sets an input flip-flop 4402 when a logic "1" command execution signal EX is also supplied thereto. The set output of the flip-flop 4402 becomes a bus gate signal GTR and a logic "1" control signal for a controlled gate 4403 through which a logic "1" source signal supplied from the source decoder (SCRDEC) 3614 becomes logic "1" accumulator, index, Nos.0 and 1 buffer, Nos.0 and 1 network buffer, Nos.0 and 1 network control, and network command register-bus signals OGACC-B, OGXREG-B, OGBUF0-B, OGBUF1-B, OGNWBUFO, OGNMBUF1, OGNWCTLO, OGNWCTL1, and OGNWCOM or a "1" address register output gate signal OGADREG-D and through which a logic "1" destination signal delivered from the destination decoder (DSTDEC) 3615 becomes one of logic "1" index, Nos.0 and 1 buffer, Nos.0 and 1 network buffer, Nos.0 and 1 network control, and network command register input gate signals IGXREG, IGBUFO, IGBUF1, IGNWBUFO, IGNWBUF1, IGNWCTLO, IGNWCTL1, and IGNWCOM. Thus, the content of the source register is transferred in bit series to the destination register.

Inasmuch as a logic "1" bit number signal BITO, BIT1, . . . BIT31 is supplied one at a time from the bit decoder (BITDEC) 3613, the relevant one of a No.0 through a No.31 clock pulse CP0 . . . CP31 passes through a corresponding one of a No.0 through a No.31 bit number AND-gate 4410, 4411, . . . , and 4441 to become a bit position pulse BITPOS for setting an end flip-flop 4446 and for resetting the input flip-flop 4402 at the time point corresponding to the bit position of a word to terminate transfer of the data. In this manner, it is possible to transfer the required number of bits from the source register. The next No.31 clock pulse CP31 passes through an end AND-gate 4447 to become an end pulse END.

h. Data Load Store Command LOAD and STORE

Figure 45:
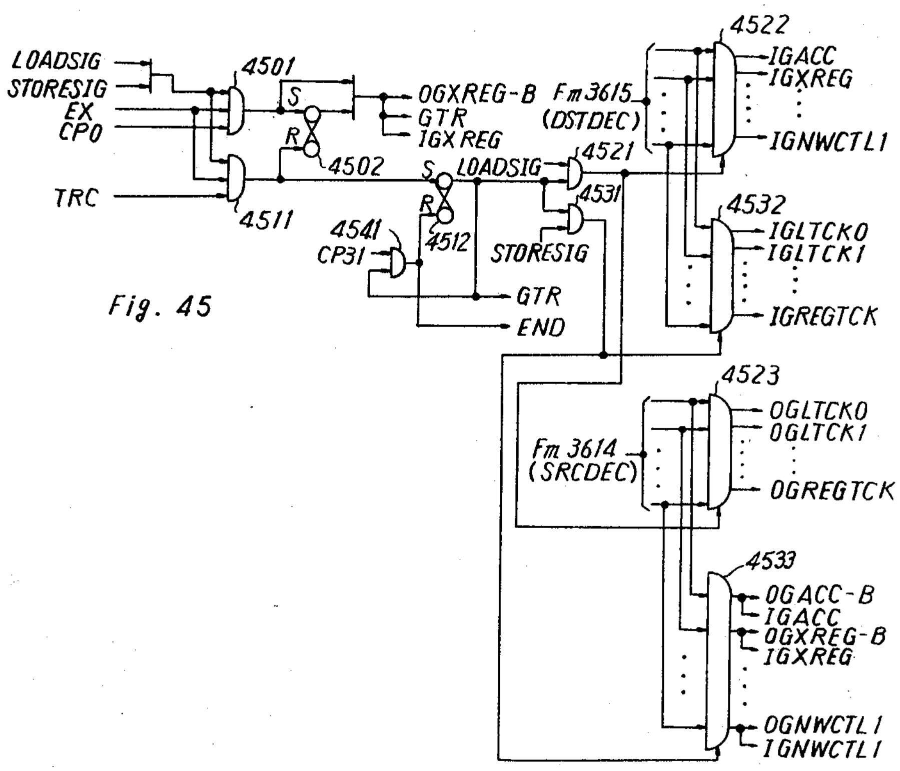

Referring to FIG. 45, it is recalled that the simultaneous presence of a "1" command execution signal EX and either a "1" data load or a "1" data store signal LOADSIG or STORESIG makes the exclusive-OR-gate 3701 seek an identity between the address pattern pulses ADPAT and the content of the index register 162 (FIG. 31) specifying the address of the word to be loaded from the drum 140 into the destination register or to be stored from the source register into the drum 140 and that a termination pulse TRC indicates a success in finding out the identity. The above-mentioned logic "1" command execution signal EX is what sets, in cooperation with the No.0 clock pulse CPO, via a comparison AND-gate 4501 a comparison flip-flop 4502 to produce logic "1" index register-bus signal OGXREG-B, bus gate signal GTR, and index register input gate signal IGXREG.

Via an operation AND-gate 4511, the termination pulse TRC resets the comparison flip-flop 4502 and sets an operation flip-flop 4512, whose logic "1" set output serves as a bus gate signal GTR and either passes through a load operation AND-gate 4521 to become a logic "1" control signal for a load destination controlled gate 4522 and a load source controlled gate 4523 or through a store AND-gate 4531 to become a "1" control signal for a store destination controlled gate 4532 and a store source controlled gate 4533. A logic "1" signal supplied from the destination decoder (DSTDEC) 3615 passes through the load destination controlled gate 4532 to become the relevant one of the accumulator, the index, the Nos.0 and 1 buffer, the Nos.0 and 1 network buffer, and the Nos.0 and 1 network control register input signals IGACC, ISXREG, IGBUFO, IGBUF1, IGNWBUFO, IGNWBUF1, IGNWCTLO, and IGNWCTL1 used in FIG. 31. A logic "1" signal supplied from the source decoder (SRCDEC) 3614 passes through the load source controlled gate 4523 to become the relevant one of the Nos.0 and 1 line, the trunk, the link, the translator, and the register track output gate signals OGLTCK0, OGLTCK1, OGTKTCK, OGLKTCK, OGTRLTCK, and OGREGTCK used in FIG. 30. A logic "1" signal supplied from the destination decoder (DSTDEC) 3615 passes through the store destination controlled gate 4532 to become the relevant one of the Nos.0 and 1 line, the trunk, the link, the translator, and the register track input gate signals, IGLTCK0, IGLTCK1, IGTKTCK, IGLKTCK, IGTRLTCK, and IGREGTCK used in FIG. 30. A logic "1" signal supplied from the source decoder (SRCDEC) 3614 passes through the store source controlled gate 4533 to become in FIG. 31 a relevant pair of the accumulator register-bus and the accumulator register input gate signals OGACC-B and IGACC, the index register-bus and the index register input gate signals OGXREG-B and IGXREG, the No.0 or 1 buffer register input gate signals OGBUFO-B or OGBUF1-B and IGBUF0 or IGBUF1, the No.0 or 1 network buffer register-bus and network buffer register input gate signals OGNWBUF0 or OGNWBUF1 and IGNWBUF0 or IGNWBUF1, and the No.0 or 1 network control register-bus and network control register input gate signals OGNWGTL0 or OGNWCTL1 and IGNWCTL0 or IGNWCTL1. The following No. 31 clock pulse CP31 passes through an end AND-gate 4541 to become and end pulse END.

i. Immediate Load Command I-LOAD

Figure 46:
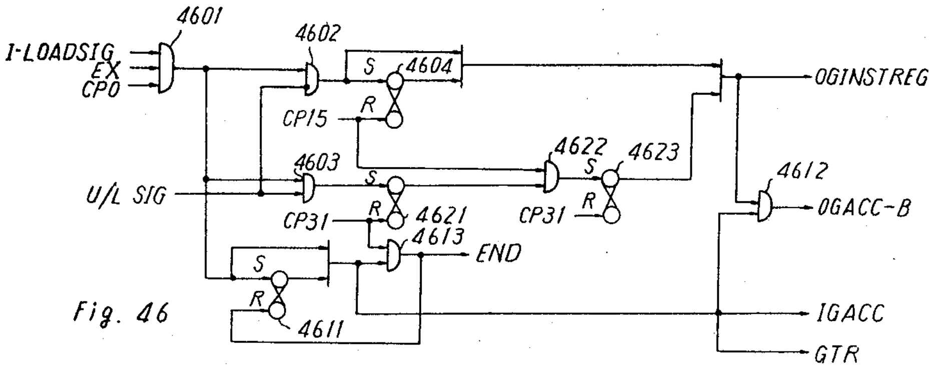

Referring to FIG. 46, it is assumed that a logic "1" immediate load signal I-LOADSIG is supplied to an input AND-gate 4601 through which the No.0 clock pulse CPO accompanying the occurrence of a logic "1" command execution signal EX reaches an INHIBIT gate 4602 and a preliminary AND-gate 4603. When a logic "0" datum is loaded into the No.16 bit position of an I-LOAD word, a logic "0" upper/lower signal U/L supplied from the instruction register 188 (FIG. 36) allows the logic "1" output pulse of the input AND-gate 4601 to set, via the INHIBIT gate 4602, a lower flip-flop 4604 which is subsequently reset by the No.15 clock pulse CP15. In this case, the instruction register output gate (3624 in FIG. 36) signal OGINSTREG assumes the logic "1" state for the No.0 through No.15 clock pulse periods. The logic "1" output pulse of the input AND-gate 4601 sets an input flip-flop 4611, whose logic "1" set output passes through an output INHIBIT gate 4612 to become a logic "1" accumulator register-bus signal OGACC-B (FIG. 31) for the Nos.16 through 31 clock pulse period. The latter logic "1" set output also serves as a logic "1" bus gate signal GTR and accumulator register input gate signal IGACC (FIG. 31). Due to the logic "1" instruction register output gate signal OGINSTREG, the data stored in the instruction register 188 (FIG. 36) at the Nos.0 through 15 bit positions are thus loaded into the accumulator register 161 (FIG. 31) at the Nos.16 through 31 bit positions by the No.15 clock pulse time point and moved then to the Nos.0 through 15 bit positions after elapse of the Nos.16 through 31 clock pulse period. The No.31 clock pulse CP31 passes through an end AND-gate 4613 to become the end pulse END.

When a logic "1" upper/lower signal U/L SIG is supplied, the preliminary AND-gate 4603 allows the logic "1" output pulse of the input AND-gate 4601 to set a preliminary flip-flop 4621. The logic "1" set output of the preliminary flip-flop 4621 allows the No.15 clock pulse CP15 to set, via an upper AND-gate 4622, an upper flip-flop 4623 whose logic "1" set output serves as the last mentioned instruction register output gate (3624 in FIG. 36) signal OGINSTREG for the Nos.16 through 31 clock pulse time interval. In this case, the data loaded in the accumulator register (ACC) 161 in FIG. 31 initially at the Nos.0 through 15 bit positions are moved to the Nos.16 through 31 bit positions by the No.15 clock pulse time point. At the end of the Nos.16 through 31 clock pulse time periods, such data are further moved to the Nos.0 through 15 bit positions while the data loaded in the instruction register 188 (FIG. 36) at the Nos.0 through 15 bit positions are loaded into the accumulator register 161 (FIG. 31) at the Nos.16 through 31 bit positions.

j. Command Track Change Command CTCG

Figure 47:
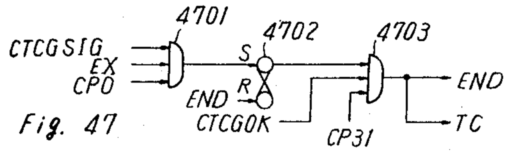
Figure 48:
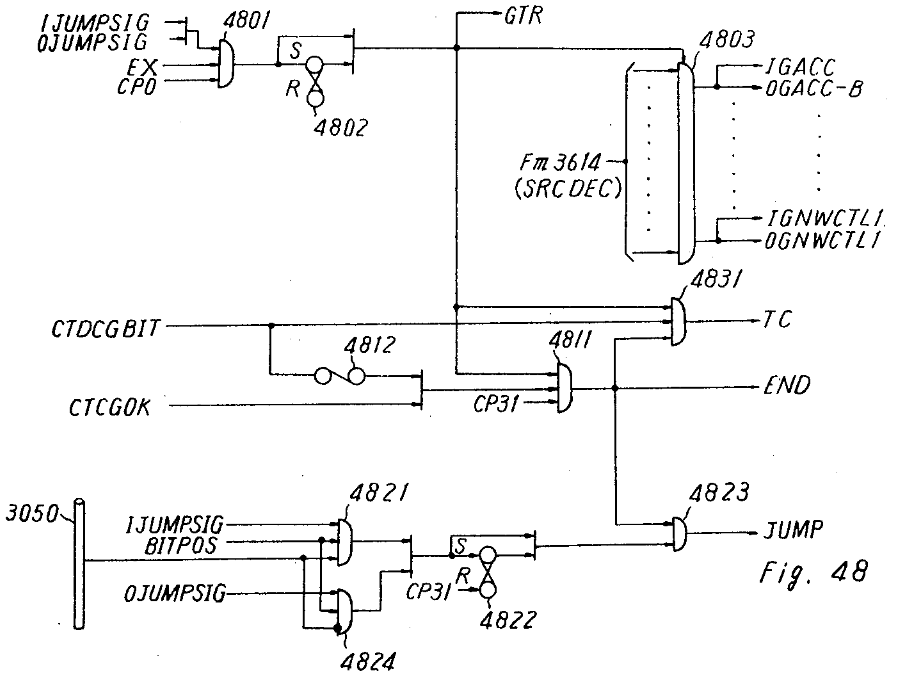

Referring to FIG. 47, it is assumed that a logic "1" command track change signal CTCGSIG is supplied to an input AND-gate 4701 from the operation decoder (OPRDEC) 3616. The No.0 clock pulse CPO supplied at the commencement of the logic "1" command execution signal EX sets an operation flip-flop 4702. If the logic "1" command track change permission signal CTCGOK is supplied from the call wired logic 176 (FIG. 38), the following No.31 clock pulse CP31 passes through an operation AND-gate 4703 to become a command track change pulse TC and, at the same time, an end pulse END. If the latter command track change permission signal CTCGOK is a logic "0" when the operation flip-flop 4702 begins to produce the logic "1" set output, the command track change pulse TC is not produced until the designated program segment has been transferred to that one of the command tracks 144 (0 or 1 in FIG. 30) which does not store the command track change command CTCG SIG being executed in FIG. 47.

k. Conditional "1" and "0" Jump Commpands 1JUMP and 0JUMP with or without Command Track Change Referring to FIG. 48, it is assumed that a logic "1" conditional "1" or a logic "1" conditional "0" jump signal 1 JUMPSIG or 0 JUMPSIG is supplied to an input AND-gate 4801, through which the No.0 clock pulse CPO appearing at the commencement of a logic "1" command execution signal EX sets an input flip-flop 4802. The logic "1" set output of this flip-flop 4802 serves as a logic "1" bus gate signal GTR and a control signal for a source controlled gate 4803. A logic "1" signal supplied from the source decoder (SRCDEC) 3614 becomes a relevant pair of the accumulator register input gate and register-bus signals IGACC and OGACC-B, the index register input gate and register-bus signals IGXREG and OGXREG-B, the Nos.0 or 1 buffer register input gate and register-bus-signals IGBUF0 or IGBUF1 and OGBUF0-B or OGBUF1-B, the No.0 or 1 network buffer register input gate and register-bus signals IGNWBUF0 or IGNWBUF1 and OGNWBUFO or OGNWBUF1, and the No.0 or 1 network control register input gate and register-bus signals IGNWCTL0 or IGNWCTL1 and OGNWCTL0 or OGNWCTL1, some of which signals are shown in FIG. 31.

The command track change bit signal CTCGBIT is supplied from the No.0 bit position of the instruction register 188 (FIG. 36) to an end AND-gate 4811 via an inverter 4812. For a conditional logic "1" or a conditional logic "0" jump command without the command track change operation, the command track change bit signal CTCGBIT is logic "1" In this case, the No.31 clock pulse CP31 produced at the end of the word passes through the end AND-gate 4811 to become an end pulse END.

Meanwhile, that logic "1" bit pulse supplied via the early bus 3050 (FIG. 31) from the designated one of the accumulator, the index, the No.0 and the No. 1 buffer, the No.0 and the No.1 network buffer, and the Nos.0 and 1 network control registers 161, . . . 165 in FIG. 31 at the bit position specified by the logic "1" bit position pulse BITPOS when the conditional "1" jump signal 1JUMPSIG is logic "1," sets via a condition AND-gate 4821 a condition flip-flop 4822 whose logic "1" output allows the end pulse END pass through a jump AND-gate 4823 to become a jump pulse JUMP. As for the conditional logic "0" jump command 0JUMP SIG, a logic "0" bit pulse exercises for a condition INHIBIT gate 4824 the same role as the logic "1" bit pulse for the condition AND-gate 4821 as just mentioned.

It is now assumed that the conditional logic "1" or the conditional logic "0" jump command 1JUMP or 0JUMP comprises a logic "1" bit for changing the command track at the No.0 bit position of the word. The end pulse END is not produced in this case until the track change permission signal CTCGOK becomes a logic "1." When the track change permission signal CTCGOK is of logic "1," the end pulse END passes through a track change AND-gate 4831 to become a command track change pulse TC.

In some cases, such as during the execution of the mode change command, it is necessary to perform the jump depending on, for example, whether the set output of a flip-flop, such as 5121 in FIG. 51, is a logic "1" or a logic "0." This sort of conditional logic "1" or "0" jump command 1JUMP or 0JUMP is executed by the same logic circuit, provided that the respective set outputs of a group of at most 32 flip-flops, not shown, are led to the early bus 3050 via set output-early bus AND gates supplied with the respective clock pulses CPO through CP31.

l. Register Track Hunt Command RTH

Referring to FIG. 49, it is assumed that a logic "1" register track hunt signal RTHSIG is supplied to an input AND-gate 4901, through which the No.0 clock pulse CPO accompanying the commencement of the logic "1" command execution signal EX sets an input flip-flop 4902 whose logic "1" set output serves as the register track output gate signal OGREGTCK (FIG. 30).

The No.0 clock pulses having passed through the input AND-gate 4901 are supplied, together with the address pattern pulses ADPAT, to a four-word counter 4910. More particularly, these pulses are applied to a first-stage INHIBIT gate 4911 which produces first-stage pulses at the beginnings of the odd-numbered words $W_1$, $W_3$ . . . of the drum 140. The logic "1" set output of a first-stage flip-flop 4912 set by the first-stage pulses and reset by the No.31 clock pulses CP31 is supplied to a second-stage INHIBIT gate 4913 which receives the address pattern pulses ADPAT and the No.1 clock pulses CP1. The second-stage INHIBIT gate 4913 produces second-stage pulses when access is made to the No.1 bit positions of the words having the addresses of $4n - 1$, where $n$ is an integer. These second-stage pulses set a second-stage flip-flop 4914 whose logic "1" set output serves as the output of the four-word counter 4910. This four-word counter output sets a four-word flip-flop 4920 via a set AND-gate 4921 at the time point of the No.31 clock pulse CP31. The set output of this flip-flop 4920 may be termed the No.0 word signal which becomes a logic "1" at the beginnings of the words having the addresses of $4n$. The set output is supplied to a reset AND-gate 4922 to turn the "1" No.0 word signal to a logic "0" at the end of such words.

The No.0 word signal is supplied to an idle register INHIBIT gate 4931 which receives the logic "1" register track hunt signal RTHSIG, the data supplied from the register track 149 via the early bus 3050, and the No.0 clock pulse CPO and thus sets an idle register flip-flop 4932 when a logic "0" datum is stored in the activity area ACT of the register track 149 (FIGS. 30 and 31).

Meanwhile, the No.0 word signal (FIG. 29*e*) is supplied to a quarternary counter 4940. Due to an end pulse END produced at the end of the previous register track hunt or the register service request detection command execution, first and second flip-flops 4941 and 4942 are normally set and reset, respectively, to provide logic "1" No.3.0 word and No.0.1 word signals. Therefore, the "1" set output of the four-word flip-flop 4920 resets the first flip-flop 4941 via a first AND-gate 4943 when the No.31 clock pulse CP31 appears at the end of the No.0 word. This provides a logic "1" No.1.2 word signal and sets the second flip-flop 4942 via a second AND-gate 4944 when the No.31 clock pulse CP31 appears at the end of the No.1 word. This provides another logic "1" No.2.3 word signal and sets the first flip-flop 4941 via a third AND-gate 4945 at the end of the No.2 word. This provides a logic "1" No.3.0 word signal.

While the No.3.0 and the No.0.1 word signals are both logic "1," the logic "1" set output of the idle register flip-flop 4932 produces via a No.0 buffer AND-gate 4951 a "1" No.0 buffer register-data signal OGBUF0-D. Similarly, logic "1" No.1 buffer register-data, accumulator register-data, and index register-data signals OGBUF1-D, OGACC-D, and OGXREG-D are produced during the Nos.1, 2, and 3 word periods, respectively. Furthermore, a logic "1" write gate open signal WGOP is produced accompanied by these register-data signals OGBUF0-D, OGBUF1-D, OGACC-D, and OGXREG-D. The index register-data signal OGXREG-D is fed back to an idle register reset AND-gate 4956, through which the No.31 clock pulse CP31 resets the idle register flip-flop 4932 at the end of the No.3 word, This No.31 clock pulse passes through an end AND-gate 4957 to become an end pulse END. In this manner and by virtue of the logic "1" write gate open signal WGOP, the data preset in the Nos.0 and 1 buffer registers 163 (0 and 1), the accumulator register (ACC) 161, and the index register (XREG) 162 in FIG. 31 are transferred via the register track buffer register 167 (FIG. 30) to the register track 149 (FIG. 30).

If an idle register track section is not found after a one-eighth revolution of the drum 140 (FIG. 34), a jump AND-gate 4958 produces a jump pulse JUMP which also serves as an end pulse END.

m. Register Service Request Detection Command RSRD

Referring further to FIG. 49, it is now assumed that a logic "1" register service request detection signal RSRDSIG is supplied to the input AND-gate 4901.

As in the case of the register track hunt command RTH, the No.0 and the No.1 buffer, the accumulator, and the index register input gate signals IGBUF0, IGBUF1, IGACC, and IGXREG used in FIG. 31 are produced during the Nos.0, 1, 2 and 3 word periods, respectively. When the register service request detection signal RSRDSIG and the No.1 buffer register input gate signal IGBUF1 (FIG. 31) are both logic "1" and if the timing flag area TMF or the call back flag area CBF of the register track 149 (FIG. 31) stores a logic "1" datum, the No. 29 or 30 clock pulse CP29 or CP30, which is gated by a TMF designation AND-gate 4960 or a CBF designation AND-gate 4961, passes through a service request register AND-gate 4971 to set a service request register flip-flop 4972, and to become a logic "1" write gate open signal WGOP. This logic "1" write gate signal WGOP substitutes a logic "0" datum for the logic "1" datum of the timing flag area TMF or call back flag area CBF. The accumulator input gate signal IGACC, the logic "1" set output of the service request register flip-flop 4972 and the following No.0 clock pulse CPO are supplied to a special write data AND-gate 4974 which produces a logic "1" special write gate open pulse SWGOP at the No.2 word No.0 time position and a logic "0" special write data pulse SWDATA at the same time via an inverter 4975. The activity area ACT of the register track 149 (FIG. 31) is thereby supplied with a logic "0" datum. Meanwhile, data stored in the Nos.0 through 3 words of the register track section 149 (FIG. 31), whose register service request has been detected, are transferred to the Nos.0 and 1 buffer, the accumulator (ACC), and the index registers 163-0, 163-1, 161, and 162, respectively, in FIG. 31.

At the end of the No.3 word period as designated by the index register input gate signal IGXREG, the No.31 clock pulse CP31 passes through an end AND-gate 4977 to become an end pulse END. If the register service requested is not detected during a one-eighth revolution of the drum 140 (FIG. 34) the jump AND-gate 4958 produces a jump pulse JUMP which also serves an end pulse END.

n. Register Track Scan Command (RTS)

Referring to FIG. 50A, it is assumed that a logic "1" register track scan signal RTSSIG is supplied to an input AND-gate 5001 and that an idle register track section has already been supplied with logic "1" data at the activity, the registering, and the first digit areas ACT, REG and FSTDI and with pertinent data at the trunk equipment number and the class areas TEN and CLASS during the execution of the register trunk hunt command RTH in the flow of the dial tone connection program (to be described later in detail) or supplied with the above-mentioned logic "1" and pertinent data at the digit information area DG1 during the execution of the command RTH in the flow of the trunk DPICT OR THE TRUNK MFIRT connection program (described later in detail). It is to be noted here that the description is made in this section for the convenience relating to the register timing command RTM for the register track section which stores the numeric signal together with the logic 1" data in the activity and the sending areas ACT and SND. As in the case with the command RTH (FIG. 49), a four-word counter 5002 produces a logic "1" output at the No.2 clock pulse time point of No.4*n*-1 word period. A commencement flip-flop 5003 is therefore set at the No.0 phase No.0 clock pulse time point to produce logic "1" register track output gate signal OGREGTCK, phase counter input gate signal IGPHCTR, index address information gate signal GAX, and trunk state circuit group selection signal GTKSC. This set output further provides, in cooperation with the No.0 phase No.2 clock pulse CPPO-2 and via a trunk equipment number flip-flop 5005, logic "1" index register input gate signal IGXREG and bus gate signal GTR lasting for the period of the No.0 phase No.3 clock pulse through No.12 clock pulse to allow the transfer of the trunk equipment number TEN from the register track 149 (FIG. 30) to the index register 162 (FIG. 31) which now supplies the trunk equipment number to the trunk state circuits 139 (FIGS. 1A, 22) as the index address information signals AINFX.

Meanwhile, the set output of the commencement flip-flop 5003 is also delivered to an operation AND-gate 5006 which receives the data from the register track 149 (FIG. 30) via the early bus 3050 and the No.2 phase No.0 clock pulse CPPO-0 preceding the No.0 phase No.2 clock pulse which caused the index register 162 (FIG. 31) to open the supply and the receive gates of the trunk state circuit specified by the signal AINFX. It follows therefore that, when the activity area ACT (FIG. 29*e*) stores a logic "1" datum, a first activity flip-flop 5007 is set to provide a logic "1" first activity signal ACTSIG for the No.0 phase No.1 clock pulse through the No.1 phase No.31 clock pulse periods. The logic "1" output pulse of the operation AND-gate 5006 sets, via a register scan AND-gate 5008 supplied with the register scan signal RTSSIG, a second activity flip-flop 5009 which provides a logic "1" second activity signal ACTF. This second activity signal ACTF allows a logic "1" datum stored in the registering or the sending area REG OR SND (FIG. 29*e*) to set via a registering or a sending AND-gate 5010 or 5011 a registering or a sending flip-flop 5012 or 5013 at the No.0 phase No.1 or 2 clock pulse time point and thereby to produce a "1" registering or sending signal REGSIG OR SNDSIG. If a logic "1" flag signal FLAG is not received from the trunk state circuit (FIGS. 1A, 22–25 and 27) designated by the index address information AINFX, the No.0 phase No.20 clock pulse CPPO-20 resets the second activity, the registering, and the sending flip-flops 5009, 5012, and 5013 via a reset INHIBIT gate 5014. Otherwise, the reset of the latter flip-flops is delayed until the time point of the No.3 phase No.31 clock pulse CPP3-31.

When the second activity signal ACTF is logic "1," the first bit (showing that the specified trunk is an ORT as in FIG. 22) of the trunk class area TCLASS of the register track 149 sets via an ORT AND-gate 5015 an ORT flip-flop 5016 at the No.0 phase No.24 clock pulse time point to produce a "1" ORT signal ORTSIG.

When the second activity signal ACTF is logic "1" and the first digit area FSTDI stores a logic "1" datum, the No.1 phase No.1 clock pulse CPP1-1 passes through a first digit AND-gate 5020 to become a logic "1" write gate open signal WGOP. This logic "1" write gate open signal WGOP substitutes a logic "0" write datum supplied at this time point to the data input AND-gate 3063 for the "1" datum of the first digit area FSTDI which produces this write gate open signal WGOP.

In the case of a call originating at a local subscriber, it is necessary to judge whether the first digit of the dial information received from the trunk (ORT) 112 (FIG. 22) seized by the call when the ORT state circuit 1001 in FIG. 22 for such trunk ORT is designated by the index address information signals AINFX (FIG. 31), is a 0, a 1, or neither thereof. If the first digit is 0, the calling subscriber is calling a subscriber in the foreign area and should dial, it is assumed, eight further digits. If the first digit is 1, the calling subscriber is requesting a special service, such as an emergency call, and should dial two further digits. If the first digit is neither, the calling subscriber is calling a local subscriber and should dial, it is presumed, five further digits. The dial information of either the dial pulses or of the multifrequency signals as converted by a code converter (CONV) 5021 is decoded by a decoder (Dec.) 5022 to be supplied to a dial information translator 5023 via Nos.0 and 1 output leads of the decoder 5022. If the dial information is 0, logic "1" and "0" signals are supplied to the translator 5023 together with the No.1 phase Nos.6 through 9 clock pulses CPP1-6, CPP1-8, CPP1-8, and CPP1-9. The translator 5023 therefore produces at the time points of these clock pulses a pulse sequence of "1110" representing a binary number of 0111, which is the one's complement of 1000 or namely, a decimal number of eight. If the dial information is 1, the translator 5023 produces a pulse sequence of "1011" representing 1101 which is the one's complement of 0010 or, namely, two in the decimal code. If the dial information is one of 2 . . . 9, the translator 5023 is supplied only with the clock pulses and produces a pulse sequence of "0101" representing 1010 which is the one's complement of 0101 or, namely, a decimal number of five. If the dial information being discussed is the first-digit information, the pulse sequence passes through a translator output AND-gate 5024 supplied with the logic "1" set output of a first digit flip-flop 5025. The pulse sequence is thus stored in the buffer register 167 in FIG. 30 by the write gate open signal WGOP supplied from a digit write AND-gate 5026 at the bit positions complying with digit count area DIGC (FIG. 29*e*).

When the first-digit dial information is being registered from a trunk DPICT or a trunk MFIRT or being sent, the signals derived via the early bus 3050 (FIGS. 30 and 31) from the digit information area DGI are supplied via a digit information AND-gate 5027 to a four-bit digit information shift register 5028. The clock pulses CP are also supplied to the digit information shift regi ter 5028 via a digit information step AND-gate 5029. Supplied with the logic "1" set output of the first digit count flip-flop 5025 and the No.1 phase Nos.6 through 9 clock pulses, a digit information shift register output INHIBIT gate 5030 produces an inverted digit information signal. When the sending signal SNDSIG is a logic "1," the inverted digit information is substituted, via a digit information send AND-gate 5031, for the previous digit count stored in the digit count area DIGC. When the registering signal REGSIG is a logic "1" and the ORT signal ORTSIG is a logic "0," the inverted digit information is substituted, via a digit information INHIBIT gate 5032, for the previous digit count.

When the registering signal REGSIG is still a logic "1" by the time, namely, whenever a logic "1" flag signal FLAG is received (from FIGS. 22–25 and 27) in FIG. 50A, the No.1 phase Nos.14 and 15 clock pulses CPP1-14 and CPP1-15 pass through an interdigit timing count AND-gate 5033 to become a logic "1" write gate open pulses WGOP. These write gate open pulses WGOP supply logic "0" write data pulses to the register track 149 (FIG. 30) to clear the data previously stored in the interdigit timing count area IDTC by a register timing command RTM as later described.

When the first-digit dial information is being registered in the register track 149 (FIG. 30) at a track section concerned, a logic "0" signal derived from the first identification record area IDR is supplied via the early bus 3050 and a common inverter 5040 to an identification record register AND-gate 5041 to become a logic "1" identification record register signal. This signal serves as a write data signal WDATA and also as a write gate open signal WGOP to substitute a logic "1" datum for the previous logic "0" datum which produced this "1" identification record register signal.

The "1" identification record register signal sets a digit register flip-flop 5042 which is reset by every No.4 clock pulse CP4. Therefore, a digit-by-digit register flip-flop 5043 is reset to remove the logic "1" set output produced by the preceding No.1 phase No.31 clock pulse CPP1-31 at the very time point of the No.2 phase No.0 clock pulse. As a consequence, the identification record register AND-gate 5041 cannot produce further logic "1" identification record register signals until the digit-by-digit register flip-flop 5043 is again set by another No.1 phase No.31 clock pulse produced in the course of subsequent execution of the register track scan command RTS or the like command. To return to registering of the first-digit dial information, that logic "1" set output of the digit register flip-flop 5042 which is effective for the No.2 phase Nos.1 through 4 clock pulse period, serves as a logic "1" write gate open signal WGOP in FIG. 30. Meanwhile, a four-bit digit register shift register (REG SHIFT REG) 5044 is receiving the dial digit or, via the code converter 5021, the multifrequency digit. The clock pulses CP pass through a digit register step AND-gate 5046 during the time period just mentioned, to supply the dial or the multifrequency digit in bit series via a digit register output AND-gate 5047 as the write data WDATA (FIG. 30) to the first dial information area A. The No.3 phase No.30 clock pulse CPP3-30 passes through a number received AND-gate 5048 to become a number received signal NUMREC as used in FIGS. 22, 25 and 27.

Following the No.3 phase No.31 clock pulse, the phase counter input gate signal IGPHCTR provided by the still set commencement flip-flop 5003 produces the following sets of Nos.0 through 3 phase clock pulses. The No.0 phase No.0 clock pulse again produces the first and the second activity signals ACTSIG and ACTF and other signals. The first digit area FSTDI, however, is now provided with a logic "0" datum, which is supplied via the early bus 3050 to the first digit AND-gate 5020 and further, via the common inverter 5040, to a subsequent digit AND-gate 5050 (FIG. 50B) to set a subsequent digit flip-flop 5051 reset by the No.1 phase No.31 clock pulse CPP1-31. Therefore, the No.1 phase No.5 clock pulse CPP1-5 is supplied via a digit count AND-gate 5053 to a serial adder 5054 and to a timing flip-flop 5055 which, in this case, is reset by the No.9 clock pulse CP9. The pulses supplied via the early bus 3050 and either directly or via the common inverter 5040 from the digit count area DIGC reach the serial adder 5054 via adder timing AND-gates 5056 and 5057 which are open, in this case, for the No.1 phase Nos.6 through 9 clock pulse period. If the input pulse sequences are "1111," "1110," "1101," . . . , "0001, and "0000" which represent 1111, 0111, 1011, . . . , 0010, 1000, and 0000 in the binary code, respectively, the output pulse sequences are "0000," "0001," "0011," . . . , "1010," "1001," and "0001," respectively, which represent the results of addition of one to the respective inputs. Such result of addition is written back as signal WDATA into the digit count area DIGC of buffer register 167 in FIG. 30 via an adder output AND-gate 5058 by the logic "1" set output of the timing flip-flop 5055. For the second and the following digits of the dial information, one is added to the count of digits stored in the latter digit count area DIGC each time the register track scan wired logic supplies or receives a digit of the dial information.

The first identification record area IDR (FIG. 29*e*) preceding the first-digit dial information area A is now provided with a logic "1" datum. It is therefore the logic "0" signal supplied from the second identification record area IDR (FIG. 29*e*) that puts, in the meantime at the time point of the No.1 phase No.5 clock pulse CPP1-5, the identification record register AND-gate 5041 (FIG. 50A), the digit register shift register 5044, and the related circuit into operation.

In this manner, the third and the following digits, if any, of the dial information and the digit count and similar related data are registered in the register track 149 (FIG. 30) so long as a logic "1" flag signal FLAG is received from the concerned trunk state circuit (FIGS. 22-27) after registration of the preceding digits.

For the sake of brevity, the following subject matter is described here, although it is concerned with the register timing command RTM. When, in FIG. 50B, the dial information is being sent to a trunk 109 (FIG. 1A) concerned at this time, the No.1 phase No.22 clock pulse CPP1-22 sets via a delete information AND-gate 5061 a delete information flip-flop 5062 which is reset by every and hence the subsequent No.26 clock pulse CP26. The signal derived from the delete information area DL1 (FIGS. 29*e* and 30) is therefore supplied via the early bus 3050 and a delete information register input AND-gate 5063 to a four-bit delete information shift register (DLI SHIFT REG) 5064 by the clock pulses CP led thereto via a delete information register step AND-gate 5065. The delete information data are decoded by a decoder DEC 5066 to be supplied via Nos.0 through 9 output leads to 10 delete information output AND-gates 5067-0 . . . 5067-9, which allow one of the Nos.2 and 3 phase Nos.0, 5, 10, 15 and 20 clock pulses to set a deletion/digit-by-digit flip-flop 5068. If, for example, the first digit should be deleted, the decoder 5066 places a logic "1" output on the No.1 output lead. This causes the No.2 phase No.5 clock pulse CPP2-5 to set the deletion/digit-by-digit flip-flop 5068. Due to the logic "1" set output of the deletion/digit-by-digit flip-flop 5068, the logic "1" signal derived from the identification record area IDR (FIGS. 29*e* and 30) and supplied via the early bus 3050 to an identification record send AND-gate 5070 simultaneously with that one of the Nos.2 and 3 phase Nos.0, 5, 10, 15, and 20 clock pulses which appears on and after setting of the deletion/digit-by-digit flip-flop 5068, passes therethrough to become a logic "1" identification record send signal. This signal serves as a write gate open signal WGOP for use in FIG. 31, which substitutes a logic "0" datum for the logic "1" datum having produced this logic "1" identification record send signal. The logic "1" identification record send signal sets an identification send flip-flop 5072 which is reset by the succeeding one of the Nos.4, 9, 14, 19 and 24 clock pulses CP4 . . . CP24. Therefore, the deletion/digit-by-digit flip-flop 5068 is reset to remove the logic "1" set output. As a consequence, the identification record send AND-gate 5070 cannot produce further logic "1" identification record send signals until the deletion/digit-by-digit flip-flop 5068 is again set in the course of subsequent execution of the register track scan command RTS or the like command. Meanwhile, the logic "1" set output of the identification send flip-flop 5072 allows the dial information derived from that one of the dial information areas A, B, . . ., and K (FIG. 29*e*) which immediately subsequently follow the identification record area IDR (FIG. 29*e*having produced the logic "1" identification record send signal, to be sent via the early bus 3050 and a digit send register input AND-gate 5073 to a four-bit digit send shift register (SND SHIFT REG) 5074 by the clock pulses CP supplied thereto via a digit send register step AND-gate 5075. The digit send shift register 5074 thus produces the dial digit information DIALDIGIT and, via a code converter 5076, a multifrequency digit information MFDIGIT. The No.3 phase No.30 clock pulse CPP3-30 passes through a number send AND-gate 5077 to become a number send signal NUMSEND (FIGS. 23 and 24).

The digit count area DIGC (FIGS. 29e and 30) stores a full count of 1111 when the required number of digits of the dial information including the first digit is registered or sent. The signal supplied from the digit count area DIGC via the common inverter 5040 (FIG. 50B) does not set a full digit flip-flop 5080 (FIG. 50B) which was reset by the preceding No.1 phase No.5 clock pulse CPP1-5. The following No.1 phase No.10 clock pulse CCP1-10 therefore sets via a full count AND-gate 5081 an all digit flip-flop 5082. The No.3 phase No.30 clock pulse CCP3-30 now passes through a release AND-gate 5083 to become a release pulse RELEASE for use in FIGS. 22–24 and 27. During registration, the No.1 phase No.30 clock pulse CCP1-30 passes through a call back flag AND-gate 5084 to store a logic "1" datum in the call back flag area CBF to represent the completion of registering of the whole dial information. During sending, the No.2 phase No.0 clock pulse CPP2-0 passes through an activity reset AND-gate 5085 to become a logic " 1" special write gate open signal for substituting a logic "0" datum obtained via an inverter 5086 for the "1" datum in the activity area ACT. The No. 31 clock pulse CP31 accompanying a logic "1" one-eighth revolution signal 1/8 REV (FIG. 34) passes through an end AND-gate 5088 to become an end pulse END.

o. Register Timing Command RTM

Referring further to FIG. 50A, it is now assumed that a logic "1" register timing signal RTMSIG is supplied to the input AND-gate 5001 (FIG. 50A) instead of the logic "1" register track scanning signal RTSSIG. As is the case with the latter register track scanning command, the register timing signal RTNSIG produces logic "1" register track output gate signal OGREGTCK, phase counter input gate signal IGPHCTR, index address information gate signal GAX, trunk state circuit group selection signal GTKSC, index register input gate signal IGXREG, bus gate signal GTR, and, if the activity area ACT stores a "1" datum, logic "1" activity signal ACTSIG. The description in the preceding section (n) should also be referred to, which section relates to sending area SND.

When the activity area ACT (FIG. 29e) was found to be a logic "1" signal the next following No.0 phase No.1 clock pulse CPP0-1 sets via an adder/timing AND-gate 5090 an adder/timing flip-flop 5091, whose logic "1" output serves as a logic "1" register timing count signal REGT. The No.1 phase No.13 clock pulse CPP1-13 sets via an interdigit timing count AND-gate 5092 the serial adder 5054 into operation to add one to the count stored in the interdigit timing count area IDTC (FIG. 29*e*). The No.1 phase No.18 clock pulse CPP1-18 sets via an overall timing AND-gate 5093 the serial adder 5054 into operation to add one to the count stored in the overall timing area OAT (FIG. 29*e*). When the same section of the register track 149 (FIG. 30) has been scanned four and 16 times, the counts in the last-mentioned interdigit timing count area IDTC and the overall timing area OAT reach full counts of 11 and 1111, respectively. By means of a circuit similar to what judges a full count in the digit count area DIGC (FIG. 29e) during execution of the register track scanning command RTS the No.1 phase No.29 clock pulse CPP1-29 passes through a timing flag AND-gate 5095 to store a logic "1" datum in the timing flag area TMF (FIG. 29e) each time the full count is stored in the interdigit timing count or the overall timing area IDTC or OAT (FIG. 29*e*).

p. Mode Change Wired Logic 178

Referring to FIG. 51, it is assumed that a logic "1" mode change signal MDCGSIG (FIG. 55) is supplied to an input AND-gate 5101 and, via a call processing OR-gate 5102, to the corresponding circuit in the No.1 central controller 150′ as a "1" call process end signal CPEND and that a logic "1" link set end signal LSEND mentioned below is supplied from the corresponding circuit in the No.1 central controller 150' to a mode change control AND-gate 5103. The No.0 clock pulse CPO appearing at the earliest possible time point after both command execution signal EX and link set end signal LSEND of the No.1 central controller 150' have turned to a logic "1" sets a mode change flip-flop 5105 to produce a logic "1" network action start signal NWAS used in FIGS. 52 and 53.

When the link setting operation comes to an end in the manner later described, a logic "1" network action end signal NWAE sets and resets an end flip-flop 5111 and the mode change flip-flop 5105, respectively. The logic "1" set output of the end flip-flop 5111 is supplied to the No.1 central controller 150' via a link set OR-gate 5112 as a logic "1" link set end signal LSEND. The No.31 clock pulse CP31 appearing at the earliest possible moment after the appearance of both logic "1" set output of the end flip-flop 5111 and call process end signal CPEND supplied from the No.1 central controller 150' passes through an end AND-gate 5113 to become an end pulse END. Inasmuch as an end pulse END produces a logic "1" wait command signal WRC in FIG. 35, the No.0 central controller 150 is again activated into the call processing mode. At early time point of the call processing mode, a flip-flop set/reset command is executed to reset the end flip-flop 5111 as symbolized by a block 5115.

If a trouble pulse TROUBLE accompanying a logic "1" network action end signal NWAE is supplied from the network controller 196 (FIG. 53) during the link setting mode in a manner to be mentioned hereinbelow, a trouble flip-flop 5121 is set to provide the No.1 central controller 150' with a logic "1" call process end signal CPEND via the call process OR-gate 5102, with a logic "1" link set end signal LSEND via the link set OR-gate 5112, and with a logic "1" trouble information signal TBLINF. If either a trouble pulse TROUBLE is supplied from the network controller 196 or a logic "1" trouble information signal TBLINF is supplied from the No.1 central controller 150', the end pulse END passes through a jump AND-gate 5123 to become a jump pulse JUMP. The logic "1" trouble signal TROUBLE gives an alarm to the maintenance personnel by a device, not shown. The fact that the No.0 central controller 150 is in the maintenance mode is also automatically judged by detecting the set state of the trouble flip-flop 5121 by a conditional "1" jump command 1JUMP for flip-flops selected as a result of the jump pulse JUMP. Preferably, this conditional "1" jump command 1JUMP provides a data store command STORE for storing the data, based on which the link setting operation has been performed by the network controller 196 (FIG. 53) up to the moment of appearance of the logic "1" trouble signal TROUBLE, in a track (not shown) arranged on the drum 140 specifically for that purpose. It is thus possible for the No.1 central controller 150' to carry out the link setting operation by itself in due course. Notified by the alarm, the maintenance personnel corrects the trouble and thereafter manually resets the jump flip-flop 5121 by manually operating a switch 5131 to remove ground normally supplied to the reset input thereof.

If a trouble occurs in the No.1 central controller 150', a logic "1" call process end, link set end, and trouble information signals CPEND, LSEND, and TBLINF are supplied to the end, the mode change control, and the jump AND-gates 5113, 5103, and 5123, respectively. When the mode change and the command execution signals MDCGSIG and EX become logic "1," the mode change flip-flop 5105 produces a "1" network action start signal NWAS as usual. A logic "1" network action end signal NWAE, however, produces not only an end pulse END but also a jump pulse JUMP. As in the case where a trouble is found in the network controller 196 (FIG. 53), this jump pulse JUMP calls for a conditional logic "1" jump command 1JUMP. The set output of the trouble flip-flop 5121 is, however, a logic "0." The consequence of the execution of the conditional "1" jump command 1JUMP is therefore to load the data stored in the specifically arranged track to the network control registers 165 (0 and 1 in FIG. 31) and to carry out the connection by the network controller 196.

C. NETWORK CONTROLLER a. General

Referring to FIG. 52, it is assumed that the network control registers 165 (0 and 1 in FIG. 31) are loaded with the data for establishment of a speech path and that the network command register 166 (FIG. 31) is loaded with the data relating to the types of connection to be established. The data for the speech path serve also as the A and C link address information signals AINFAC (FIG. 17).

A logic "1" network action start signal NWAS from FIG. 51 sets a switching network and a register sender link decoder group 5201 and 5202 into operation via a switching network and a register sender link AND-gate 5211 and 5212 supplied with a logic "1" line switching network (LTL) and a logic "1" register sender link signal (RSL), respectively, from the network command register 166. The switching network decoder 5201 serves to supply path selection signals to the relevant ones of the relay amplifiers 311.3 . . . 311.46 (FIG. 3) and 411.47 . . .411.86 (FIG. 4). Similarly, the register sender link decoder 5202 serves to supply link selection signals to the relay amplifiers, not shown, included in register link (RSL) 120 in FIG. 1A.

Meanwhile, the No.0 bit position of the network command register 166 (FIG. 31) supplies either a logic "0" or a logic "1" IOT signal IOTSIG (to FIG. 53) according as the connection to be made is either a one-path connection, such as the dial tone, the incoming, the outgoing, and the transit connection, or a two-path connection, namely, and intraoffice connection.

b. One-Path Connection

Referring to FIG. 53, the logic "1" network action start signal NWAS operates, via the relay amplifier 311.1 and the network action start relay NASO (FIG. 3A), the central controller connection relays CCO as previously mentioned. The busy/idle signals are therefore supplied to the idle test circuit 199 (FIG. 5A) which comprises converters 5301, . . . 5305 connected with the leads 241, . . . 245, respectively, in FIG. 5A. The converters 5301, . . . 5305 are of the aforenoted $C_1$ type except that converter 5305 connected with the trunk 109 which is of the above-noted $C_2$ type. Meanwhile, a logic "1" confirmation signal is received via the lead 311.2 (FIG.3A) by another converter 5306 of the $C_3$ above-noted type, whose logic "1" output triggers a one-shot trigger circuit 5307. A first timing counter 5308 is therefore reset to remove the logic "1" output from the No.3 output point to the No.0 output lead thereby allowing an INHIBIT gate 5309 to supply network timing pulses having a repetition period of five milliseconds to the input terminal of the latter counter. When the designated path is idle, the converters 5301 through 5305 produce logic "1" signals, which are supplied via a product AND-gate 5311 to a busy/idle AND-gate 5315.

The No.1 output of the timing counter 5308 thus sets an idle test flip-flop 5316, whose logic "1" No.1 output operates, via the relay amplifier 711.87, the pulser driving relay 7PAO in FIG. 7. In compliance with a logic "1" pulser driving relay confirmation signal received via the lead 711.88 in FIGS. 7 and 53, a further converter 5316' of the above-noted $C_3$ type triggers a one-shot trigger 5317, which resets a second timing counter 5318 to be supplied with the timing pulses via an INHIBIT gate 5319. Alternating current impulses received via the leads 711.89 (FIG. 7) and 811.90 (FIG. 8) by converters 5321 and 5322 of the $C_5$ type, which convert the alternating current signals into a logic "1" signal for setting paired flip-flops 5323 and 5324. Consequently, the logic "1" No.1 output of the second timing counter 5318 sets via an AND-gate 5325 a fire check flip-flop 5326 for confirming that the pulsers 700 and 800 are in proper operation. Inasmuch as the IOT signal IOTSIG received from FIG. 53A is logic "0," an IOT AND-gate 5331 produces no logic "1" output.

The logic "1" No.1 output of the fire check flip-flop 5326 thus passes through a trunk activation INHIBIT gate 5332 to operate, via a relay amplifier 5333, a trunk activation relay TKS, whose contact $tks^0$ (FIG. 53) places ground on the lead 245 in FIG. 5A to activate the designated one of the trunks 109 in FIG. 1A. Another contact tks[1] of the trunk activation relay TKS is closed to make a converter 5335 of the $C_3$ type to reset, via a one-shot trigger circuit 5336, a third timing counter 5338 which is now supplied with the timing pulses via an INHIBIT gate 5339. The logic "1" No.3 output of the latter timing counter sets a relay drive flip-flop 5341 whose "1" No.1 output operates, via a relay amplifier 5342, a trunk check relay TKE to disconnect and connect by means of a contact tke (FIG. 53) the lead 245 from ground and with a trunk operation relay TKK, respectively. If the designated trunk has been activated by this time, ground placed by the trunk on the last-mentioned lead 245 operates the trunk operation relay TKK. Upon closure of a contact tkk (FIG. 53), a trunk activation confirmation converter 5343 of the above-noted $C_3$ type provides a logic "1" link work end signal LWE, which resets the fire check flip-flop 5326 and the relay drive flip-flop 5341. Meanwhile, the logic "1" link work end signal LWE is also supplied to a network action end INHIBIT gate 5344 (FIG. 53) supplied with the logic "0" IOT signal IOTSIG to become a logic "1" network action end signal NWAE.

c. Two-Path Connection

Referring further to FIG. 53, a connection counter 5350 is normally in the reset state. The No.1 output therefore does not inhibit passage of a logic "1" network action start signal NWAS through an INHIBIT gate 5351 and provides a logic "1" first connection signal CONNA. Inasmuch as the IOT signal IOTSIG is logic "1" in this case, the "1" first connection signal CONNA passes through the IOT AND-gate 5331 (FIG. 53) to inhibit operation of the trunk activation relay TKS and hence the operation of the trunk operation relay TKK. Operation of the network controller 196 (FIG. 53), nevertheless, proceeds up to the fire check flip-flop 5326 as in the one-path connection. The logic "1" link work end signal LWE, however, is produced in this case by the logic "1" No.1 output of the fire check flip-flop 5326 having passed through a second connection AND-gate **5352*a* (FIG. 53). The logic "1" link work end signal LWE passes through a connection counter input AND-gate 5353 (FIG. 53) to turn the No.1 output of the connection counter 5350 into logic "1." The logic "1" network action start signal NWAS (FIG. 51) now cannot pass through the INHIBIT gate 5351 but passes through an AND-gate 5354 to become a logic "1" second connection signal CONNB. Meanwhile, the logic "1" No.1 output of the latter counter sets, via a one-shot trigger 5355, a second path data flip-flop 5356 whose logic "1" set output serves as a logic "1" phase counter input gate signal IGPHCTR in FIG. 32 and at the same time opens No.0 and No.1 word AND-gates 5351*a* and 5352*a*. The No.0 phase No.0 clock pulse CPP0-0 sets a No.0 word flip-flop 5353a whose logic "1" set output causes the data in the No.0 network buffer register 164-0 (FIG. 31) to be transferred to the No.0 network control register 165-0 (FIG. 31). The subsequent No.1 phase No.0 clock pulse CPP1-0 sets a No.1 word flip-flop 5354*a* whose logic "1" set output causes the data in the No.1 network buffer register 164-1 (FIG. 31) to be transferred to the No.1 network control register 165-1 (FIG. 31). The logic "1" second connection signal CONNB triggers the one-shot trigger 5307 for the first timing counter 5308 to carry out the operation for the second path in the similar path as in the one-path connection. The logic "1" link work end signal LWE causes the connection counter 5350 to step further to provide a logic "1" No.2 output which serves as a logic "1" network action end signal NWAE and resets the connection counter 5350**.

d. Trouble

If the No.2 output of the first timing counter 5308 turns to a logic "1" before the idle test flip-flop 5316 is put into the set state, the logic "1" No.2 output passes through a first trouble AND-gate 5361 to become a trouble pulse TROUBLE. The idle test flip-flop 5316 remains reset if a noise picked up during the call processing mode has misled to the availability of the path, notwithstanding the fact that one of the designated line circuits 107, one of the A through C links 121, or one of the trunks 109 in FIG. 1A is in fact busy.

If the No.2 output of the second timing counter 5318 turns to a logic "1" before the fire check flip-flop 5326 is set, the logic "1" No.2 output passes through a second trouble AND-gate 5362 to become a trouble pulse TROUBLE. This results from nonoperation of the link and/or the trunk link pulser 700 (FIG. 7) or 800 (FIG. 8).

If the No.5 output of the third timing counter 5338 turns to a logic "1" before the trunk operation relay TKK (FIG. 53) is operated, the No.5 output passes through a trouble INHIBIT gate 5363 to become a trouble pulse TROUBLE. This is caused by the nonoperation of the designated one of the trunks 109 in FIG. 1A.

The trouble pulse TROUBLE produces via an OR-gate 5364 a logic "1" network action end signal NWAE.

D. NOTES

In FIGS. 36 through 51, wired logics for executing the commands are depicted as if each is separated from the others. It is noticed by those skilled in the art that it is possible to use a common circuit as the same or similar circuits in the wired logics. For example, only one exclusive-OR gate is sufficient for the exclusive-OR-gates 3701, 4011, 4111, and so on. Only one input AND-gate 3621 can also serve as the input AND-gate 3801. A single source controlled gate may be used for gates 4533 and 4803 in FIGS. 45 and 48. A single end gate and a single jump AND gate are sufficient for most of the end and the jump AND gates mentioned above.

Under some circumstances, provision of further wired logics is desirable, for executing some other microcommands such as addition, subtraction, complement, logic product, logic sum, detecting whether the content of a register is all logic "0" or "1," and detecting whether the contents of some registers are coincident or not. It is recalled that a flip-flop set/reset command is used in executing the mode change command MDCG for setting and resetting of a particular flip-flop in the central controller 150.

In some cases, a jump to the command of the next address plus three or more is desirable. Such a jump is feasible with a modification to the subsequent command logic circuit 182.

VI. CONNECTING OPERATION a. General

Figure 54:
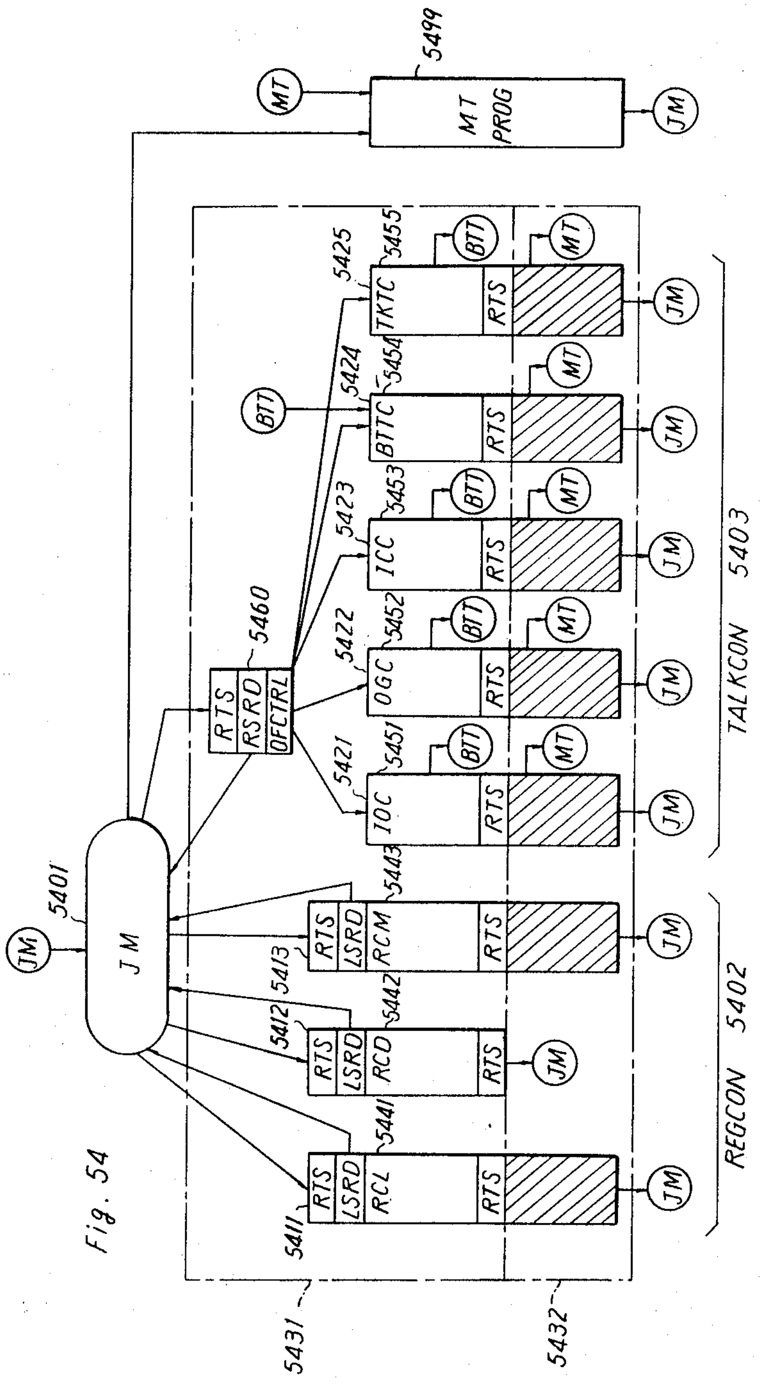

Referring to FIG. 54, it is assumed that a job monitoring program JM 5401 has already been transferred to one of the command tracks 144 (FIGS. 1B and 30) from a relevant program segment of one of the program tracks 143 (FIGS. 1B and 30). The monitoring program JM 5401 contains a plurality of various call commands CALL. In compliance with one of such call commands CALL, it is further assumed that a call processing program is transferred to the other of the command tracks 144 from the program segment designated by the call command CALL as just mentioned.

The call processing programs are broadly classified into register connection programs REGCON 5402 and talking connection programs TALKCON 5403. A register connection program 5402 may be a dial tone, a trunk DPICT, or a trunk MFIRT connection program 5411, 5412, or 5413. A talking connection program 5403 may be an intraoffice, an outgoing, an incoming, a tone trunk, or a talky trunk connection program 5421, 5422, 5423, 5424, or 5425. Execution of each of these programs is called a call processing operation 5431. Call processing operations 5431 either followed by link setting operations 5432 or, if unnecessary, not followed thereby are termed call processing routines. The program segments either stored in the above-noted program tracks 143 or transferred into the above-noted command tracks 144 provide a dial tone, a dial pulse incoming register, a multifrequency incoming register, an intraoffice, an outgoing, an incoming, a tone, a talky trunk connection routine 5441, 5442, 5443, 5451, . . . 5455.

In the preferred form of the talking connection programs 5403, the first part of the call processing operation 5431 involves the execution of a subroutine 5460 comprising the register scanning, the register service request detection, and the office code translation commands RTS, RSRD, and OFCTRL. As a result of execution of the office code translation OFCTRL, the central controller 150 (FIG. 1B) judges by the data stored in the memory area of the connection type CT (FIG. 29*d*) which of the routines should follow, the intraoffice, the incoming, the outgoing, or other connection routines.

When a call processing routine is bound to be completed, the job monitoring program 5401 is substituted for the call processing program being executed by the track change command placed at the end of the call processing program as illustrated by the small circles labeled "JM." When it becomes apparent that there is no necessity for carrying further the execution of the call processing operation 5431 (for example, when no originating call was detected in the dial tone connection routine 5441), the wired logic produces a jump pulse JUMP (FIG. 39) to obtain access to the monitoring program 5401.

When all of the required speech paths are found busy during the call processing operation 5431, the intraoffice connection routine 5421 or the like routine jumps to the busy tone connection routine 5424 as shown by small circles labeled "BTT". When a trouble occurs during the link setting operation 5432, the incoming connection routine 5423 or the like jumps to a maintenance operation 5499 as shown by small circles labeled "Mt."

It is one of the features of this invention that each of the central controllers (CC0) 150 and (CC1) 150' assumes alternate call processing and link setting modes to carry out the call processing and the link setting operations. Accordingly, it is contemplated that the amounts of time for completing such operations are almost the same. It is another feature of this invention that each central controller performs an operation reverse to that of the other. In this situation, the arrangement is such that when one of the central controllers finishes its operation in advance of the other, the one waits for completion of the operation by the other.

Factors determining the time of the call processing operation are the number of revolutions of the drum 140 (FIG. 1B) per unit time and the number of revolutions required to complete a particular operation. In the specific example described in part B of section (1), the required number of revolutions is two or three revolutions on the average but not more than five revolutions. This means that the time for a call processing operation is less than 100 milliseconds. On the other hand, the time required for the link setting operation depends on the time for operation of an electromagnetic relay and the number of such relays which should be operated in time succession to complete the link setting operation. Inasmuch as such time and number are approximately five milliseconds and 10 on the average, respectively, the time of the link setting operation is of the order of 50 milliseconds. In the case of an intraoffice connection, the time is about 100 milliseconds because the link setting operation is performed twice. Inasmuch as the performances of the call processing and the link setting operations in sequence require an overall time interval of the order of 200 milliseconds, it is apparent that the central controller 150 is cut off from the supervision of the monitoring program 5401 for such an overall time interval.

In connection with the above, it should be noted that the dial pulses or the multifrequency signals produced by the local subscriber or sent from the preceding office disappear in about 100 milliseconds and therefore require the real time processing. For this reason, the register scanning commands RTS are executed as shown in FIG. 54 at the beginning and the middle of each routine 5431 and 5432.

b. Dial Tone Connection

Figure 55:
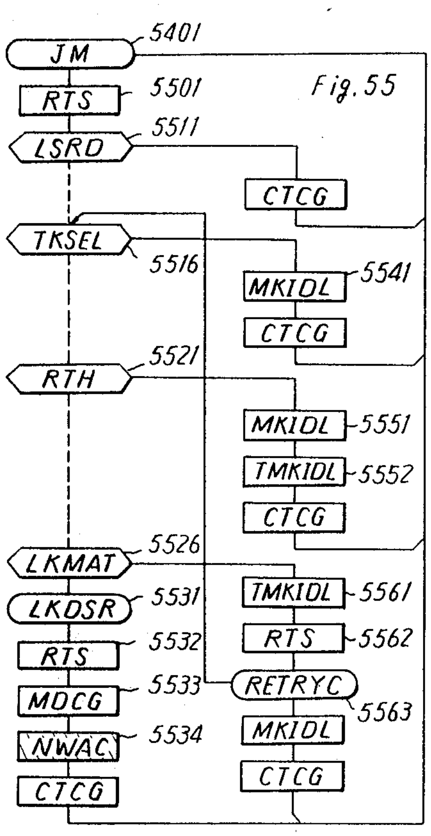

Referring to FIG. 55, it is assumed that a local subscriber has picked up his handset to originate a call. Meanwhile the monitoring program segment 5401 stored in one of the command tracks 144 transfers a dial tone connection program segment to the other of the command tracks 144 in due course. A normal flow of the program segment is now described. At the outset of the flow, the first register track scan command RTS 5501 is executed. The next command is a line service request detection command LSRD 5511 for the line circuits 107 whose data are stored in one or the other of the drum line tracks 145. The central controller 150 now successively addresses the line circuits 107 in the order of the line equipment number LEN. When the line circuit of the calling subscriber is addressed, the line service request detection wired logic (FIG. 39) receives the logic "1" line service request signal REQ and turns (FIG. 19) the line service request signal REQ into a logic "0" by the set pulse SET. By the end pulse END, the wired logic lets the address of the calling subscriber's line circuit remain in the address register 186 (FIG. 33). Also, the wired logic leaves in the accumulator register 161 (FIG. 31) the line data supplied from that word on the line track 145 which has the address left in the address register 186 (FIG. 33). The address loaded into the latter address register is the line equipment number LEN of the calling subscriber's line circuit. The line data are the calling subscriber's directory number DN, service class LCLASS, and chart class CHART in FIG. 29.

Next follow several microcommands, such as a data transfer and an immediate load command MOVE and I-LOAD, shown by the broken line after LSRD 5511. The line data are transferred from the accumulator register 161 (FIG. 31) to the No.0 network buffer register 164-0 (FIG. 31). Among the line data, the service class LCLASS is transferred to the Nos.24 . . . 30 bit points of the No.0 buffer register 163-0 (FIG. 31). In addition, the latter line equipment number LEN is transferred from the address register 186 (FIG. 33) to the Nos.13 . . . 23 bit positions of the No.0 buffer register 163-0 (FIG. 31) and the Nos.0 . . .10 bit positions of the No.0 network control register 165-0 (FIG. 52). The accumulator register (FIG. 31) is loaded with that trunk group number TGN for the originating register trunk (ORT) 112 which is contained in the data area (FIG. 28*g*) of the immediate load command word.

Next follows the trunk selection command TKSEL 5516 after the last-mentioned broken line. The wired logic (FIG. 40) successively addresses the trunks 109 in the order of the trunk equipment number TEN. Meanwhile, the wired logic (FIG. 40) compares the trunk group numbers TGN successively supplied from the trunk track 146 with the trunk group number TGN repeatedly supplied from the accumulator register 161 (FIG. 31). The wired logic tests the busy/idle states of the trunks which are successively found to be the desired ones because of the identity of the trunk group numbers TGN. The wired logic reserves (FIG. 22) the first idle one of the desired trunks by the set pulse SET and lets the address of the reserved trunk remain in the address register 186 (FIG. 33) from the time of production of the end pulse END. The address in this case is the trunk equipment number TEN of the reserved trunk. At the same time, the wired logic leaves in the index register 162 (FIG. 31) the trunk data supplied from the trunk track 146 (FIG. 30). The trunk data are the trunk group number TGN, the trunk class TCLASS, and the trunk number TKN of the reserved trunk.

The next commands are again several microcommands. The trunk equipment number TEN is transferred from the address register 186 (FIG. 33) into the Nos.3. . . 12 bit positions of the No.0 buffer register 163-0 (FIG. 31) and to the Nos.11 . . . 20 bit positions of the No.0 network control register 165-0 (FIG. 52). In addition, the Nos.0 . . . 2 bit positions of the latter No.0 buffer register 163-0 are supplied with a logic "1," another logic "1," and a logic "0" data, respectively. Meanwhile, the accumulator and the index registers 161 and 162 (FIG. 31) are cleared of all bits.

The next command is the register track hunt command RTH 5521. The wired logic (FIG. 49) hunts an idle section on the register track 149 and stores therein the data loaded in the Nos.0 and 1 buffer, the accumulator, the index registers 163, 161 and 162 in the idle section at the Nos.0 through 3 word positions, respectively, in FIG.29*e*. The idle section thus stores logic "1" data in ACT, REG and FSTDT areas and pertinent data in TEN, LEN, and Class areas.

Still again, several microcommands follow the command RTH. The accumulator register 161 (FIG. 31) is loaded with the line and the trunk link frame numbers LLF and TLF (FIG.

29c). These numbers are portions of the line and the trunk equipment numbers LEN and TEN, respectively, loaded into the No.0 network control register 165-0 (FIG. 52).

The next command is the link matching command LKMAT 5526. The wired logic (FIG. 41) successively addresses the B links 203. Meanwhile, the wired logic compares the line and the trunk link frame numbers LLF and TLF successively supplied from the link track 147 (FIG. 30) with the line and the trunk link frame numbers LLF and TLF (FIG. 29c) repeatedly supplied from the accumulator register 161 (FIG. 31). The wired logic tests the busy/idle state of the B links which are successively found to be the desired ones because of the identity of the line and the trunk link frame numbers LLF and TLF. The wired logic reserves (FIG. 20) the first idle one of the desired B links, by the set pulse SET produced from the B link set AND-gate 4126. At the same time, the wired logic leaves in the Nos.0 . . .23 bit positions of the No.1 network control register 165-1 (FIG. 52) the link data of the reserved B link supplied from the link track 147 (FIG. 29c). The network control registers 165 (0 and 1 in FIG. 52) supply the A and C link address information signals AINFAC to the A and the C links 213 and 223 (FIGS. 52 and 17). The wired logic tests the busy/idle states of the addressed A and C links. If idle, the A and the C links are reserved by the set pulse SET produced through the A and the C set AND-gates 4144 and 4145, respectively. If at least one of the A and the C links is busy, the wired logic cancels (FIG. 20) the reservation for the B link by the reset pulse RESET to repeat the link matching operation.

The next following command is a link data setting routine LKDSR 5531, which consists of several microcommands such as a data transfer and an immediate load command MOVE and I-LOAD. The data designating operation of the switching network is loaded in the network command register 166 (FIG. 52).

The next succeeding command is a second register track scan command RTS 5532.

The following command is the mode change command MDCG 5533. The mode change command MDCG puts the central controller (CC0) 150 (FIG. 1B) into the link setting mode and the other central controller (CC1) 150′ back into the call processing mode when the latter controller finishes the link setting operation.

The program now advances to the link setting operation NWAC 5534.

When the calling subscriber (101) is thus connected with an idle trunk ORT in FIG. 10, the central controller 150 returns back to the call processing mode. At the same time, the controller 150 executes the command track change command CTCG to have access to the monitoring program segment 5401.

If a "1" line service request signal REQ has not been detected during execution of the line service request detection command LSRD 5511 for a full revolution of the drum 140, the flow of the program jumps to the subsequent command having an address equal to the next command address plus one. The central controller 150 thus obtains access to the monitoring program segment 5401 as shown by the small circles labeled JM in FIG. 54.

If an idle trunk ORT is not found during the execution of the trunk selection command TKSEL 5516 for a half revolution of the drum 140, the flow of the program jumps to a make-idle command MKIDLE 5541. The wired logic turns the line service request signal REQ to the logic "1" state by the set pulse SET.

The next command is the command track change command CTCG. If an idle register track section is not found during the execution of the register track hunt command RTH 5521 for a one-eighth revolution of the drum 140, the flow of the program jumps to another make-idle command MKIDLE 5551 for cancelling the busy state of the line circuit. The next command is a trunk make-idle command TMKIDLE 5552 for releasing the reversed trunk. The next command is the command track change command CTCG.

When no available B links are found during the execution of the link matching command LKMAT 5526 for a half revolution of the drum 140, the flow of the program jumps to another trunk make-idle command TMKIDLE 5561 for cancelling the reservation of the trunk. In view of the lapse of time from the previous execution of the first register track scan command RTS 5501, another register track scan command RTS 5562 is executed. Next a retry routine RETRYC 5563 follows. The central controller 150 thereby judges whether the retrial has once been performed or not. If not, the flow of the program jumps back to the trunk selection command TKSEL 5516. The central controller 150 thus selects another trunk ORT. If it is unsuccessful to find a speech path even at the second trial, the next commands are the make-idle and the command track change commands MKIDLE and CTCG.

c. Trunk DPICT Connection

Figure 56:
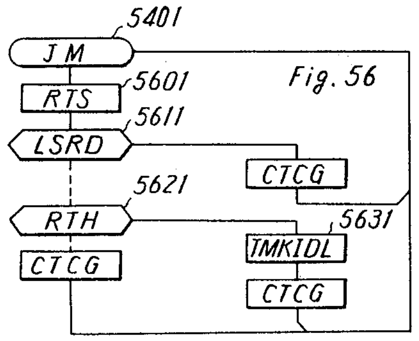

Referring to FIG. 56, it is assumed that a trunk (DPICT) in FIG. 1A has been seized by the preceding office and has not yet been served by a trunk DPICT connection program. It is furthermore assumed that the command tracks 144 (0 and 1 in FIG. 30) store the monitoring and the trunk DPICT connection program segments, respectively.

At the beginning of normal flow of the program segment, the register track scan command RTS 5601 is executed.

The next command is a line service request detection command LSRD 5611 for the trunks 109 in FIG. 1A. The operation is substantially the same as that of the command for the line circuits 107 (FIG. 1A). It is, however, not the line circuit but the trunk DPICT that the logic "1" line service request signal REQ produced thereby is turned to logic "0." Also, what is loaded in the accumulator register 161 (FIG. 31) is not the line data but the trunk data supplied from the trunk track 146 (FIG. 30), namely, the trunk group number TGN and the trunk class TCLASS in FIG. 29b of the trunk DPICT requesting the line service.

During the next several microcommands, data are loaded in the buffer registers 163 (0 and 1 in FIG. 31) in a manner similar to the MFIRT connection described in the next following section.

The next command is the register track hunt command RTH 5621.

If no logic "1" line service request signal is supplied from the trunks 109 during the execution of the line service request detection command LSRD 5611, the flow jumps to the monitoring program segment 5401 in FIG. 56.

If no idle register track section is found during execution of the register track hunt command RTH 5621 for a one-eighth revolution of the drum 140, the flow jumps to a trunk make-idle command TMKIDLE 5631, which turns the line service request signal REQ back to the logic "1." The next command is the command track change command CTCG which enables the central controller 150 again to access the monitoring program segment 5401 in FIG. 56.

d. MFIRT Connection

Figure 57:
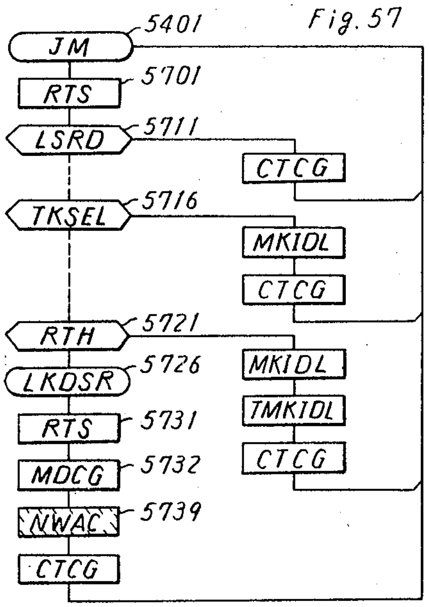

Referring to FIG. 57, it is now assumed that a trunk MFICT activated by a preceding office has not yet been served by a trunk MFIRT connection program. It is furthermore presumed that the command tracks 144 (0 and 1 in FIG. 30) store the monitoring and the MFIRT connection program segment, respectively.

At the start of the normal flow of the program segment in FIG. 57, the register track scan command RTS 5701 is executed.

The next command is a line service request detection command LSRD 5711 for the trunks 109. The operation is similar to that carried out in the trunk DPICT connection. The trunk data stored in the accumulator register 161 (FIG. 31), however, are the trunk group number TGN, the trunk class TCLASS, and the trunk number TKN of the activated trunk MFICT.

Thereafter, several microcommands follow. From the accumulator register 161 (FIG. 31), the trunk class TCLASS and the trunk number TKN of the trunk MFICT are loaded into the Nos.24 . . . 30 bit positions of the No.0 buffer register 163-

0 and in the Nos.20 . . . 27 bit positions of the No.0 network control register 165-0, respectively. The trunk equipment number TEN of the trunk MFICT is transferred from the address register 186 (FIG. 33) to the Nos.3 . . . 12 bit positions of the No.0 buffer register 163-0 (FIG. 31). The trunk group number TGN of the trunk MFIRT 119 (FIG. 1A) is loaded into the accumulator register 161 (FIG. 31).

Next a trunk selection command TKSEL 5716 follows. The wired logic searches an idle trunk MFIRT, reserves the same, and loads into the index register 162 (FIG. 31) the trunk data of the reserved trunk MFIRT, including the trunk group number TGN, the trunk class TCLASS, and the trunk number TKN in FIG. 29*b*.

Several microcommands follow for the purpose of loading the data of the activity and registering areas ACT and REG (FIG. 29*e*) and the trunk number TKN of the reserved trunk MFIRT in the No.0 buffer register 163-0 (FIG. 31) and for loading the datum for the first digit information and digit information areas FSTDI and DGI (FIG. 29e) in the No.1 buffer register 163-1 (FIG. 31). Furthermore, the trunk number TKN of the reserved trunk MFIRT is transferred from the index register 162 to the Nos.24 . . . 28 bit positions of the No.1 network control register 165-1 in FIG. 52. Still further, the accumulator and index registers 161 and 162, respectively, in FIG. 31 are cleared of bits.

Next, the register track hunt command RTH 5721 follows.

Subsequently, the link data setting routine LKDSR 5726 consisting of several microcommands follows. The data designating the register sender link setting operation are loaded into the network command register 166 (FIG. 52).

The program advances in succession to the commands of the register track scan RTS 5731, the mode change 5732 and the link setting operation NWAC 5739.

The activated trunk MFICT is thus connected with an idle trunk MFIRT via the register sender link 120 in FIG. 1A. The link setting for the register sender link 120 is carried out in substantially the same manner as for the main link 108.

Now, the flow of the program in FIG. 57 advances in a manner similar to that of the dial tone connection (FIG. 55) when no trunk MFICT requests the line service, when no idle trunk MFIRT is found, or when no idle register track section is found.

e. Intraoffice Connection

Figure 58:
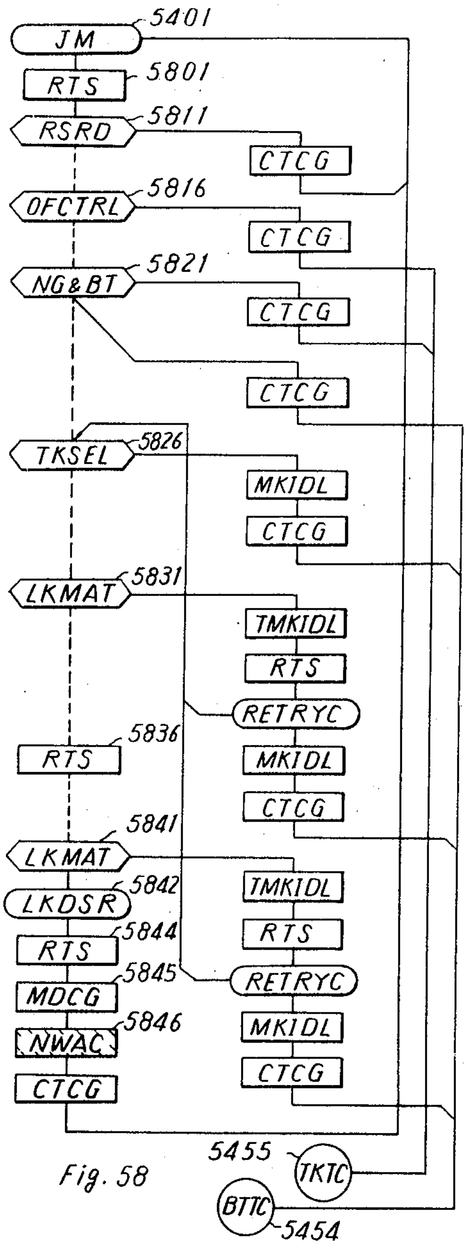

Referring to FIG. 58, it is assumed that the dial tone connection has been completed for a local calling subscriber who is now sending the dial information representing the directory number of a local subscriber. During the execution of any one of the register track scan command RTS described hereinbefore and hereinafter, the wired logic (FIG. 50A) receives the dial information through the seized trunk ORT and stores the same in a section of the register track 149 (FIG. 30). Meanwhile, the monitoring program segment 5401 on one of the command tracks 144 (0 or 1 in FIG. 30) permits the central controller 150 to transfer an intraoffice connection program segment to the other of the latter command tracks.

According to the normal flow of the program 5401 in FIG. 58, a register track scan command RTS 5801 is executed at the start.

The next command is a register service request detection command RSRD 5811. In response to the logic "1" signal supplied from the call back flag area CBF (FIG. 29*e*) of the register track section having the dial information, the wired logic (FIG. 49) loads the data of the Nos.0 through 3 words of the track section to the Nos. 0 and 1 buffer, the accumulator, and the index registers 163-0, 163-1, 161, and 162, respectively, in FIG. 31.

Thereafter, several microcommands follow. The chart class CHART data contained in the class CLASS are transferred to the Nos.25 . . . 28 bit positions of the accumulator register 161 from the No.0 buffer register 163-0. The dial information loaded in the accumulator and the index registers 161 and 162 except the office code is transferred to the No.0 network buffer register 164-0 (FIG. 31).

Next, the office code translation command OFCTRL 5816 is executed. The wired logic (FIG. 42) compares the No.0 word translator data successively received from the translator track 148 (FIG. 30) with the data repeatedly received from the accumulator register 161 (FIG. 31). When an identity is found, the wired logic leaves in the index register 162 the No.1 word translator data including, in this case, the trunk group number TGN for the trunk (IOT) 111.

Subsequently, several microcommands follow. The lower digits of the dial information loaded into the No.0 network buffer register 164-0 (FIG. 31) are transferred to the accumulator register 161 (FIG. 31). The No.1 word translator data in the index register 162 (FIG. 31) are transferred to the No.1 network buffer register 164-1 (FIG. 31).

Next the directory number translation and busy test commands NG&BT 5821 for the Nos.0 and 1 line tracks 145 (FIG. 30) are executed. The wired logic (FIG. 43) compares the directory numbers successively received from one or the other of the line tracks 145 (FIG. 30) as specified by the command with the lower digits of the dial information repeatedly received from the accumulator register 161 (FIG. 31). Meanwhile, the address information is successively renewed in the address register 186 (FIG. 33) in compliance with the line track words from which the directory numbers are received. As soon as an identity is found, the wired logic addresses that line circuit, which has been found to be the desired called subscriber's line circuit to test the busy/idle state thereof. If idle, the called subscriber's line circuit is reserved (FIG. 19) by the wired logic by the set pulse SET. By the end pulse END, the wired logic leaves the address, namely, the called subscriber's line equipment number LEN2; the last digit "2" is added to indicate the called one in the latter address register 186 and the called subscriber's line data in the index register 162 (FIG. 31).

Then, several microcommands follow. That trunk group number TGN for the trunks (IOT) 111 which is obtained as a result of the office code translation and kept in the No.1 network buffer register 164-1 (FIG. 31) is transferred to the accumulator register 161 (FIG. 31). The called subscriber's line equipment number LEN2 is transferred from the address register 186 (FIG. 33) to the No.0 network buffer register 164-0.

Next follows a trunk selection command TKSEL 5826. What is kept by the wired logic (FIG. 40) in the latter address register 186 is the trunk equipment number TEN1; (the last digit "1" is added to indicate the calling one) of the reserved trunk IOT on the calling subscriber's side. At the bit positions for the trunk number (FIG. 29b), the index register 162 (FIG. 31) keeps the trunk equipment number TEN2 of the reserved IOT on the called subscriber's side.

Thereafter, several microcommands are executed. The calling subscriber's line equipment number LEN1 and the trunk equipment number TEN1 on the calling subscriber's side are then transferred from the No.0 buffer register 163-0 (FIG. 31) and the address register 186, respectively, to the No.0 network control register 165-0 (FIG. 52). The accumulator register 161 (FIG. 31) is loaded with the line and the trunk line frame numbers LLF and TLF derived from the line and the trunk equipment numbers LEN1 and TEN1, respectively.

Then, a first link matching command LKMAT 5831 activates the wired logic (FIG. 41) to locate and reserve an idle speech path for connecting the calling subscriber's line circuit with the reserved trunk IOT.

Next, several microcommands effectuate the transfer of the trunk equipment number TEN2 on the called subscriber's side from the index register 162 (FIG. 31) to the No.0 network buffer register 164-0 (FIG. 31).

Then, the register track scan command RTS 5836 follows.

After this, several microcommands are executed. The data are interchanged between the No.0 network buffer and control registers 164-0 and 165-0, respectively. The data are transferred from the No.1 network control register 165-1 to the No.1 network buffer register 164-1 in FIG. 31. The accumulator register 161 (FIG. 31) is loaded with the line and the trunk line frame numbers LLF and TLF derived from the line and the trunk equipment numbers LEN2 and TEN2, respectively, for the called subscriber, as transferred from the No.0 network buffer register 164-0 to the No.0 network control register 165-0 (FIG. 52).

Now a second link matching command LKMAT 5841 takes place.

Then, the link data setting routine LKDSR 5842 follows to provide several microcommands. Now, data designating the intraoffice connection and the switching network setting operation are loaded into the network command register 166 (FIG. 52).

The program steps to successive commands of the register track scan RTS 5844, the mode change MDCG 5845 and the link setting operation NWAC 5846. The first portion of the link setting operation NWAC 5846 is initially carried out for the called subscriber's side. Subsequently, the data for the calling subscriber are transferred from the network buffer registers 164-0 and 164-1 to the network control registers 165 in FIG. 52. The last portion of the link setting operation NWAC 5846 is for the calling subscriber's side. Upon successful link setting, the trunk IOT transmits the ringing signal to the called subscriber and the ring-back tone to the calling subscriber. It is understood that supervision for the abandonment of the call and the termination of speech and the like are assigned to the function of the trunk.

If the called office code cannot be found in the translator track 148 (FIG. 30) as a result of the office code translation OFCTRL 5816, it is evident that the calling subscriber has dialled a wrong number. The flow of the intraoffice connection program now jumps to the talky trunk connection routine TKTC 5455. If the called subscriber cannot be determined as a result of execution of the directory number translation and busy test commands NG&BT 5821, the command having the next command address plus two is executed next. The flow thereby jumps to the talky trunk connection routine TKTC 5455. When the called subscriber is busy, or the trunks (IOT) 111 are all busy, or when all possible speech paths on the calling and/or called subscriber's side are busy even after retrial, the command having the next command address plus one is executed next. The flow thereby jumps to the tone trunk connection routine BTTC 5454.

f. Outgoing Connection

Figure 59:
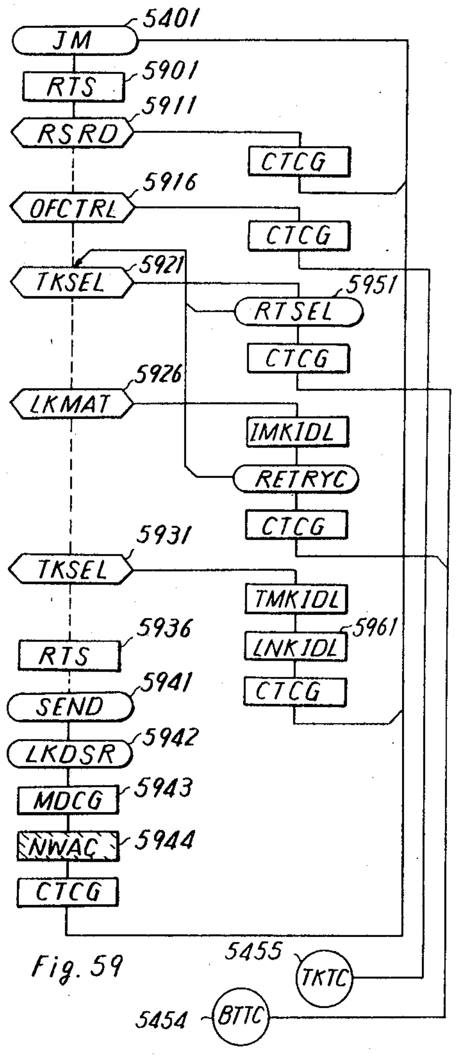

Referring to FIG. 59, it is now assumed that the local subscriber has originated an outgoing call.

According to the normal flow, the register track scan, the register service request detection, and the office code translation commands RTS 5901, RSRD 5911, and OFCTRL 5916 respectively, are executed as in the intraoffice connection. The result obtained in the index register 162 (FIG. 31) by the office code translation OFCTRL 5916, however, provides the trunk track data for those trunks OGT 114 with which the desired trunk lines 102 are connected.

The trunk selection command TKSEL 5921 is executed with the trunk group number TGN for the above-mentioned trunks (OGT) 114 transferred from the index register 162 to the accumulator register 161 in FIG. 31.

The link matching command LKMAT 5926 is executed with the calling subscriber's line and the reserved trunk equipment numbers LEN and TEN in FIG. **29*e* transferred from the No.0 buffer register 163-0 (FIG. 31) and the address register 186 (FIG. 33), respectively, to the No.0 network control register 165-0 (FIG. 52**).

During the execution of the microcommands preceding the trunk selection command TKSEL 5931 for an idle trunk DPOST, the immediate load command I-LOAD (not shown) loads the trunk group number TGN of the trunks (DPOST) 115 into the accumulator register 161 (FIG. 31). Where the circumstance requires, another immediate load command I-LOAD having the next address loads the latter accumulator register with the trunk group number TGN of the trunks (MFOST) 116.

After the second register track scan command RTS 5936, there is executed a send data setting routine SEND 5941 which consists of several microcommands such as the data transfer and the data store commands MOVE and STORE. The No.0 word of that register track section whose register service request was detected during the last-mentioned register service request detection RSRD 5911 is thereby provided with a logic "1" datum at the sending area SND (FIG. 29e) and with the trunk equipment number TEN of the selected and reserved outgoing sender trunk DPOST or MFOST. Also, the No.1 word is supplied with a logic "1" datum in the first digit information area FSTD1 (FIG. **29*e*), with the digit information DGI obtained by the office code translation OFCTRL 5916 from the number of digits area ND (FIG. 29*d***) of the No.1 translator word, and with the delete information DLI obtained from the trunk class area TCLASS of the reserved trunk OGT.

The link data setting routine LKDSR 5942 supplements the network control registers 165 (0 and 1 in FIG. 52) with the data for setting the register sender link 120 (FIG. 1A) to interconnect the reserved trunk OGT with the reserved outgoing sender trunk DPOST or MFOST in FIG. 1A. The link data setting routine LKDSR 5942 furthermore stores the data for the switching network and the register sender link operation in the network command register 166.

The outgoing connection program steps to the mode change command MDCG 5943 and the link setting operation NWAC 5944 in succession.

If no idle trunk OGT 114 is found during execution of the first trunk selection command TKSEL 5921, the selection retrial routine RTSEL 5951 is executed for a second path. This is achieved by loading a second trunk group number TGN obtained by the office code translation OFCTRL 5916 into the accumulator register 161 (FIG. 31). When the second route is also busy, the flow of the program jumps to the tone trunk connection routine BTTC 5454. While it is possible to try only the second retrial with the embodiment being described, it is possible to further retry the de-tour routes by increasing the memory area of the translator track section.

If no idle outgoing sender trunk DPOST or MFOST in FIG. 1A is found during execution of the second trunk selection TKSEL 5931, it is then necessary to make idle not only the trunk OGT reserved during the first trunk selection TKSEL 5921 but also the A, B, and C links reserved during the link matching LKMAT 5926 as shown by the link make-idle command LNKIDLE 5961.

g. Incoming Connection

Figure 60:
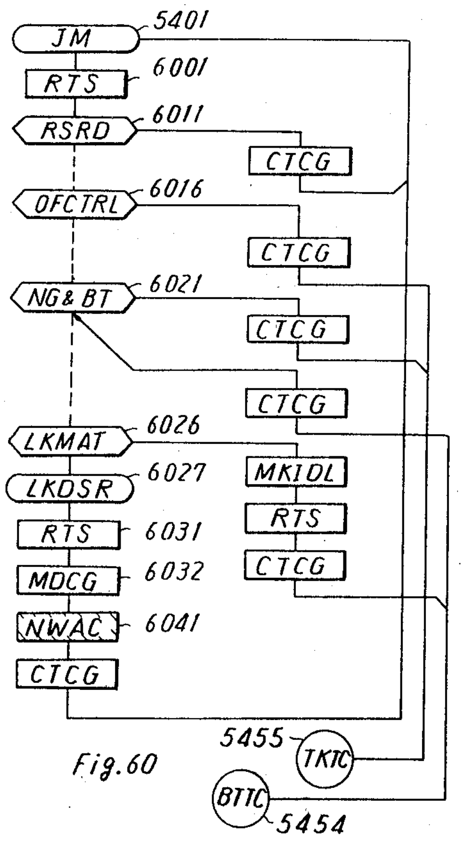

Referring to FIG. 60, it is assumed that an incoming call has reached an incoming trunk DPICT or MFICT in FIG. 1A from the preceding office.

According to the normal flow of the program, the register track scan, the register service request detection, the office code translation, and the directory number translation and busy test commands RTS 6001, RSRD 6011, OFCTRL 6016, and NG&BT 6021 are executed in succession as in the case of the intraoffice connection. After the performance of several microcommands, the link matching command LKMAT 6026 and the link data setting routine LKDSR 6027 are executed in order as in the intraoffice connection. Next, the second register track scan and the mode change commands RTS 6031 and MDCG 6032 are executed as in the case of the intraoffice connection. Subsequently, the link setting operation NWAC 6041 is effectuated.

h. Tone and Talky Trunk Connection BTTC and TKTC

When the flow of the connection program jumps to the busy tone connection or the tone trunk connection routine BTTC 5454, a tone trunk is connected with the calling subscriber to send to the latter the busy tone. The routine is similar to that for the trunk ORT connection.

When the flow of the connection program jumps to the talky trunk connection routine TKTC 5455, a talky trunk is connected with the calling subscriber to send to the latter one of the talking announcements available on the talky trunk as previously mentioned. The routine of the talky trunk connection is substantially the same as that for the trunk ORT connection.

VII. GENERAL NOTES

In the embodiment of the invention in FIGS. 1A and B as so far described, it is seen that certain substantially permanent data such as the telephone directory number and the service class of each line circuit, the terminal numbers of both ends of each junctor, and the trunk class and the trunk number, if any, of each trunk, are stored in the drum 140 (FIGS. 1B and 30) at the memory areas of the addresses corresponding to the respective equipment numbers. This is effective for providing an embodiment of simple design. It is, however, well known that all the line circuits and trunks are not necessarily in one-to-one correspondence with the switching network terminals. Even if such were the case, the invention is feasible. More particularly, this is possible by storing the equipment numbers also in the respective memory areas and by carrying out the read out of the required data with the stored equipment number being used as a heading. This manner of arrangement is hereinbefore described in conjunction with the translator track 148 in FIGS. 1B and 30. This arrangement enables the whole storage capacity of the drum to be effectively utilized when the quantity of information is not uniform among the equipments involved. This arrangement has an additional advantage of minimizing the possibility for the logic circuits to misinterpret the correspondence between the equipment and the data relating thereto.

While a magnetic drum 140 embodies the memory areas for the nondestructive reading out, other rotary devices such as, for example, a rotary magnetic disk would serve equally as well. It is easily understood that any other memory or storage means of the kind may be used depending on the economics thereof.

In addition, it is understood that while three-lead ferreed switches are used in the switching network 106 in FIG. 1A, it is apparent to those skilled in the art that the well-known crossbar switch may be substituted therefor with equally satisfactory results.

It is understood that the invention is described herein in specific respects for the purpose of this description. It is also understood that such respects are merely illustrative of the application of the invention and that numerous other arrangements may be devised by those skilled in the art without departing from the spirit and scope of the invention.

What is claimed is:

1. An electronic controlled space division switching system of the stored program type having a plurality of peripheral elements and a common control equipment, each said element producing a status signal representing the busy and the idle states, said equipment producing a reservation signal for reserving, for subsequent use, a desired one of said elements, wherein the improvement comprises state circuits, substantially equal in number to said elements, associated with said elements, respectively, and with said equipment for reception of said status and said reservation signals, each said circuit storing the busy and the idle states of the associated one of said elements in compliance with the logic sum of said status and said reservation signals to supply said equipment with a state signal representing the busy and the idle states of said associated element.

2. A switching system according to claim 1 wherein the peripheral elements include lines, links and trunks, each associated with at least one state circuit, and the state circuit signal used for the reserved state is the same as that used for the busy state.

3. A switching system according to claim 1, wherein the improvement further comprises a rotating magnetic memory device in said equipment for accessing successively to the relevant ones of said circuits and said elements as a result of rotation to make said equipment supply signals to said desired element and receive signals therefrom.

4. A switching system according to claim 1, said elements including selectable information paths, said equipment processing the data for selecting the desired path and establishing said desired path in compliance with the processed data, wherein the improvement further comprises two central controllers in said equipment, each associated with said state circuits, and each operable cyclically in the data processing mode and in the path establishing mode, and both operating simultaneously, one in the data processing mode of a call and the other in the path establishing mode of another call.

5. A switching system according to claim 1, one of said elements serving as an active element in processing of a call, another of said elements serving as a passive element in processing of said call, said elements including selectable information paths, said equipment processing the data for selecting one of said paths that interconnects said active and said passive elements and establishes said one path in compliance with the processed data, wherein the improvement comprises a central controller in said equipment, said controller reserving a desired one of said elements as said passive elements, said controller including an idle test circuit for checking the actual state of said active and said reserved passive elements before establishing said information path.

6. A switching system according to claim 4, wherein one of said controllers is operable cyclically in said data processing and said path establishing modes while the other of said controllers is operable cyclically in said path establishing and said data processing modes, respectively, during the time said two controllers operate cyclically in said processing and path establishing modes and are subject to trouble, and one of said controllers operates cyclically in said data processing and said path establishing modes during the time the other of said controllers is activated out of said data processing and said path establishing modes in response to a trouble signal to provide an indication thereof.

7. A switching system according to claim 1 and adapted for telephone switching, said elements including a plurality of numerical signals processing trunks, each of said numerical signals consisting of a plurality digits, each represented by a corresponding series of pulses, an interdigit pause provided between two consecutive series of pulses representing two consecutive digits; said series of pulses representing said numerical signal and serving to identify a called party, wherein said state circuits include pulse processing trunk state circuits associated with said processing trunks, respectively, each of said processing trunks state circuits comprising means for dealing pulse series-by-pulse series with said series of pulses and for producing flag signals in said pauses, respectively, each said flag signal representing completion of processing of one of said series of pulses that precedes each said pause.

8. A switching system according to claim 1, said system containing a memory for storing programs including a plurality of microcommands and a plurality of macrocommands, each said macrocommand covering several individual commands of the class of said microcommands to be executed in succession causing said equipment to control the operation of desired ones of said elements in a manner specified thereby, wherein the improvement further comprises signal producing means and an aggregate of wired logics in said equipment, said means producing macrocommand signals one at a time in compliance with said programs stored in said memory, said macrocommand signals representing said respective macrocommands, said aggregate associated with said means, said circuits, and said elements for executing said macrocommands in response to said macrocommand signals.

9. A switching system according to claim 1, said system adapted to telephone switching, said elements including a plurality of links, each having input and output terminal pairs, each said pair adapted for connection with one each of preselected line and trunk terminals of said system, respectively, wherein the improvement further comprises a memory track, a register, and wired logic in said equipment, said track associated with said logic and having a plurality of memory areas which are assigned to said links, respectively, and which store for nondestructive readout by said logic data relating to said link input and output terminal pairs, respectively, said register serving as a temporary store for information relating to said link input and output terminal pairs for said preselected line and trunk terminal connection, said logic associated with said circuits and said register for finding an idle path via that one of said circuits which is associated with said idle path, in consideration of said data received from said track memory areas and said information received from said register.

10. A switching system according to claim 1, said equipment comprising at least one central controller, wherein the improvement further comprises a memory device in said equipment, said device associated with said controller and storing for nondestructive readout by said controller the substantially permanent data related to said elements, respectively, said controller receiving the data derived from said device as a result of said nondestructive readout to utilize such data for accessing to successive relevant ones of said circuits and to make said relevant circuits in turn supply said state signals.

11. An electronic controlled space division telephone switching system of a stored program type having peripheral equipment and common control equipment; said peripheral equipment comprising a plurality of unit equipments including a multiplicity of subscriber line circuits and a plurality of trunks, and a main link including a plurality of links; said common control equipment comprising a first storage device storing substantially permanent programs of call processing routines and a central controller; said controller reading out from said device the programs providing the call processing routines specifying the operation of said controller, respective data related to said unit equipments and said links, and translation data for determining which of said routines is to be followed by said controller; said controller carrying out a call processing operation in a call processing mode of identifying a pair of said unit equipments with reference to a call being served by the system and specifying one of said routines to be followed for such call; said controller causing said main link to carry out a link setting operation in a link setting mode of interconnecting said identified unit equipment pair in accordance with said specified one routine; wherein the improvement comprises a multiplicity of state circuits interposed between said peripheral and common control equipments and associated with said unit equipments and said links, respectively, and with said controller for temporarily storing for readout by said controller those states of service of the respective associated ones of said unit equipments and said links in which such respective ones are left at a given time; a second storage device of quicker access for temporarily storing data relative to the progress of said specified one routine excluding said states of service; said first and second devices having means associated with said circuits for successive access thereto; another central controller which is a duplicate of said first central controller; each of said controllers comprising first means associated with said circuits and said devices for receiving state signals from successively accessed ones of said circuits as a result of said data readout from said respective storage devices to carry out said specified call processing operation; each of said controllers further comprising second means associated with said first means and said main link for supplying control signals to said main link to activate said main link to carry out said link setting operation; each of said controllers cyclically operable in said call processing and link setting modes in reverse to said call processing and link setting modes of the other of said controllers.

* * * * *